US009705648B2

(12) United States Patent
Mochizuki et al.

(10) Patent No.: US 9,705,648 B2
(45) Date of Patent: *Jul. 11, 2017

(54) MOBILE COMMUNICATION SYSTEM

(71) Applicant: MITSUBISHI ELECTRIC CORPORATION, Tokyo (JP)

(72) Inventors: Mitsuru Mochizuki, Tokyo (JP); Miho Maeda, Tokyo (JP); Taiga Saegusa, Tokyo (JP); Yasushi Iwane, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/073,683

(22) Filed: Mar. 18, 2016

(65) Prior Publication Data
US 2016/0198392 A1    Jul. 7, 2016

Related U.S. Application Data

(62) Division of application No. 14/534,958, filed on Nov. 6, 2014, which is a division of application No. (Continued)

(30) Foreign Application Priority Data

Apr. 28, 2009 (JP) .................... 2009-109312

(51) Int. Cl.
*H04W 4/00* (2009.01)
*H04L 5/00* (2006.01)
(Continued)

(52) U.S. Cl.
CPC .......... *H04L 5/0033* (2013.01); *H04B 7/024* (2013.01); *H04W 40/28* (2013.01); *H04W 72/02* (2013.01);
(Continued)

(58) Field of Classification Search
CPC . H04B 7/024; H04B 7/0689; H04W 72/0486; H04W 72/0406; H04W 72/0413; H04L 5/0033
(Continued)

(56) References Cited

U.S. PATENT DOCUMENTS 7,894,817 B2    2/2011   Takada et al.
7,948,942 B2    5/2011   Zhang et al.
(Continued)

FOREIGN PATENT DOCUMENTS

CN           1882932 A       12/2006
CN         101137228 A        3/2008
(Continued)

OTHER PUBLICATIONS

Combined Office Action and Search Report issued on Apr. 27, 2016 in Chinese Patent Application No. 201080018936. 7 with partial English translation.
(Continued)

*Primary Examiner* — Sai-Ming Chan
(74) *Attorney, Agent, or Firm* — Oblon, McClelland, Maier & Neustadt, L.L.P.

(57) ABSTRACT

The present invention relates to a mobile communication system having a coordinated communication mode in which radio communication is performed between a user equipment and a plurality of base stations in a coordinated manner and an uncoordinated communication mode in which radio communication is performed between a user equipment and a base station without coordinating with another base station, in which radio communication is performed by selectively using any of the coordinated communication mode and the uncoordinated communication mode. The coordinated communication in which radio communication is performed between a user equipment and a plurality of base
(Continued)

stations in a coordinated manner and the uncoordinated communication in which radio communication is performed between a user equipment and a base station without coordinating with another base station are selectively used in an appropriate manner, with the result that a mobile communication system capable of exerting its performance in accordance with a situation can be provided.

4 Claims, 32 Drawing Sheets

Related U.S. Application Data

13/264,767, filed as application No. PCT/JP2010/002020 on Mar. 23, 2010, now Pat. No. 8,953,523.

(51) Int. Cl.
| | |
|---|---|
| H04B 7/024 | (2017.01) |
| H04W 72/04 | (2009.01) |
| H04W 40/28 | (2009.01) |
| H04W 72/02 | (2009.01) |
| H04B 7/06 | (2006.01) |
| H04W 88/02 | (2009.01) |
| H04W 88/08 | (2009.01) |
| H04W 88/16 | (2009.01) |

(52) U.S. Cl.
CPC ..... *H04W 72/0406* (2013.01); *H04W 72/048* (2013.01); *H04W 72/0413* (2013.01); *H04W 72/0486* (2013.01); *H04B 7/0689* (2013.01); *H04W 88/02* (2013.01); *H04W 88/08* (2013.01); *H04W 88/16* (2013.01)

(58) Field of Classification Search
USPC .......................................................... 370/328
See application file for complete search history.

(56) References Cited

U.S. PATENT DOCUMENTS

| | | | |
|---|---|---|---|
| 2005/0037766 | A1* | 2/2005 | Hans .................. H04W 72/085 455/450 |
| 2005/0141596 | A1 | 6/2005 | Black et al. |
| 2005/0170835 | A1 | 8/2005 | Ayyagari et al. |
| 2005/0176468 | A1 | 8/2005 | Iacono et al. |
| 2006/0209883 | A1 | 9/2006 | Suzuki |
| 2007/0037524 | A1 | 2/2007 | Ishii et al. |
| 2007/0168326 | A1 | 7/2007 | Das |
| 2008/0076432 | A1 | 3/2008 | Senarath et al. |
| 2008/0146238 | A1 | 6/2008 | Saito et al. |
| 2008/0192682 | A1 | 8/2008 | Matsumoto et al. |
| 2008/0298445 | A1 | 12/2008 | Richardson et al. |
| 2009/0052401 | A1 | 2/2009 | Nakajima |
| 2009/0082026 | A1 | 3/2009 | Yavuz et al. |
| 2010/0034151 | A1* | 2/2010 | Alexiou ................ H04B 7/022 370/329 |
| 2011/0142007 | A1 | 6/2011 | Takada et al. |
| 2011/0281590 | A1* | 11/2011 | Frederiksen .......... H04W 24/02 455/449 |

FOREIGN PATENT DOCUMENTS

| | | |
|---|---|---|
| CN | 101212777 | 7/2008 |
| EP | 1 703 644 A2 | 9/2006 |
| EP | 1 753 153 A2 | 2/2007 |
| JP | 2008-153864 | 7/2008 |
| JP | 2010-541334 | 12/2010 |
| WO | WO 2007/015466 A1 | 2/2007 |
| WO | WO 2007/075744 A2 | 7/2007 |
| WO | WO 2009/039439 A2 | 3/2009 |

OTHER PUBLICATIONS

International Preliminary Report on Patentability and Written Opinion of the International Searching Authority issued Nov. 1, 2011 in PCT/JP2010/002020 (with English-language translation).
International Search Report issued Jun. 22, 2010, in Patent Application No. PCT/JP2010/002020.
"Design Considerations for COMP Joint Transmission", 3GPP TSG RAN WG1 Meeting #56bis, Samsung, Mar. 23-27, 2009, 9 sheets.
"Overall architecture", 3GPP TS 36.300 V8.6.0, Release 8, Sep. 2008, pp. 14-34, 12 sheets.
Office Action issued Dec. 2, 2014 in Japanese Patent Application No. 2014-061683 (with partial English language translation).
Extended European Search Report issued Nov. 25, 2014 in Patent Application No. 10769440.8.
Fujitsu, "Coherent and Non-Coherent DL CoMP Transmission for L TE-A", 3GPP TSG-RAN1 #56-BIS, R1-091 493, XP-050339054, Mar. 18, 2009, 8 pages.
Office Action mailed on Nov. 25, 2015 for Chinese Application No. 201080018936.7 (with English translation).
"Signaling of MBSFN Subframe allocation in D-BCH", 3GPP TSG-RAN WG1 Meeting #49bis, Nokia Siemens Networks, Nokia, Huawei, Jun. 25-29, 2007, 4 sheets.
"3rd Generation Partnership Project; Technical Specification Group Radio Access Network; Home (e)NodeB; Network aspects (Release 8)", 3GPP TR R3.020 V0.6.0, May 2008, pp. 2-53, 28 sheets.
"Definitions and Abbreviations", 3GPP TS 36.304 V8.4.0, Dec. 2008, pp. 7-8 and 12-13, 3 sheets.
"3rd Generation Partnership Project; Technical Specification Group Radio Access Network; Further Advancements for E-UTRA Physical Layer Aspects (Release X)", 3GPP TR 36.814 V0.2.0, Sep. 2008, pp. 1-16, 17 sheets.
"LS on HNB/HeNB Open Access Mode", 3GPP TSG-SA1 #42, 3GPP SA WG1, Oct. 13-17, 2008, 2 sheets.
"Way forward on CoMP and MIMO DL RS—Outcome of ad hoc discussions", Discussion Moderator, Tdoc R1-090529, 3GPP R1-090529, Jan. 12-16, 2009, 4 sheets.
"UL-DCCH-Message", Release 8, 3GPP TS 36.331 V8.4.0, Dec. 2008, pp. 79-103, 14 sheets.
"3rd Generation Partnership Project; Technical Specification Group Radio Access Network; Evolved Universal Terrestrial Radio Access (E-UTRA); Physical Channels and Modulation (Release 8)", 3GPP TS 36.211 V8.6.0, Mar. 2009, pp. 1-83, 43 sheets.
"3rd Generation Partnership Project; Technical Specification Group Radio Access Network; Evolved Universal Terrestrial Radio Access (E-UTRA); Physical layer procedures (Release 8)", 3GPP TS 36.213 V8.6.0, Mar. 2009, pp. 1-77, 40 sheets.
Office Action issued Nov. 12, 2013 in Japanese Application No. 2012-187573 (With English Translation).
"Impact of UL CoMP to HARQ operations", Alcatel-Lucent Shanghai Bell, Alcatel-Lucent, 3 GPP TSG RAN WG2 Meeting #65 bis, R2-092196, Mar. 23-27, 2009, 2 pages.
"Summary of email discussions for CoMP", Qualcomm Europe, 3GPP TSG-RAN WG1 #56bis, R1-091617, Mar. 23-27, 2009, pp. 1-15.
Chinese Office Action issued Sep. 30, 2013, in China Patent Application No. 201080018936.7 (with English translation).
Japanese Office Action issued May 8, 2012, in Japan Patent Application No. 2011-511274 (with partial English translation).
Office Action issued on Jun. 13, 2014, for Chinese counterpart application No. 201080018936.7, with partial English translation of the second Chinese Office Action.
Office Action issued on Apr. 12, 2016 in Japanese Patent Application No. 2015-060338 (with partial English language translation).
"System Performance Evaluation of Downlink CoMP", Huawei, 3GPP TSG-RAN WG1 Meeting #56, R1-090822, Feb. 9-13, 2009, pp. 2-6.
"Further discussion of frequency plan scheme on CoMP-SU-MIMO", Potevio, 3GPP TSG-RAN WG1 Meeting #56bis R1-091415, Mar. 23-27, 2009, pp. 2-12.

\* cited by examiner

F I G . 4
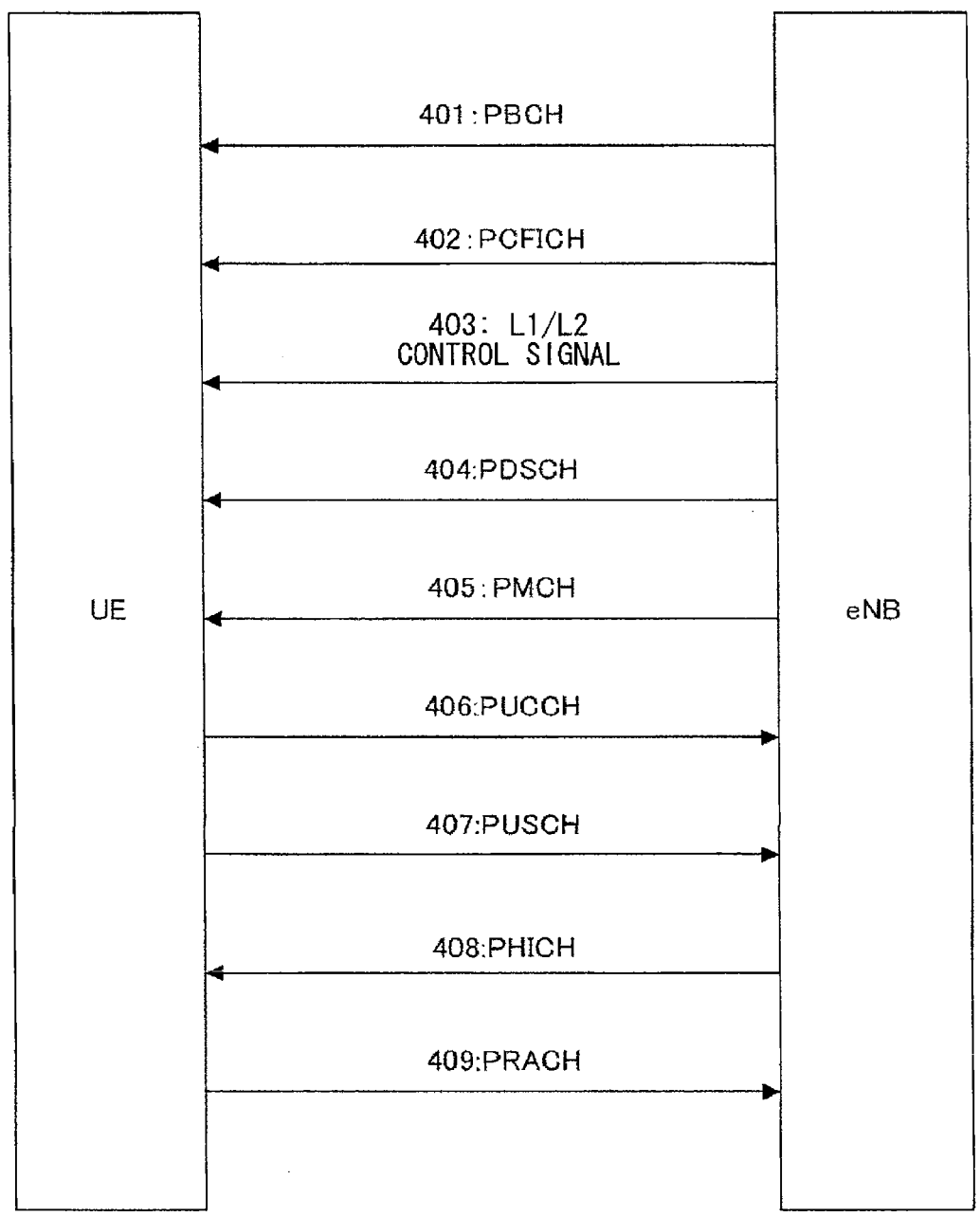

FIG. 5
(a)
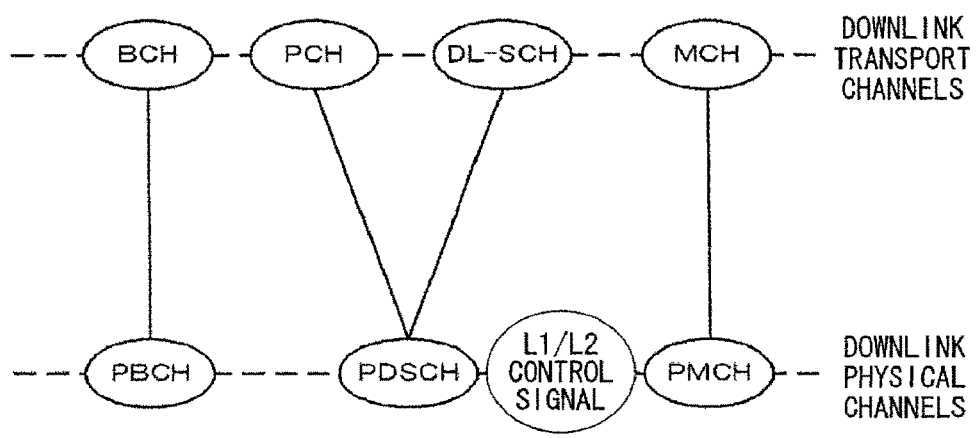
(b)
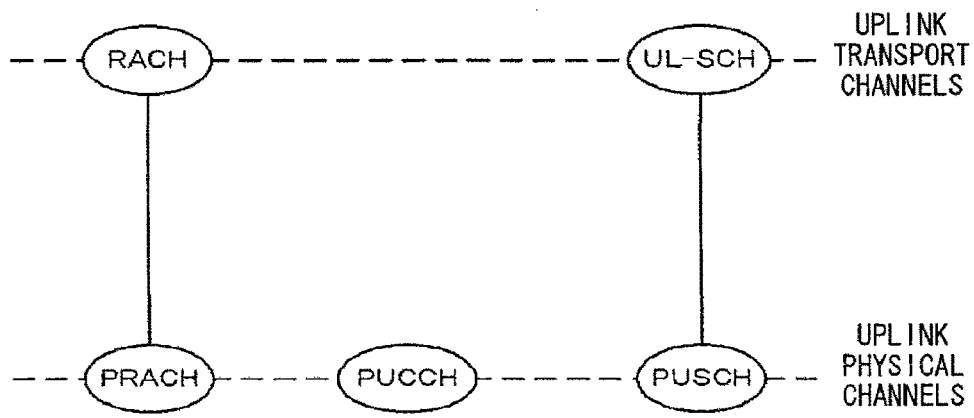

F I G. 6
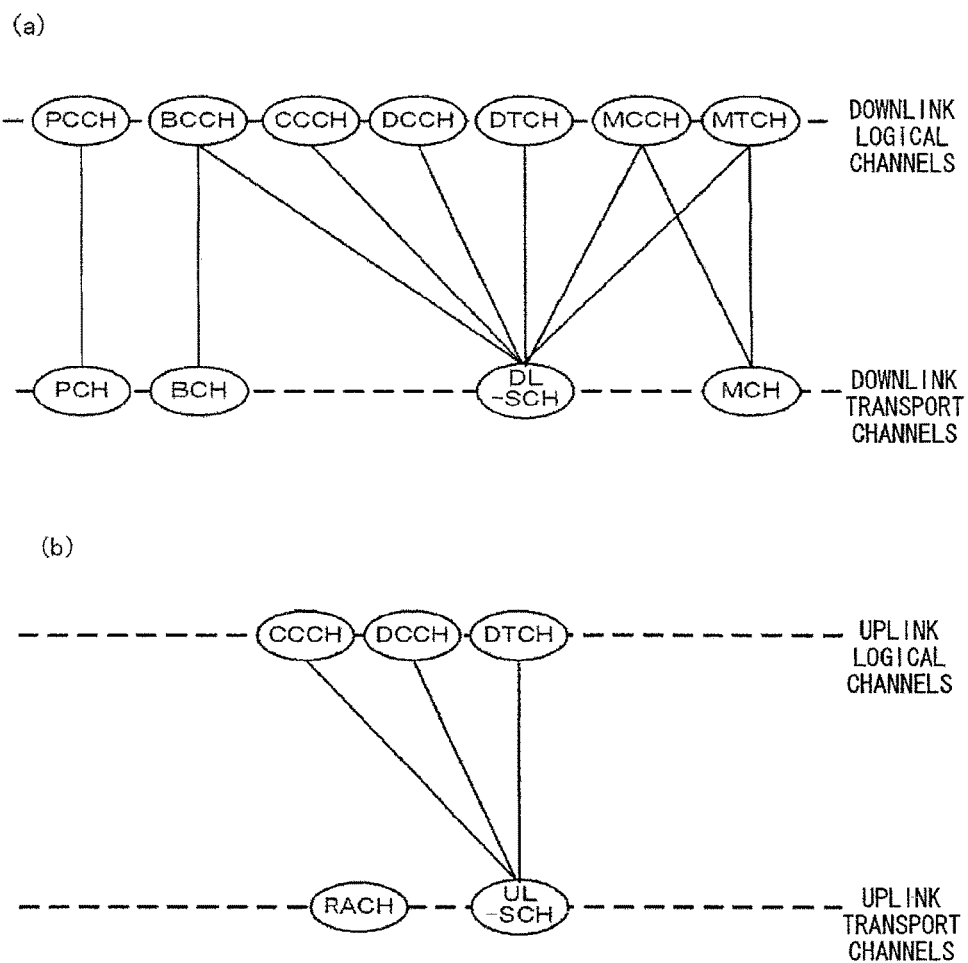

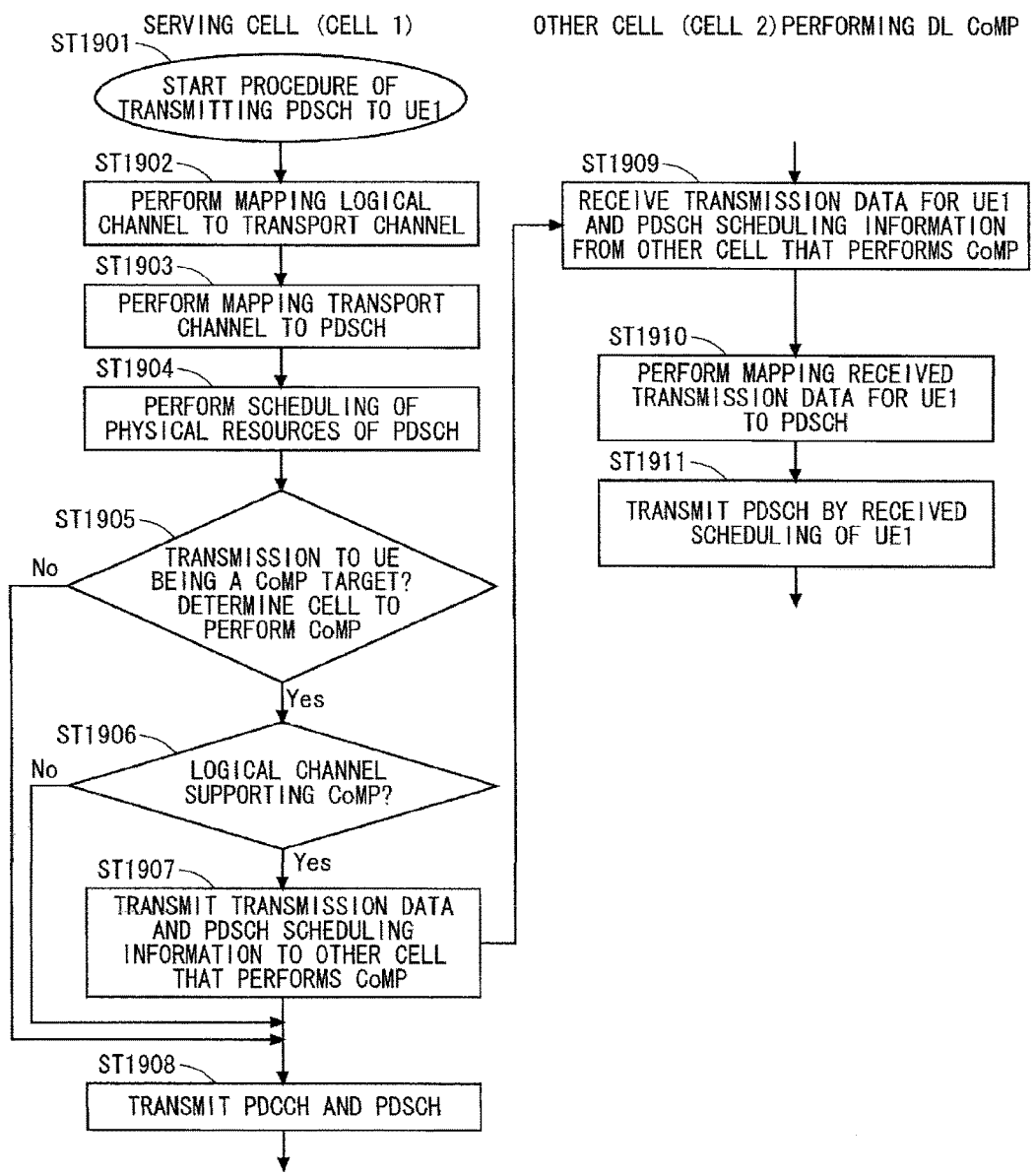

F I G . 2 0
(a)
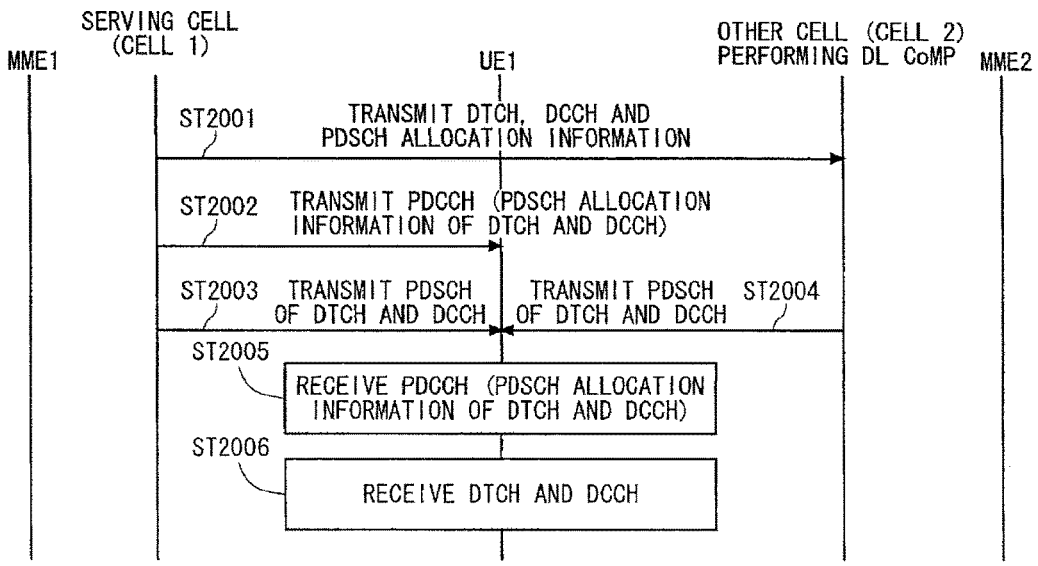
(b)
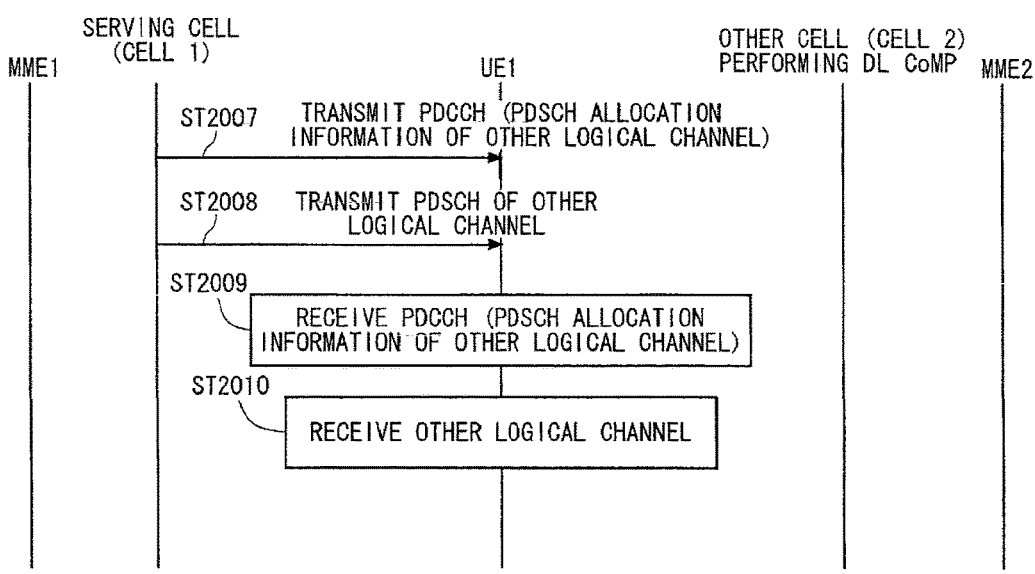

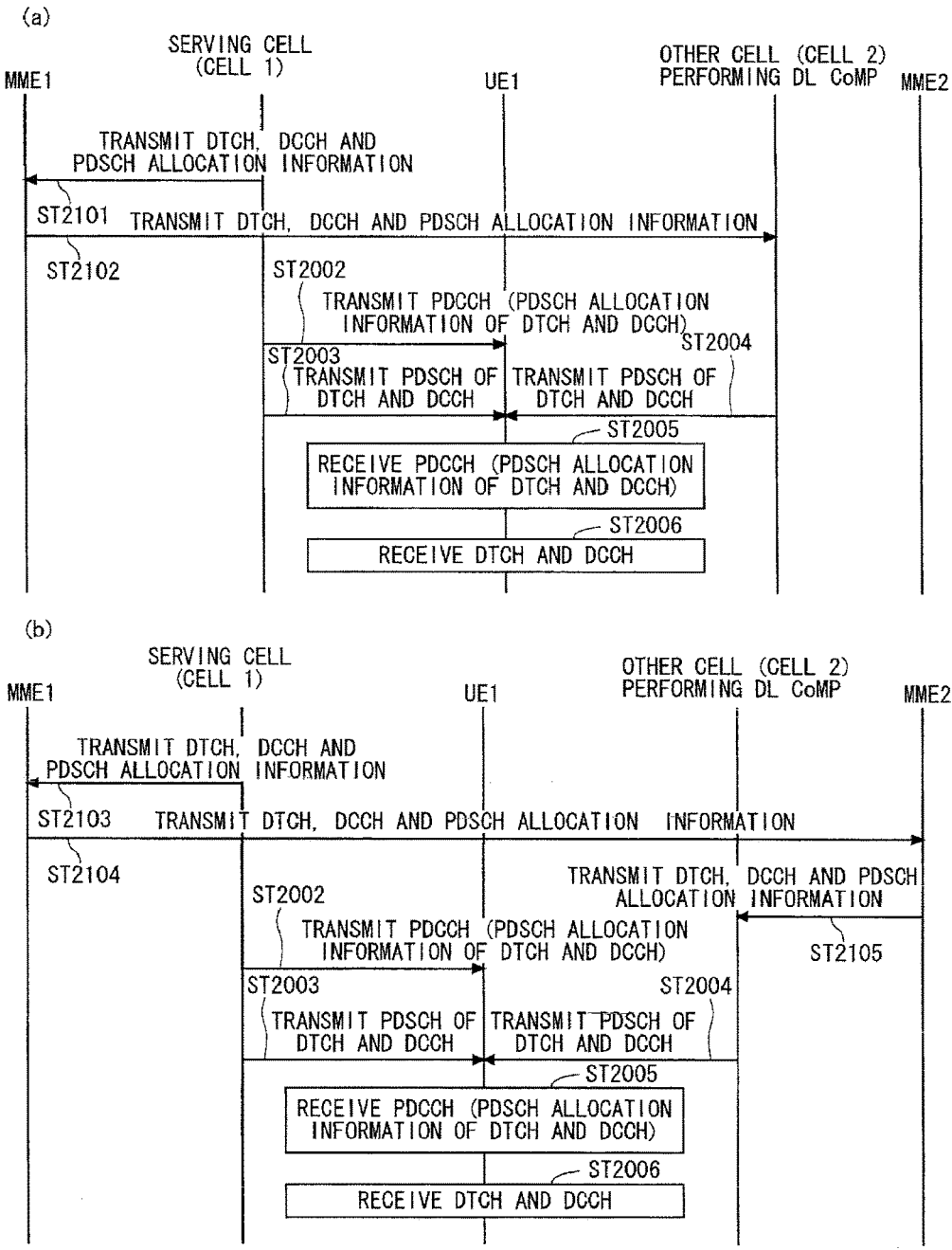

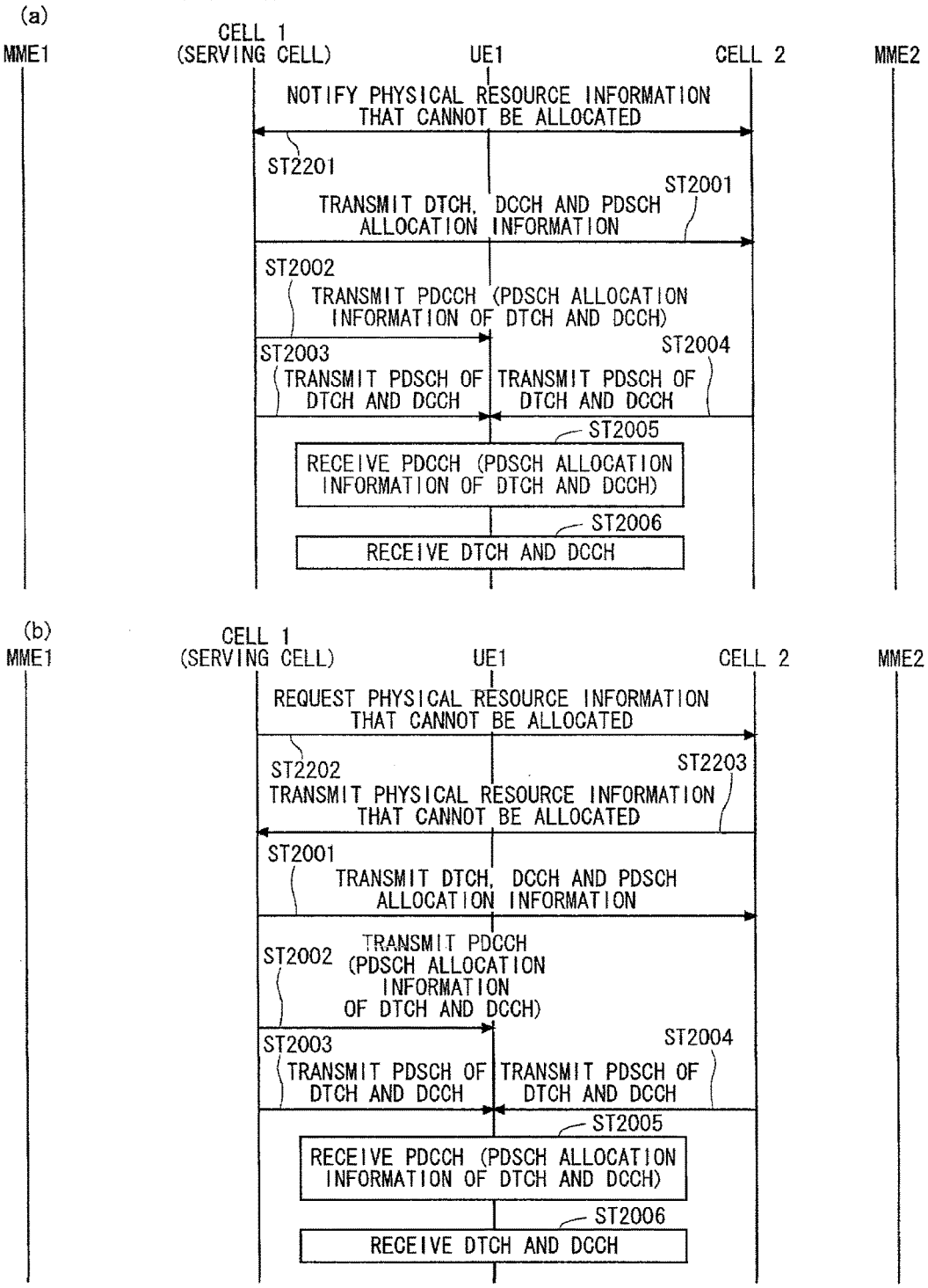

FIG. 26
(a) CELL
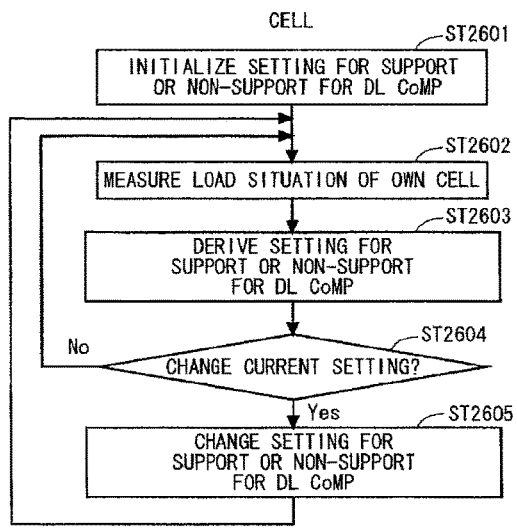
(b) MME
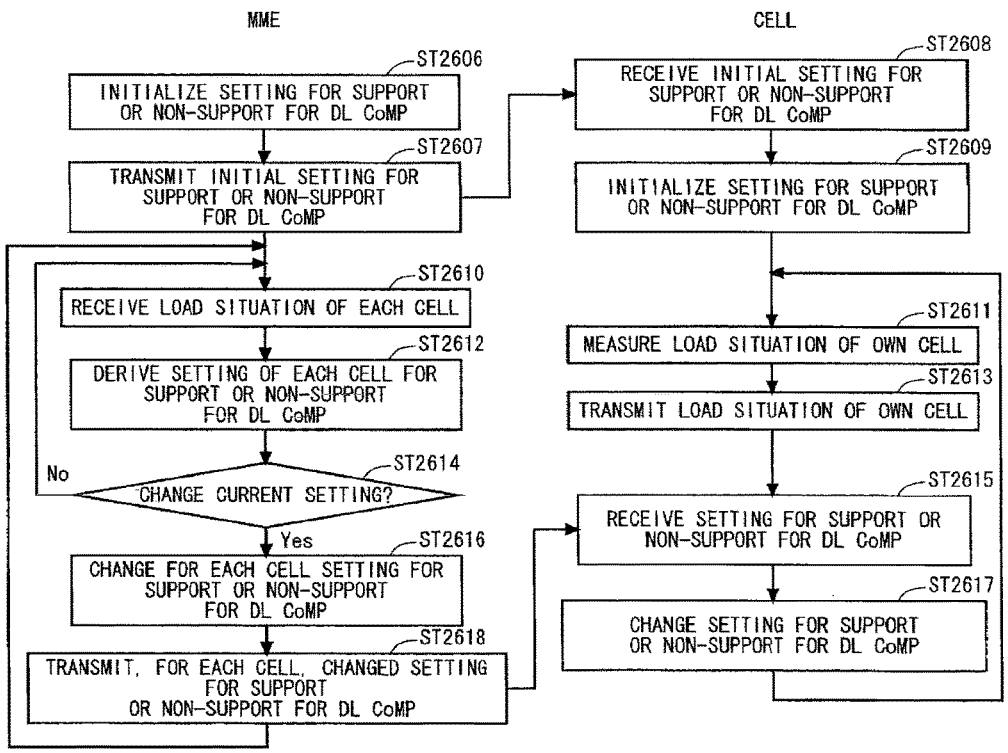

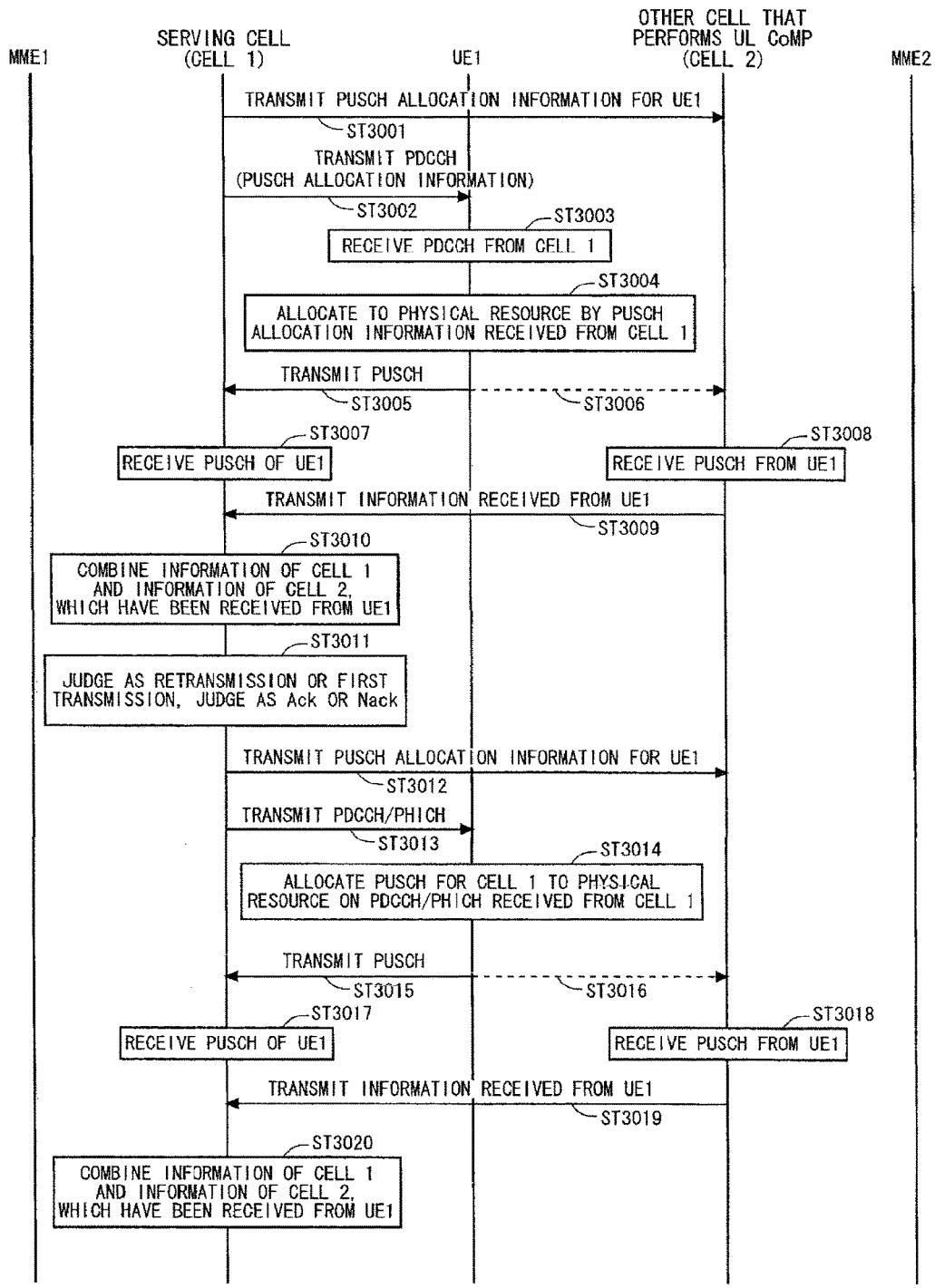
F I G. 30

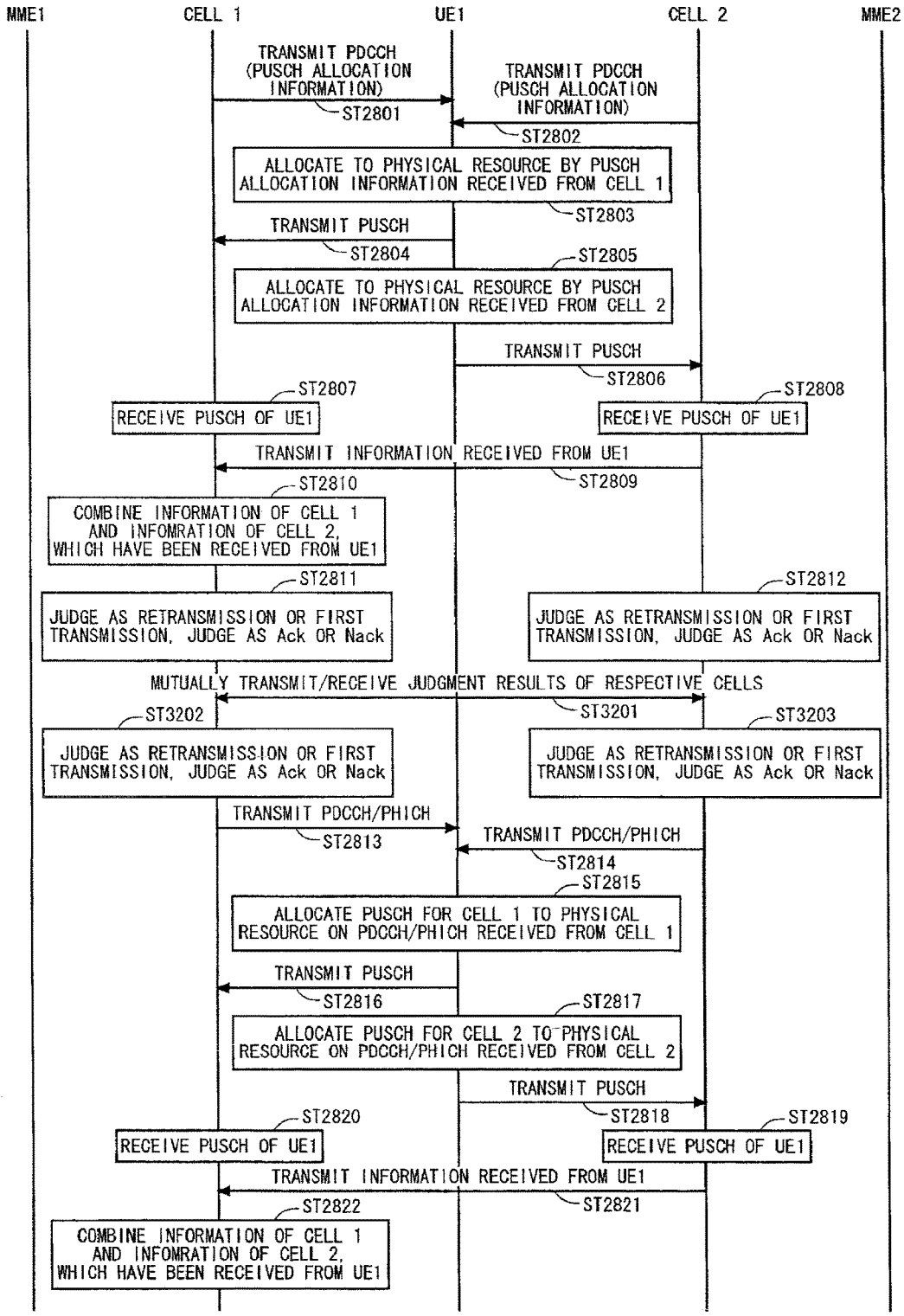

MOBILE COMMUNICATION SYSTEM

CROSS-REFERENCE TO RELATED APPLICATIONS

The present application is a divisional application of and claims the benefit of priority under 35 U.S.C. §120 from U.S. application Ser. No. 14/534,958, filed Nov. 6, 2014, which is a divisional application of U.S. application Ser. No. 13/264,767, now U.S. Pat. No. 8,953,523, filed Oct. 17, 2011, the entire contents of each of which is incorporated herein by reference. U.S. application Ser. No. 13/264,767 is a national stage of International Application No. PCT/JP2010/002020, filed Mar. 23, 2010, which is based upon and claims the benefit of priority under 35 U.S.C. §119 from prior Japanese Patent Application No. 2009-109312, filed Apr. 28, 2009.

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is investigating new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the UE 101. A BCH transport block is mapped to four subframes within a 40 ms interval. There is no explicit signaling indicating 40 ms timing. A physical control format indicator channel (PCFICH) 402 is transmitted from the base station 102 to the UE 101. The PCFICH notifies the number of OFDM symbols used for PDCCHs from the base station 102 to the UE 101. The PCFICH is transmitted in each subframe. A physical downlink control channel (PDCCH) 403 is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel (PDSCH) 404 is a downlink channel transmitted from the base station 102 to the UE 101. A DL-SCH (downlink shared channel) that is a transport channel and a PCH that is a transport channel are mapped to the PDSCH. A physical multicast channel (PMCH) 405 is a downlink channel transmitted from the base station 102 to the UE 101. A multicast channel (MCH) that is a transport channel is mapped to the PMCH.

A physical uplink control channel (PUCCH) 406 is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the UE 101 to the base station 102. A UL-SCH (uplink shared channel that is one of the transport channels shown in FIG. 5) is mapped to the PUSCH. A physical hybrid ARQ indicator channel (PHICH) 408 is a downlink channel transmitted from the base station 102 to the UE 101. The PHICH carries ACK/Nack that is a response to uplink transmission. A physical random access channel (PRACH) 409 is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE include, for example, reference symbol received power (RSRP).

The transport channel (Chapter 5 of Non-Patent Document 1) is described with reference to FIG. 5. FIG. 5 is a diagram illustrating transport channels used in the LTE communication system. Part (a) of FIG. 5 shows mapping between a downlink transport channel and a downlink physical channel. Part (b) of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part (b) of FIG. 5 is limited to control information. There is a collision risk. The RACH is mapped to the physical random access channel (PRACH). The HARQ is described.

The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. Part (a) of FIG. 6 shows mapping between a downlink logical channel and a downlink transport channel. Part (b) of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the base station. In downlink, the CCCH is mapped to the downlink shared channel (DL-SCH) that is a transport channel. In uplink, the CCCH is mapped to the uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicated traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 4). The closed subscriber group (CSG) is a cell in which subscribers who are permitted to use are identified by an operator (cell for identified subscribers). The identified subscribers are permitted to access one or more E-UTRAN cells of a public land mobile network (PLMN). One or more E-UTRAN cells in which the identified subscribers are permitted to access are referred to as "CSG cell(s)". Note that access is limited in the PLMN. The CSG cell is part of the PLMN that broadcasts a specific CSG identity (CSG ID, CSG-ID). The members of the authorized subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for making access from CSG-related members easy. 3GPP discusses in a meeting that the information to be broadcast by the CSG cell or cells is changed from the CSG-ID to a tracking area code (TAC). The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM containing all the CSG IDs of the CSG cells to which the subscribers belong. The whitelist of the UE is provided by a higher layer. By means of this, the base station of the CSG cell allocates radio resources to the UEs.

A "suitable cell" is described below (Chapter 4. 3 of Non-Patent Document 4). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell shall fulfill the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 4). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 6 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode.

3GPP is studying a further advanced new communication system for radio areas referred to as LTE advanced (LTE-A) (Non-Patent Document 5). The LTE-A is based on the communication system for radio areas according to the LTE and is configured by addition of several new techniques thereto. Examples of the new techniques include the wider bandwidth extension for supporting a wider bandwidth and the coordinated multiple point transmission and reception (CoMP).

CoMP studied for LTE-A is the technique for increasing the coverage of high data rates, improving the cell-edge throughput and increasing the system throughput by transmission or reception among multiple geographically separated points. The CoMP is classified into downlink CoMP (DL CoMP) and uplink CoMP (UL CoMP).

In DL CoMP, the PDSCH for one user equipment (UE) is transmitted among multiple points in a coordinated manner. The PDSCH for one UE may be transmitted from one point among multiple points, or may be transmitted from a plurality of points among multiple points. In a case of the transmission from one point, it is also referred to as coordinate scheduling (CS) or coordinate beamforming (CB), where transmission is stopped or transmission power is reduced in the physical resources to which the PDSCH is allocated in down link from other point to the UE. This reduces interference with the UE, leading to improvements in reception quality of the PDSCH of the UE.

In the case of the transmission from a plurality of points among multiple points, it is also referred to as joint processing (JP) or joint transmission (JT), where the PDSCHs for the UE are transmitted simultaneously from a plurality of points of the multiple points. The PDSCHs transmitted from a plurality of points among multiple points to the UE are identical to each other. This enables the UE to combine a plurality of received PDSCHs and accordingly improve the reception quality. The allocation information of the physical channel PDSCH to physical resources (resource blocks) is transmitted to a UE by being mapped on the physical channel PDCCH.

As the units (cells) that perform transmission at multiple points, base stations (NB, eNB, HNB, HeNB), a remote radio unit (RRU), a remote radio equipment (RRE) and a relay are studied. The unit (cell) that performs coordinated multiple point transmission is referred to as a multi-point unit (multi-point cell).

In UL CoMP, the uplink data from one user equipment (UE) is received by multiple points in a coordinated manner. The quality of uplink reception from the UE can be improved by combination of pieces of data received at multiple points.

As to UL CoMP, it is studied that the physical channel PUSCH is received by multiple points in a coordinated manner. The allocation information of the physical channel PUSCH to the physical resources (resource blocks) is transmitted to the UE by being mapped on the physical channel PDCCH.

As the units (cells) that perform reception at multiple points, base stations (NB, eNB, HNB, HeNB), a remote radio unit (RRU), a remote radio equipment (RRE) and a relay are studied. The unit (cell) that performs coordinated multiple point reception is referred to as a multi-point unit (multi-point cell).

PRIOR ART DOCUMENTS

Non-Patent Documents

Non-Patent Document 1: 3GPP TS36.300 V8.6.0
Non-Patent Document 2: 3GPP R1-072963
Non-Patent Document 3: TR R3.020 V0.6.0
Non-Patent Document 4: 3GPP TS36.304 V8.4.0
Non-Patent Document 5: 3GPP TR36.814 V0.2.0
Non-Patent Document 6: 3GPP S1-083461
Non-Patent Document 7: 3GPP R1-090529
Non-Patent Document 8: 3GPP TS36.331 V8.4.0
Non-Patent Document 9: 3GPP TS36.211 V8.6.0
Non-Patent Document 10: 3GPP TS36.213 V8.6.0

SUMMARY OF INVENTION

Problem to be Solved by the Invention

An object of the present invention is to provide a mobile communication system capable of exerting its performance so as to be suited for a situation by selectively using, in an appropriate manner, coordinated communication in which radio communication is performed between a user equipment and a plurality of base stations in a coordinated manner and uncoordinated communication in which radio communication is performed between a user equipment and a base station without coordinating another base station.

Means to Solve the Problem

The present invention relates to a mobile communication system, which has a coordinated communication mode in which radio communication is performed between a user equipment and a plurality of base stations in a coordinated manner and an uncoordinated communication mode in which radio communication is performed between a user equipment and a base station without coordinating with another base station, wherein radio communication is performed by selectively using any of the coordinated communication mode and the uncoordinated communication mode.

Effects of the Invention

According to the present invention, radio communication is performed by selectively using any of the coordinated communication mode in which radio communication is performed between a user equipment and a plurality of base stations in a coordinated manner and the uncoordinated communication mode in which radio communication is performed between a user equipment and a base station without coordinating with another base station. Therefore, it is possible to achieve a mobile communication system capable of exerting its performance so as to be suited for a situation.

BRIEF DESCRIPTION OF DRAWINGS

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 19 is a diagram illustrating operations of a serving cell and another cell that performs DL-CoMP with the cell.

FIG. 20 is a sequence diagram in a case where discrimination is made between support and non-support for DL CoMP for each logical channel.

FIG. 21 is a sequence diagram in a case where, not limited to an interface between cells, an interface between a core network and a cell or an interface between MMEs is used.

FIG. 22 is a sequence diagram in a case of notifying physical resource information that cannot be allocated to cells which may perform DL CoMP.

FIG. 26 is a diagram illustrating a setting procedure in a case where discrimination between support and non-support for DL CoMP is set in a semi-static manner.

FIG. 30 is a sequence diagram of a method of transmitting PUSCH allocation information or uplink HARQ judgment results from one cell in UL CoMP.

FIG. 32 is a sequence diagram in a case where the same judgment results are transmitted from all cells that perform UL CoMP.

EMBODIMENTS FOR CARRYING OUT THE INVENTION

First Embodiment

Figure 1:
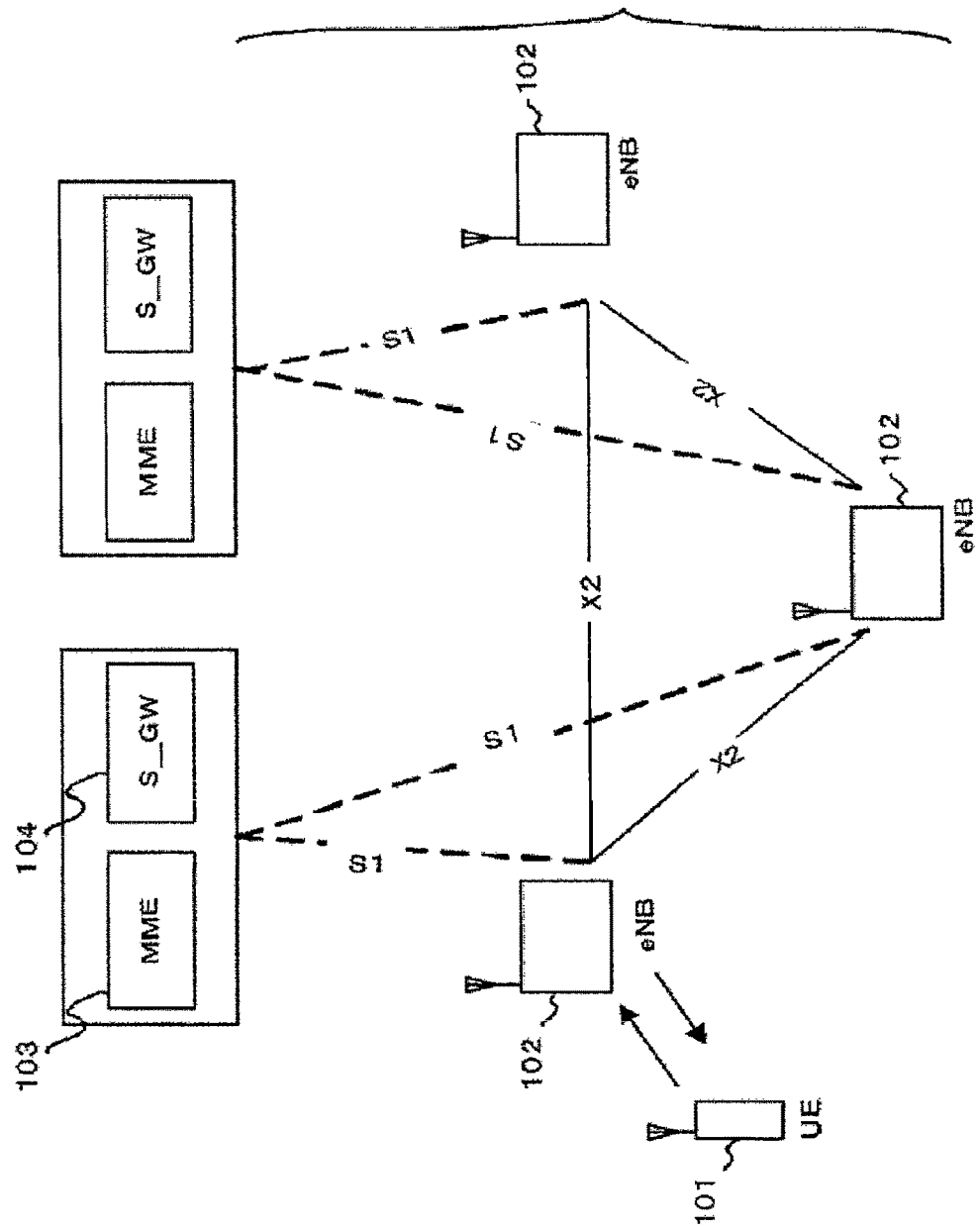
FIG. 1 is a diagram illustrating the configuration of an LTE communication system.
Figure 2:
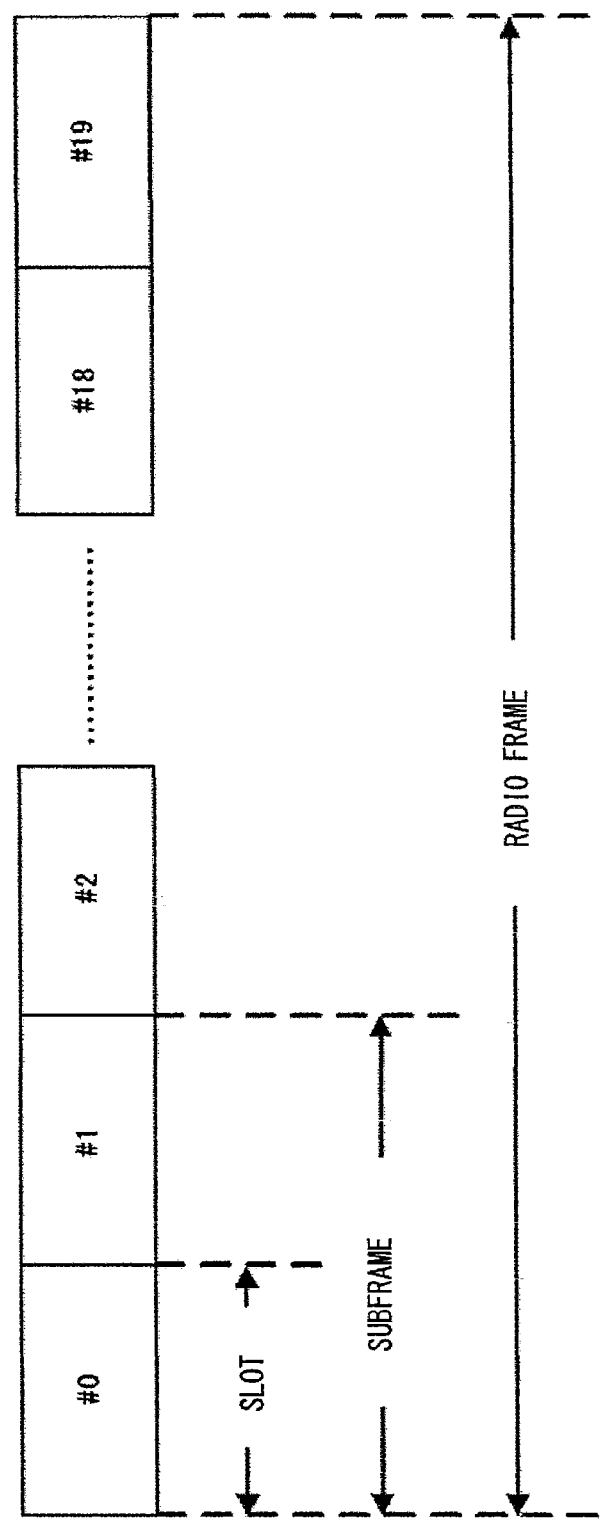
FIG. 2 is a diagram illustrating the configuration of a radio frame used in the LTE communication system.
Figure 3:
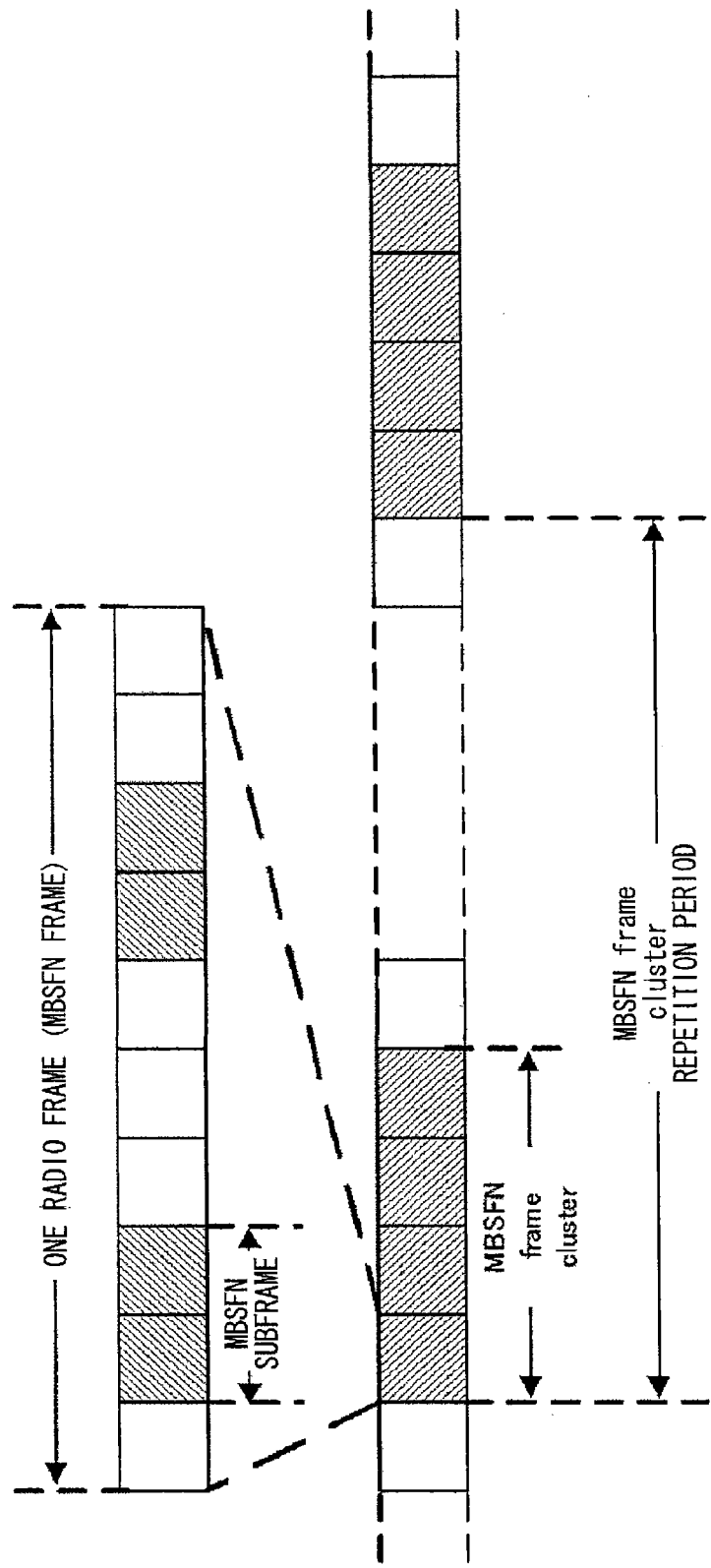
FIG. 3 is a diagram illustrating the configuration of an MBSFN frame.
Figure 7:
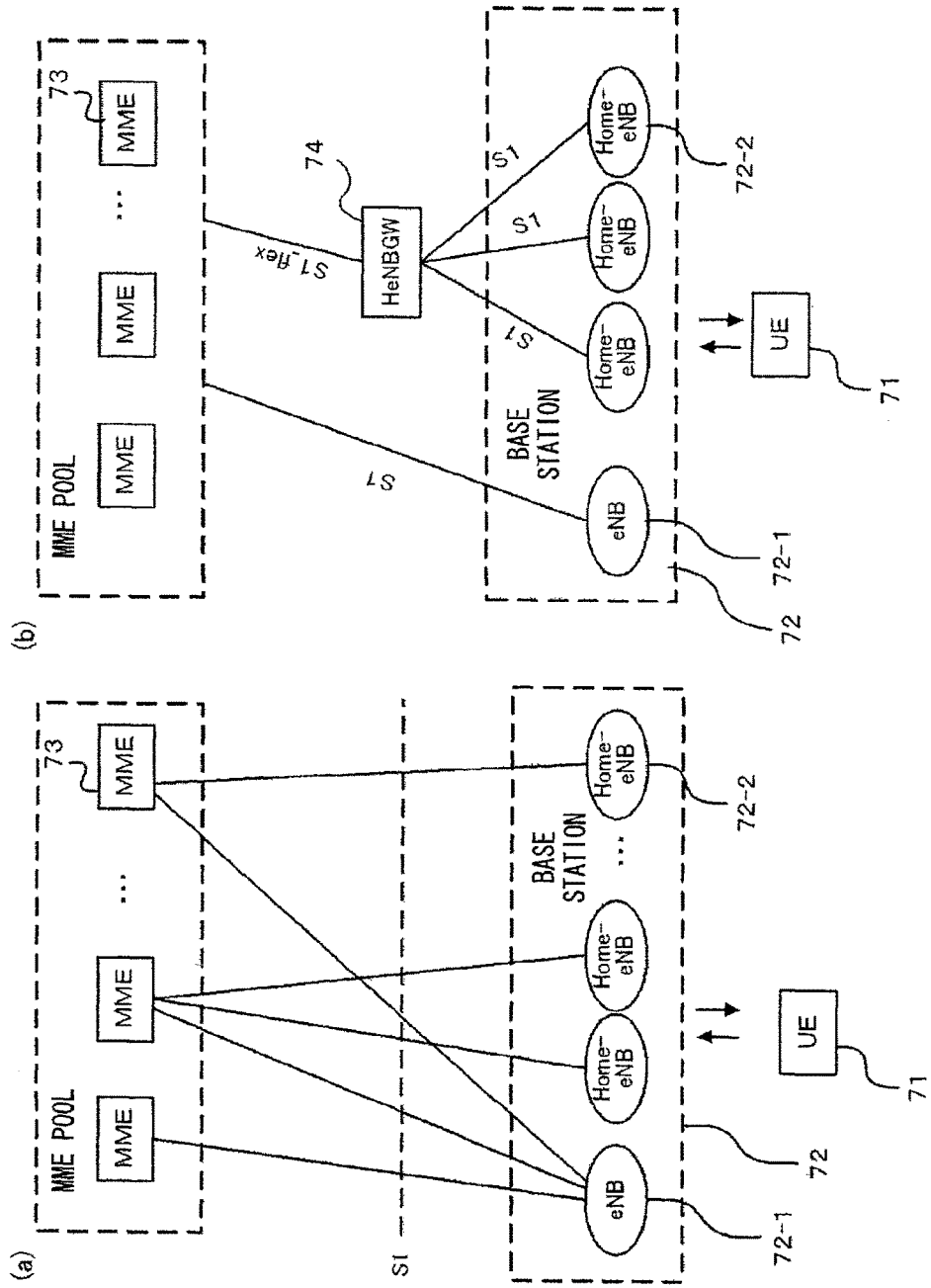
FIG. 7 is a block diagram showing the overall configuration of a mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configurations of parts (a) and (b) of FIG. 7 (Non-Patent Document 1 and Non-Patent Document 3). Part (a) of FIG. 7 is now described. A user equipment (UE) 71 performs transmission/reception to/from a base station 72. The base station 72 is classified into an eNB (non-CSG cell) 72-1 and Home-eNBs (CSG cells) 72-2. The eNB 72-1 is connected to MMEs 73 through S1 interfaces, and control information is communicated between the eNB and the MMES. A plurality of MMEs are connected to one eNB. The Home-eNB 72-2 is connected to the MME 73 through the S1 interface, and control information is communicated between the Home-eNB and the MME. A plurality of Home-eNBs are connected to one MME.

Next, part (b) of FIG. 7 is described. The UE 71 performs transmission/reception to/from the base station 72. The base station 72 is classified into the eNB (non-CSG cell) 72-1 and the Home-eNBs (CSG cells) 72-2. As in part (a) of FIG. 7, the eNB 72-1 is connected to the MMEs 73 through the S1 interface, and control information is communicated between the eNB and the MMEs. A plurality of MMEs are connected to one eNB. While, the Home-eNBs 72-2 are connected to the MMEs 73 through a Home-eNB Gateway (HeNBGW) 74. The Home-eNBs are connected to the HeNBGW through the S1 interfaces, and the HeNBGW 74 is connected to the MMEs 73 through an S1 flex interface S1 flex. One or a plurality of Home-eNBs 72-2 are connected to one HeNBGW 74, and information is communicated therebetween through the S1 interface. The HeNBGW 74 is connected to one or a plurality of MMEs 73, and information is communicated therebetween through the S1 flex interface.

With the configuration of part (b) of FIG. 7, one HeNBGW 74 is connected to the Home-eNBs belonging to the same CSG-ID. As a result, in the case where the same information such as registration information is transmitted from the MIME 73 to a plurality of Home-eNBs 72-2 belonging to the same CSG-ID, the information is transmitted to the HeNBGW 74 and then transmitted to the plurality of Home-eNBs 72-2, with the result that signaling efficiency is enhanced more compared with the case where the information is directly transmitted to each of the plurality of Home-eNBs 72-2. While, in the case where each Home-eNB 72-2 communicates dedicated information with the MME 73, the information is merely caused to pass through the HeNBGW 74 (to be transparent) without being processed, which allows communication in such a manner that the Home-eNB 72-2 is directly connected to the MME 73.

Figure 8:
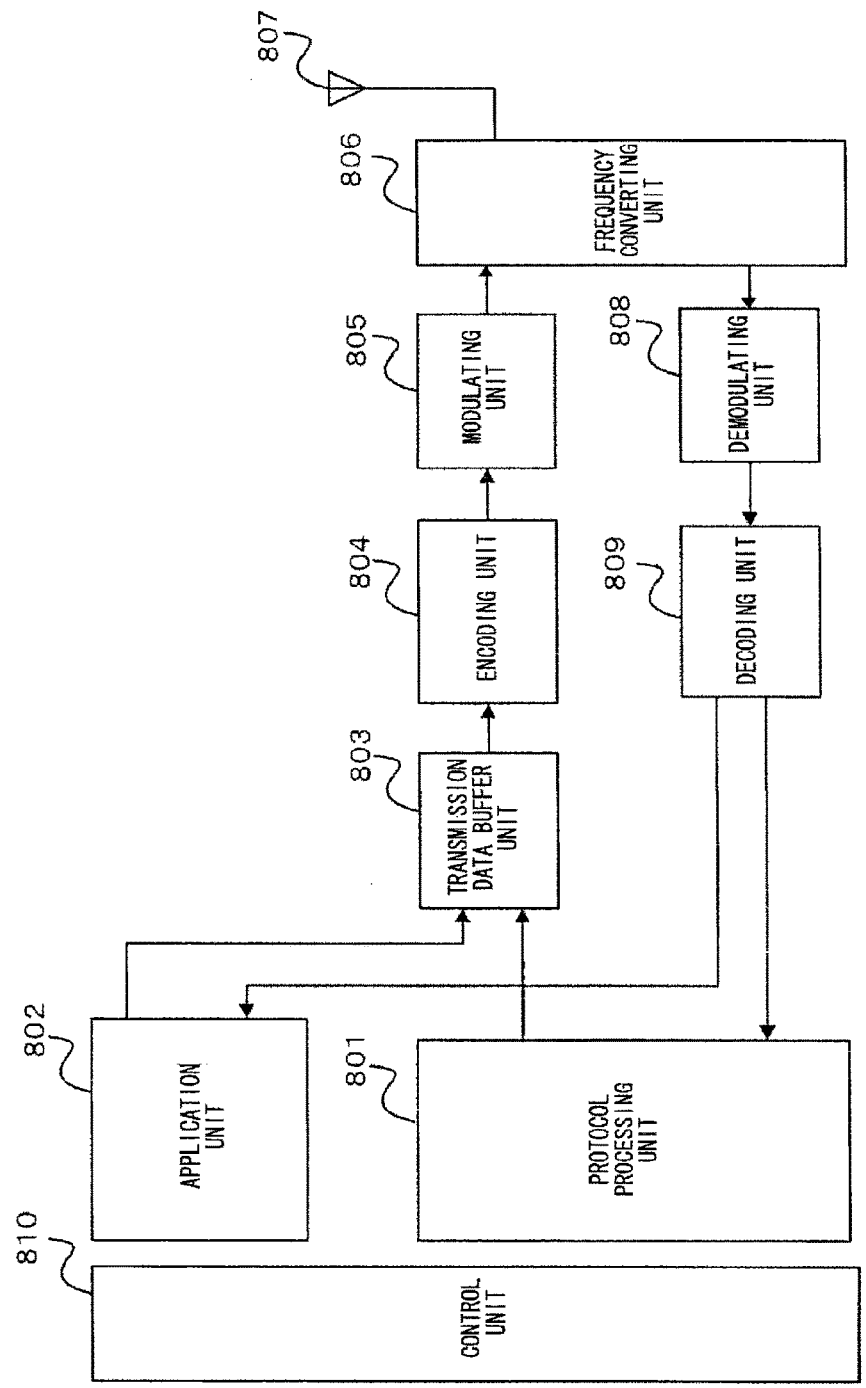
FIG. 8 is a block diagram showing the configuration of a user equipment 71 according to the present invention.

FIG. 8 is a block diagram showing the configuration of the UE (equipment 71 of FIG. 7) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 72. A UE 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

Figure 9:
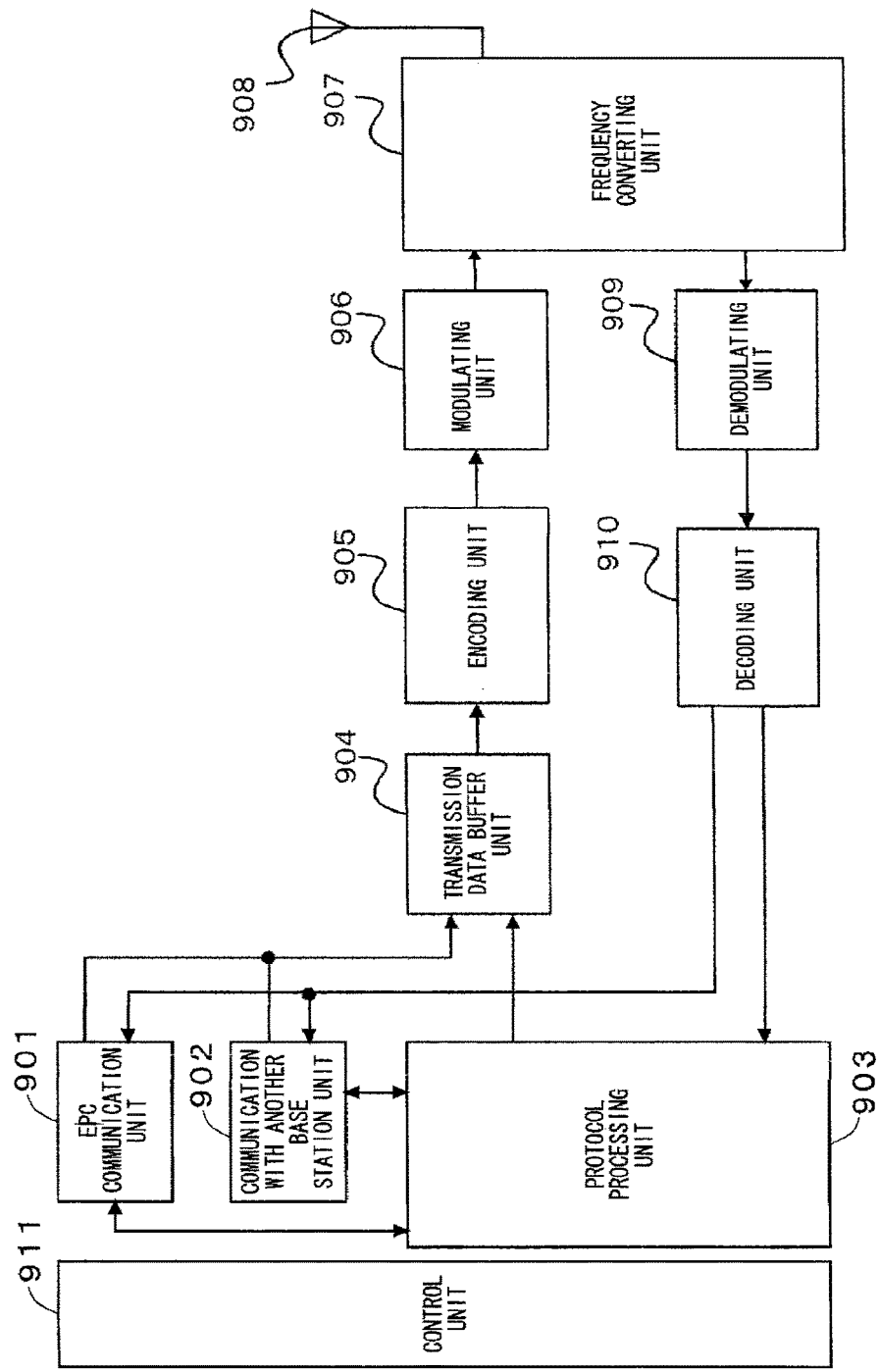
FIG. 9 is a block diagram showing the configuration of a base station 72 according to the present invention.

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

Figure 10:
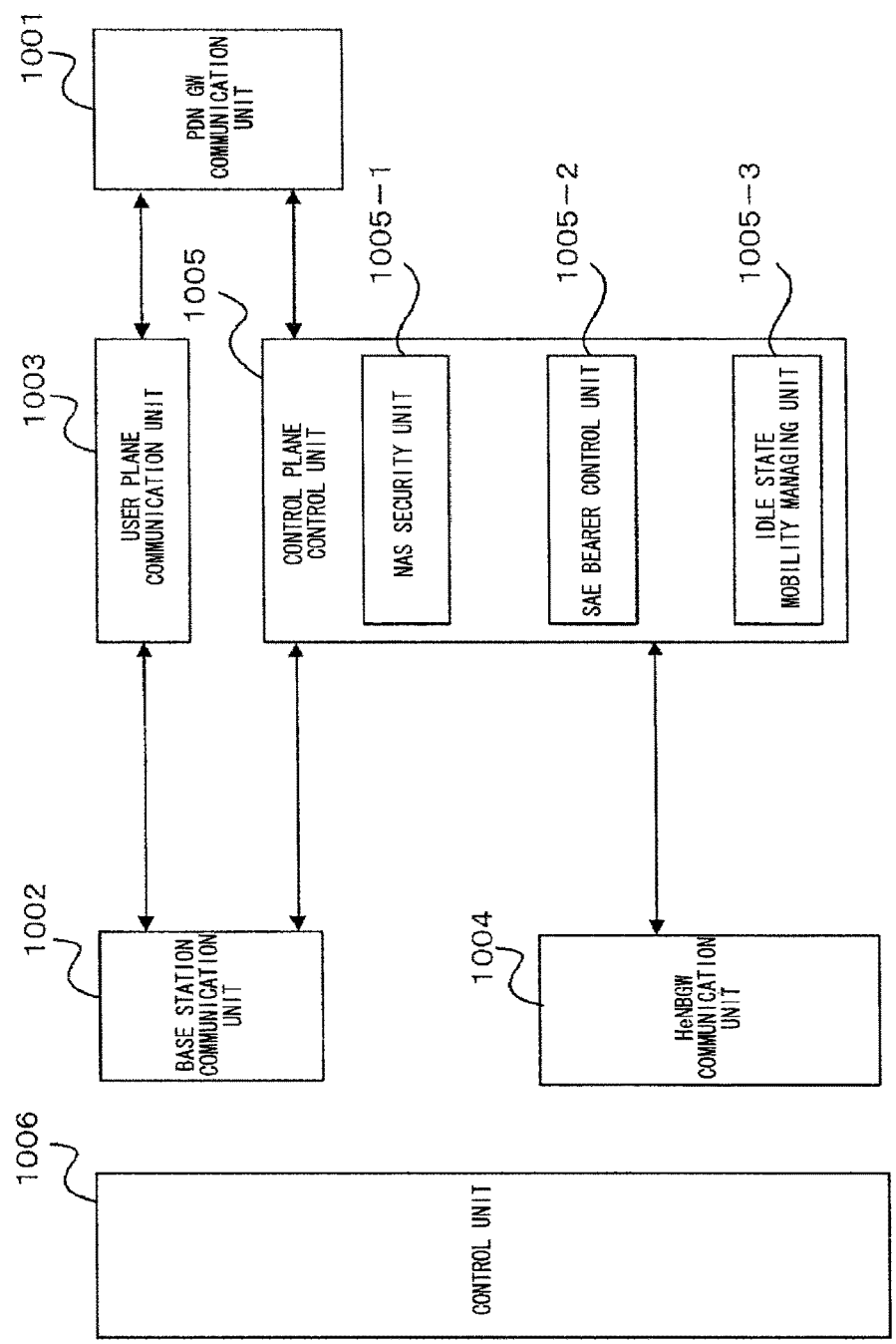
FIG. 10 is a block diagram showing the configuration of an MME according to the present invention.

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, or are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and search of one or a plurality of UEs 71 being served thereby, and tracking area (TA) list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. Although other part of the MME 73 may perform those types of CSG-related management, through execution by the idle state mobility managing unit 1005-3, the method of using a tracking area code in place of a CSG-ID, which is currently under discussion of 3GPP meeting, can be efficiently performed. A series of process by an MME 73 is controlled by a control unit 1006. This means that, though not shown, the control unit 1006 is connected to the respective units (1001 to 1005).

Figure 11:
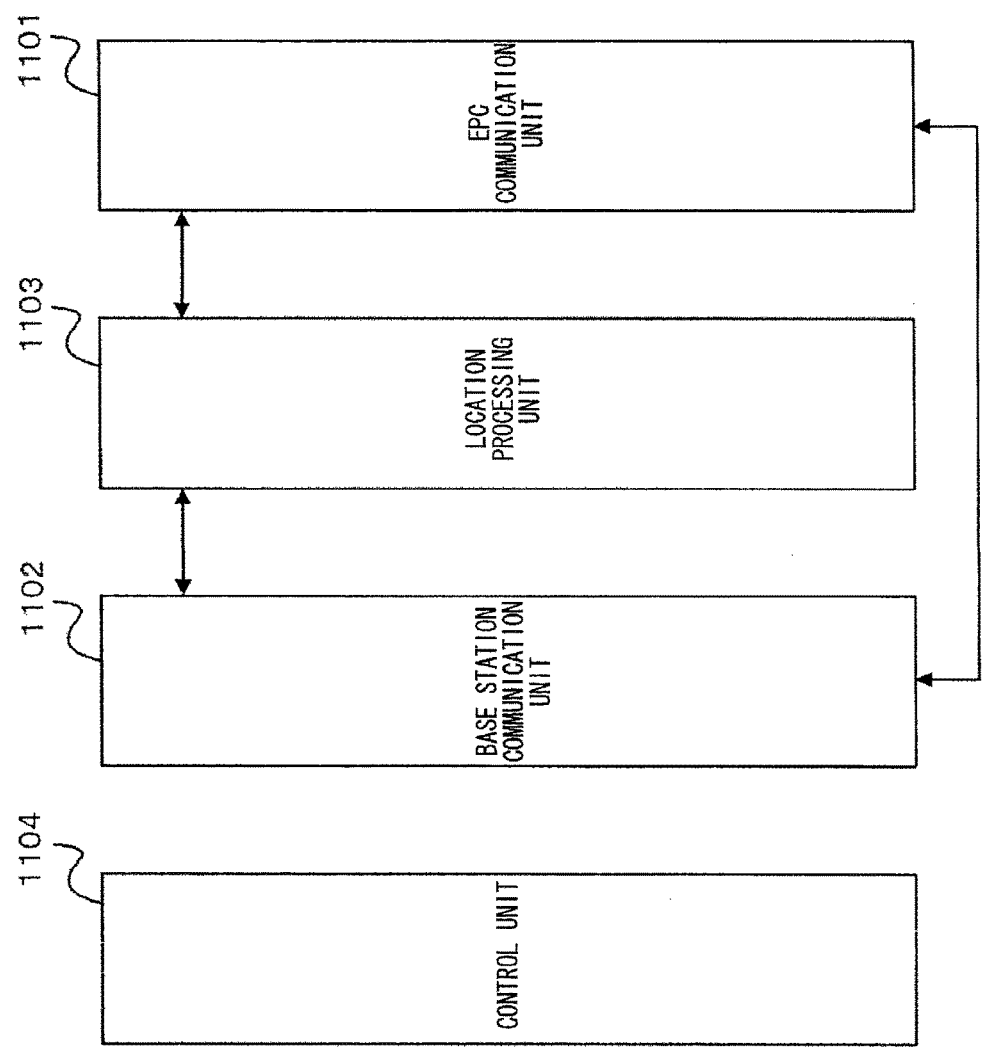
FIG. 11 is a block diagram showing the configuration of a HeNBGW according to the present invention.

FIG. 11 is a block diagram showing the configuration of the HeNBGW according to the present invention. An EPC communication unit 1101 performs data transmission/reception between the HeNBGW 74 and the MME 73 by the S1_flex interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeN-BGW 74 is controlled by a control unit 1104. This means that, though not shown, the control unit 1104 is connected to the respective units (1101 to 1103).

Figure 12:
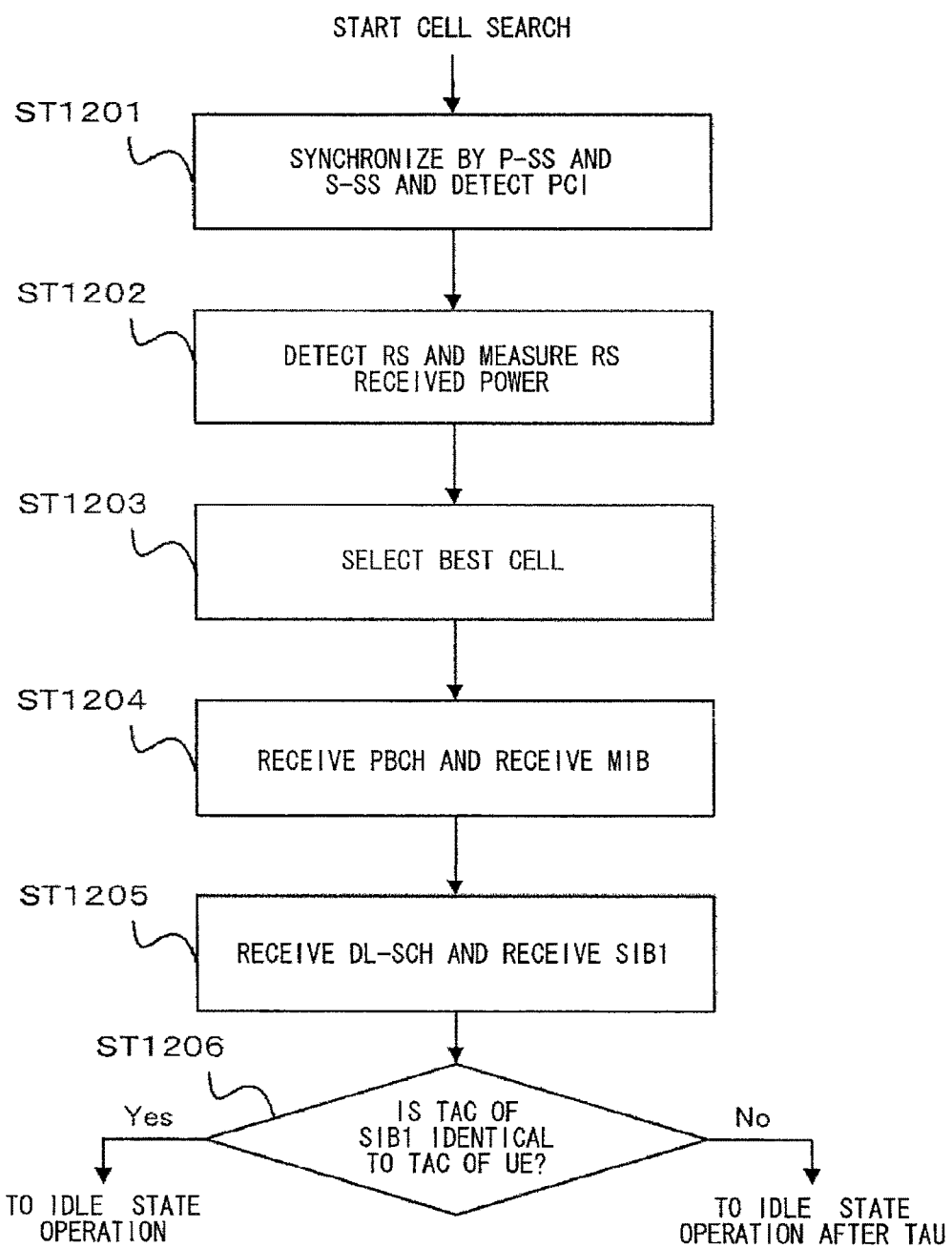
FIG. 12 is a flowchart showing an outline of cell search performed by a user equipment (LE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in Step ST1201, which makes it possible to detect the RS and measure the RS received power. Next, in Step ST1203, the cell having the best RS reception quality (for example, cell having the highest RS received power; best cell) is selected from one or more cells that have been detected up to Step ST1202. In Step ST1204, next, the PBCH of the best cell is received, and the BCCH that is the broadcast information is obtained. A master information block (MIB) containing the cell configuration information is mapped on the BCCH on the PBCH. Examples of MIB information include the down link (DL) system bandwidth, the number of transmission antenna and system frame number (SFN).

In Step ST1205, next, the DL-SCH of the cell is received based on the cell configuration information of the MIB, to thereby obtain a system information block (SIB) 1 of the broadcast information BCCH. The SIB1 contains the information regarding access to the cell, information regarding cell selection and scheduling information of other SIB (SIBk; k is an integer equal to or larger than 2). In addition, the SIB1 contains a tracking area code (TAC). In Step ST1206, next, the UE compares the TAC received in Step ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU accept signal to the UE. The UE rewrites (updates) the TAC (or TAC list) of the UE. After that, the UE enters the idle state operation in the cell.

Figure 13:
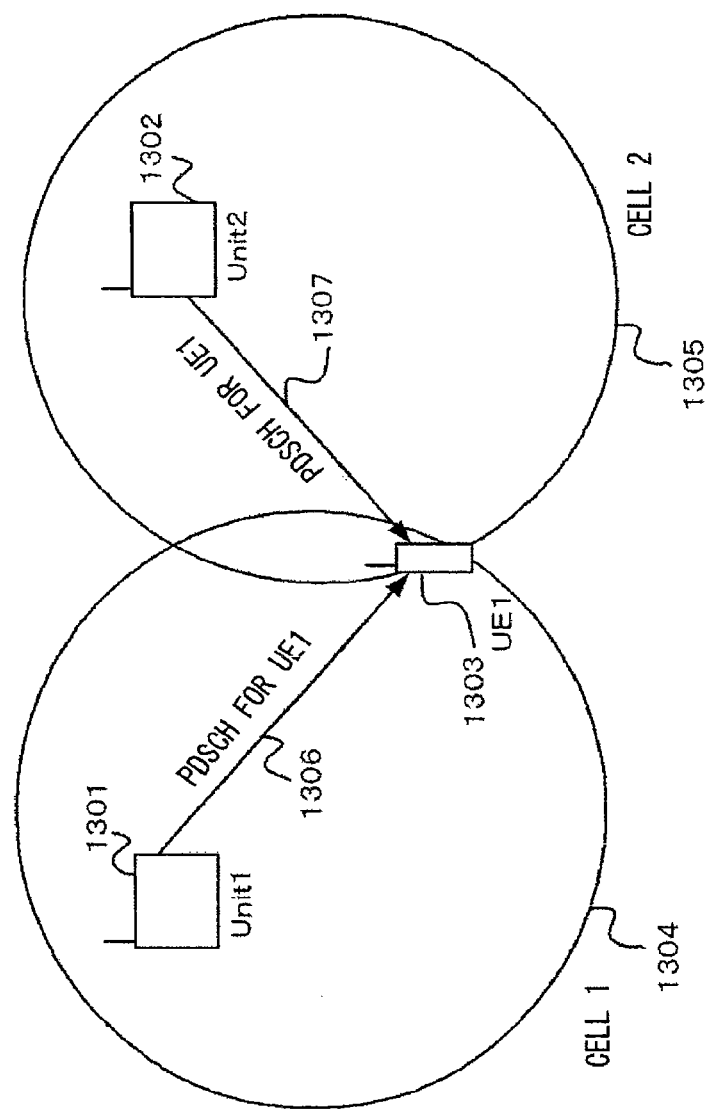
FIG. 13 is a conceptual diagram of DL CoMP studied by 3GPP.

DL CoMP is studied as a new technique for LTE-A. FIG. 13 is a conceptual diagram of DL CoMP currently studied by 3GPP. A multi-point unit 1 (unit 1) 1301 and a multi-point unit 2 (unit 2) 1302 are units that perform DL CoMP, that is, downlink coordinated multiple point transmission. 1304 denotes a cell 1 formed by the unit 1, and 1305 denotes a cell 2 formed by the unit 2. 1303 denotes a user equipment (UE 1) that is a DL CoMP target. FIG. 13 shows DL CoMP in a case of joint processing. In DL CoMP, the PDSCHs are transmitted from a plurality of points of multi-point cells to one UE. That is, the same PDSCH is transmitted from the cell 1 and the cell 2 to the UE 1 (1306, 1307). The reception quality of the UE 1 can be improved by combination of the PDSCHs transmitted from the cell 1 and the cell 2. The UE located at the cell edge is a CoMP target for increasing the coverage of higher data rates, improving the cell-edge throughput, and increasing the system throughput, which are aimed in DL CoMP.

Figure 14:
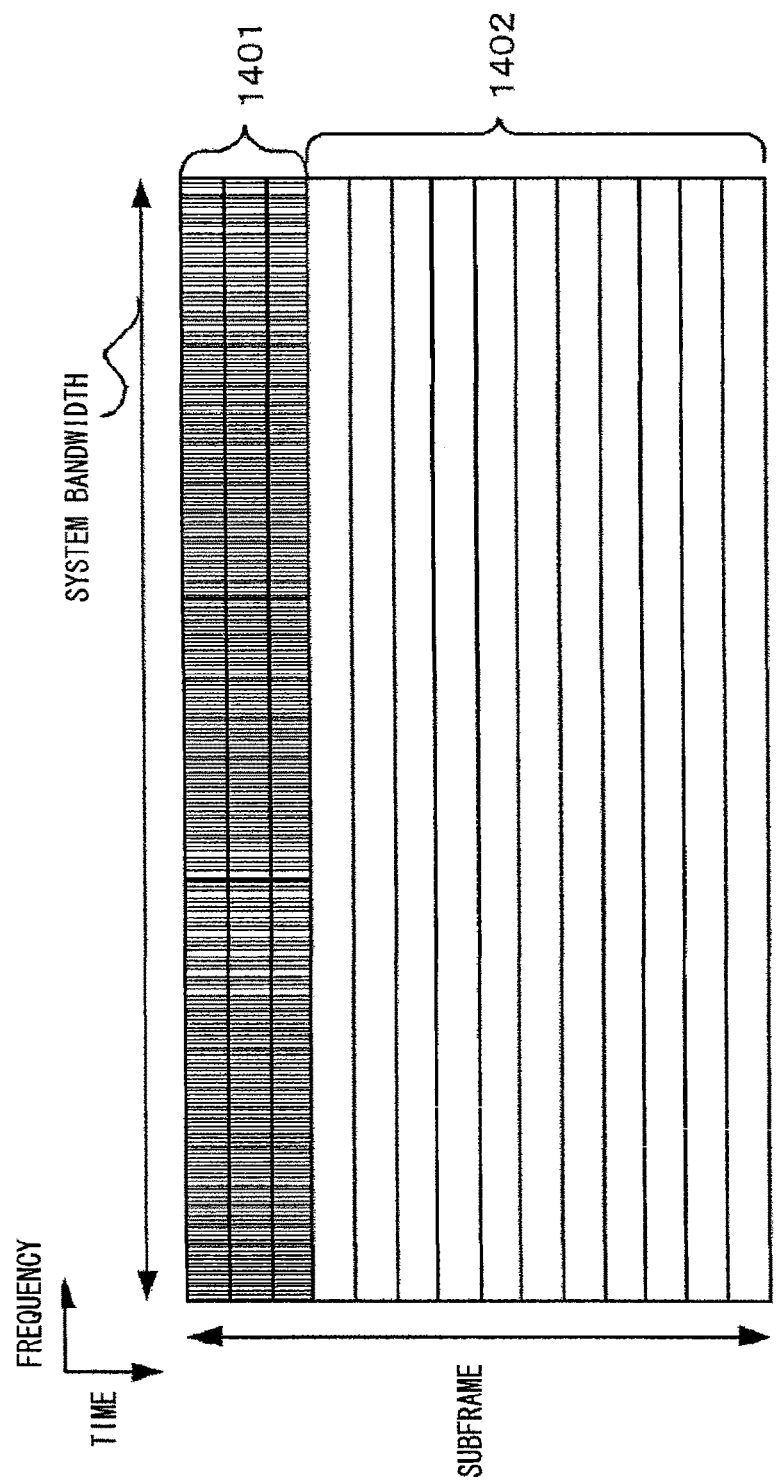
FIG. 14 is a diagram illustrating downlink physical resources in LTE-A.

FIG. 14 is a diagram illustrating downlink physical resources in LTE-A. A horizontal direction and a vertical direction represent a frequency and time, respectively. The configuration of downlink physical resources of LTE-A is basically identical to that of LTE. In the diagram, one subframe is shown. In LTE (LTE-A), one subframe corresponds to one transmission time interval (TTI). The PDCCH, PHICH and PFICH are allocated to the first one, first two or first three symbols of one subframe (1401). The PDSCH is allocated to the remaining symbols except for the above-mentioned symbols (1402). Therefore, the physical resources where DL CoMP, that is, downlink coordinated multiple point transmission is performed correspond to the physical resources of FIG. 14 to which the PDSCH is allocated.

Synchronization is performed between cells (multi-point cells) that perform DL CoMP, and the same physical resource (resource block) is allocated to the PDSCHs transmitted from respective cells (multi-point cells). This enables the UE 1 (1303) to combine the received PDSCHs (1306, 1307) as shown in FIG. 13.

3GPP is studying that a serving cell (or anchor cell) allocates the PDSCH physical resources in a case where DL CoMP is performed. DL CoMP is performed by a plurality of multi-point cells including the serving cell. The allocation information of physical resources to which the PDSCHs are allocated is transmitted to a UE on the PDCCH of any one of cells. The serving cell is studied as this any one of cells that perform DL CoMP. Alternatively, in a case where an anchor cell is provided as the cell that schedules the coordinated transmission of DL CoMP, it is studied that one cell that transmits the allocation information is used as the anchor cell.

The method of notifying the physical resource allocation information of PDSCH has not been determined by 3GPP. It can be realized that physical resource allocation of the PDSCH is performed in advance from the serving cell (anchor cell) to the other cell that performs DL CoMP by means of an interface X2 and/or interface S1. The interface X2 is an interface between cells (base stations), and the interface S1 is an interface between a cell and a core network (such as MME).

As shown in FIG. 5, the downlink transport channels mapped to the PDSCH are classified into the DL-SCH and PCH. As shown in FIG. 6, the downlink logical channels mapped to the DL-SCH are classified into the BCCH, CCCH, DCCH, DTCH, MCCH and MTCH. On the other hand, the downlink logical channel mapped to the PCH is the PCCH as shown in FIG. 6.

Those logical channels each have a different number of target UEs to be transmitted in accordance with a type thereof. For example, the broadcast information is mapped on the BCCH, which is broadcast to all UEs being served by a cell. While, the dedicated data to one UE is mapped on the DTCH, which is transmitted only to one UE being served by a cell.

Along with an increase in the number of target UEs to which a logical channel is transmitted, the number of UEs targeted for DL CoMP increases as well. This is because the existence probability of UEs located at the cell edge also increases along with an increase in the number of UEs being transmission targets. As a result of an increase in the number of UEs to which DL CoMP is applied, the radio resources required for DL CoMP increase, which considerably reduces the usage efficiency of radio resources. The throughput of the UE to which DL CoMP is applied increases, while the throughput as a system decreases. An increase in the number of UEs to which DL CoMP is applied causes a problem of an increase in information amount of physical resource allocation information of the PDSCH to the UEs to which DL CoMP is applied, the information being notified from the cell that schedules coordinated transmission of DL CoMP to the other cell that performs DL CoMP.

The case where the BCCH is subjected to DL CoMP is described as an example where the problem that the throughput as a system decreases arises due to an increase in the number of UEs to which DL CoMP is applied.

The information to be broadcast to all UEs being served by a cell, such as system information of a cell, is mapped on the BCCH. The BCCH is mapped to the transport channel DL-SCH and is further mapped to the physical channel PDSCH, to thereby be transmitted to all UEs being served by a cell. Scheduling such as physical resource allocation of the PDSCH is set for each cell.

The case where any one of UEs whose serving cell is the cell is located at the cell edge is taken as an example. When DL CoMP is applied to the UE located at the cell edge, the PDSCH is also transmitted from the other cell that performs CoMP, with the same physical resource. Any one of UEs whose serving cell is the cell is highly likely to be located at any cell edge, and it could be said that it is located there almost all the time. As a result, the PDSCH to which the BCCH of the cell is mapped is subjected to CoMP with any neighboring cell in the vicinity thereof almost all the time. This holds true for neighboring cells as well.

That is, taking one cell, the cell has to transmit not only the PDSCH to which the BCCH of the cell is mapped but also the PDSCH to which the BCCH of a neighboring cell is mapped, almost all the time.

Figure 15:
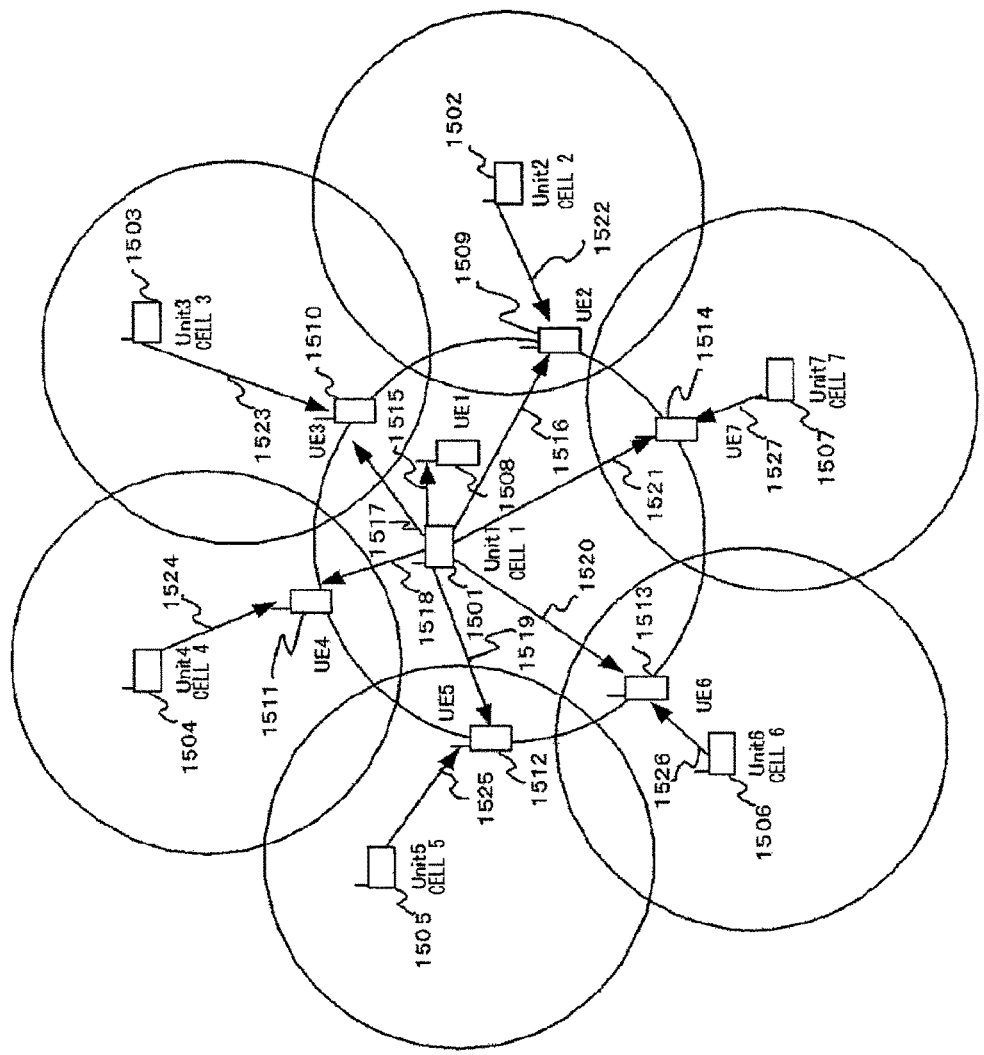
FIG. 15 is a diagram illustrating a case where a PDSCH to which a BCCH has been mapped is subjected to CoMP.

FIG. 15 is a diagram illustrating the case where the PDSCH to which the BCCH is mapped is subjected to CoMP. 1501 denotes a multi-point unit 1 (cell 1), and a multi-point unit 2 (cell 2) (1502), a multi-point unit 3 (cell 3) (1503), a multi-point unit 4 (cell 4) (1504), a multi-point unit 5 (cell 5) (1505), a multi-point unit 6 (cell 6) (1506) and a multi-point unit 7 (cell 7) (1507) are arranged in the vicinity thereof.

A UE 1 (1508) is a user equipment whose serving cell is the cell 1. Similarly, a UE 2 (1509) is a UE targeted for DL CoMP between the cell 2 and the cell 1, whose serving cell is the cell 2. A UE 3 (1510) is a UE targeted for DL CoMP between the cell 3 and the cell 1, whose serving cell is the cell 3. A UE 4 (1511) is a UE targeted for DL CoMP between the cell 4 and the cell 1, whose serving cell is the cell 4. A UE 5 (1512) is a UE targeted for DL CoMP between the cell 5 and the cell 1, whose serving cell is the cell 5. A UE 6 (1513) is a UE targeted for DL CoMP between the cell 6 and the cell 1, whose serving cell is the cell 6. A UE 7 (1514) is a UE targeted for DL CoMP between the cell 7 and the cell 1, whose serving cell is the cell 7.

1515 denotes the PDSCH to which the BCCH to be transmitted to the UE being served by the cell 1 is mapped. The UE 1 receives the PDSCH (1515). 1522 denotes the PDSCH to which the BCCH to be transmitted to the UE being served by the cell 2 is mapped. The UE 2 receives the PDSCH (1522). 1523 denotes the PDSCH to which the BCCH to be transmitted to the UE being served by the cell 3 is mapped. The UE 3 receives the PDSCH (1523). 1524 denotes the PDSCH to which the BCCH to be transmitted to the UE being served by the cell 4 is mapped. The UE 4 receives the PDSCH (1524). 1525 denotes the PDSCH to which the BCCH to be transmitted to the UE being served by the cell 5 is mapped. The UE 5 receives the PDSCH (1525). 1526 denotes the PDSCH to which the BCCH to be transmitted to the UE being served by the cell 6 is mapped. The UE 6 receives the PDSCH (1526). 1527 denotes the PDSCH to which the BCCH to be transmitted to the UE being served by the cell 7 is mapped. The UE 7 receives the PDSCH (1527).

The PDSCH 1516 to which the BCCH is mapped is transmitted from the cell 2 to the UE 2 and is also transmitted from the cell 1 to the UE 2 by DL CoMP. The same holds true for the cell 3 to the cell 7, and the PDSCHs 1517 to 1521 to which the BCCH is mapped are transmitted from the cell 3 to the cell 7 to the UE 3 to UE 7, respectively, and are also transmitted from the cell 1 to the UE 3 to UE 7, respectively. In this case, accordingly, the cell 1 has to transmit not only the PDSCH to which the BCCH of own cell (cell 1) is mapped but also the PDSCH to which the BCCHs of the neighboring cells are mapped.

Figure 16:
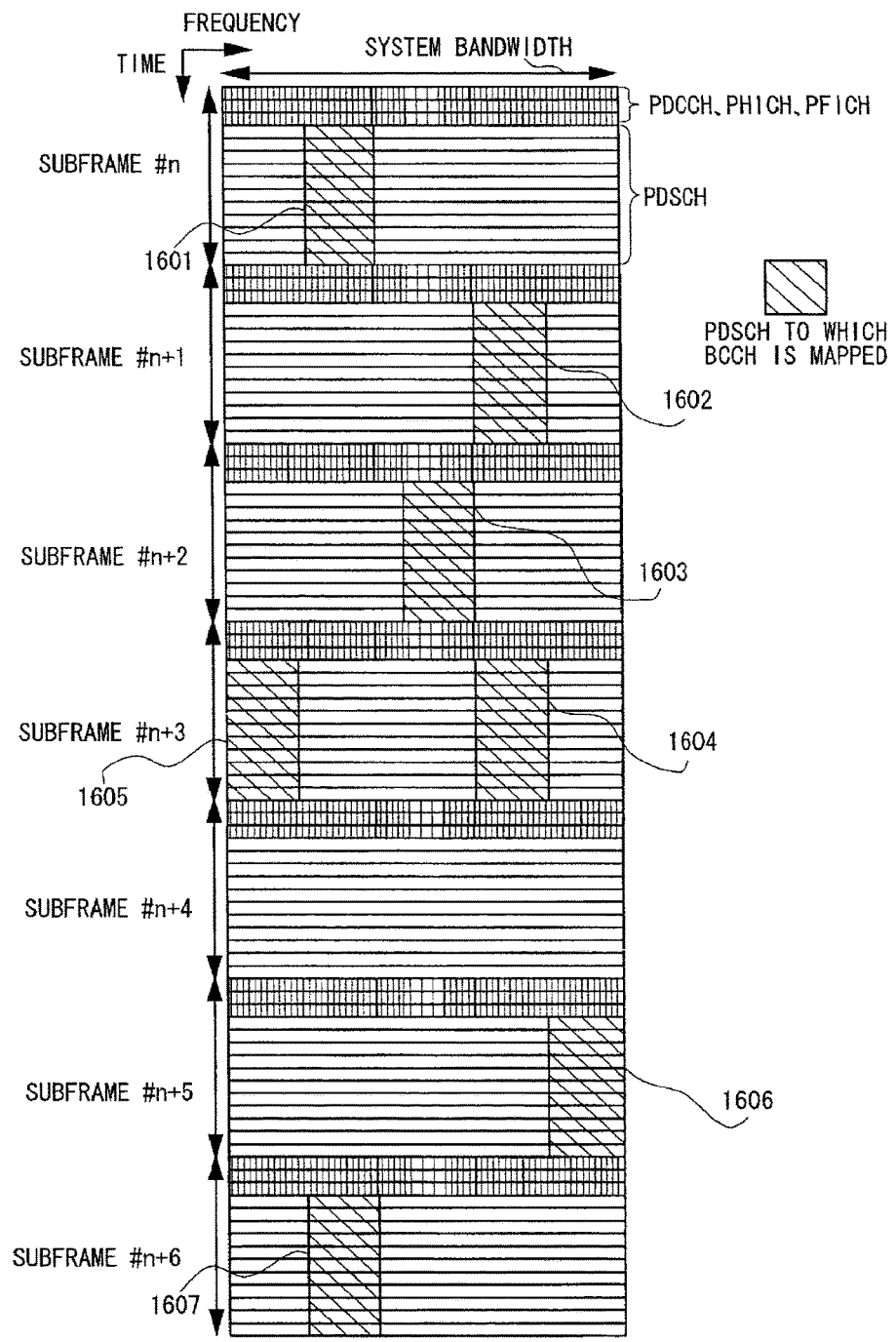
FIG. 16 is a diagram illustrating allocation of downlink physical resources of a cell that performs DL CoMP with neighboring cells.

FIG. 16 is a diagram illustrating downlink physical resource allocation of the cell 1 that performs DL CoMP with a neighboring cell. The horizontal axis and vertical axis represent a frequency and time, respectively. In the diagram, a system band is shown in the horizontal axis direction, and a plurality of subframes each composed of 14 symbols are shown in the vertical axis direction. One subframe is 1TTI.

The PDSCH to which the BCCH of the cell 1 (own cell) is mapped is allocated to a partial domain 1601 of a subframe #n. The PDSCH to which the BCCH of the cell 2 (neighboring cell) is mapped is allocated to a partial domain 1602 of a subframe #n+1. The PDSCH to which the BCCH of the cell 3 (neighboring cell) is mapped is allocated to a partial domain 1603 of a subframe #n+2. The PDSCHs to which the BCCHs of the cell 4 (neighboring cell) and the cell 5 (neighboring cell) are mapped are allocated to a partial domain 1604 and a partial domain 1605 of a subframe #n+3, respectively. The PDSCH to which the BCCH of the cell 6 (neighboring cell) is mapped is allocated to a partial domain 1606 of a subframe #n+5. The PDSCH to which the BCCH of the cell 7 (neighboring cell) is mapped is allocated to a partial domain 1607 of a subframe #n+6.

As described above, the cell 1 has to allocate the PDSCHs to which the BCCHs of own cell and the neighboring cells are mapped to the physical resources and then transmit those, which considerably decreases the usage efficiency of radio resources. This results in an increase in throughput of the UE to which CoMP is applied, but leads to a decrease in throughput as a system.

Figure 17:
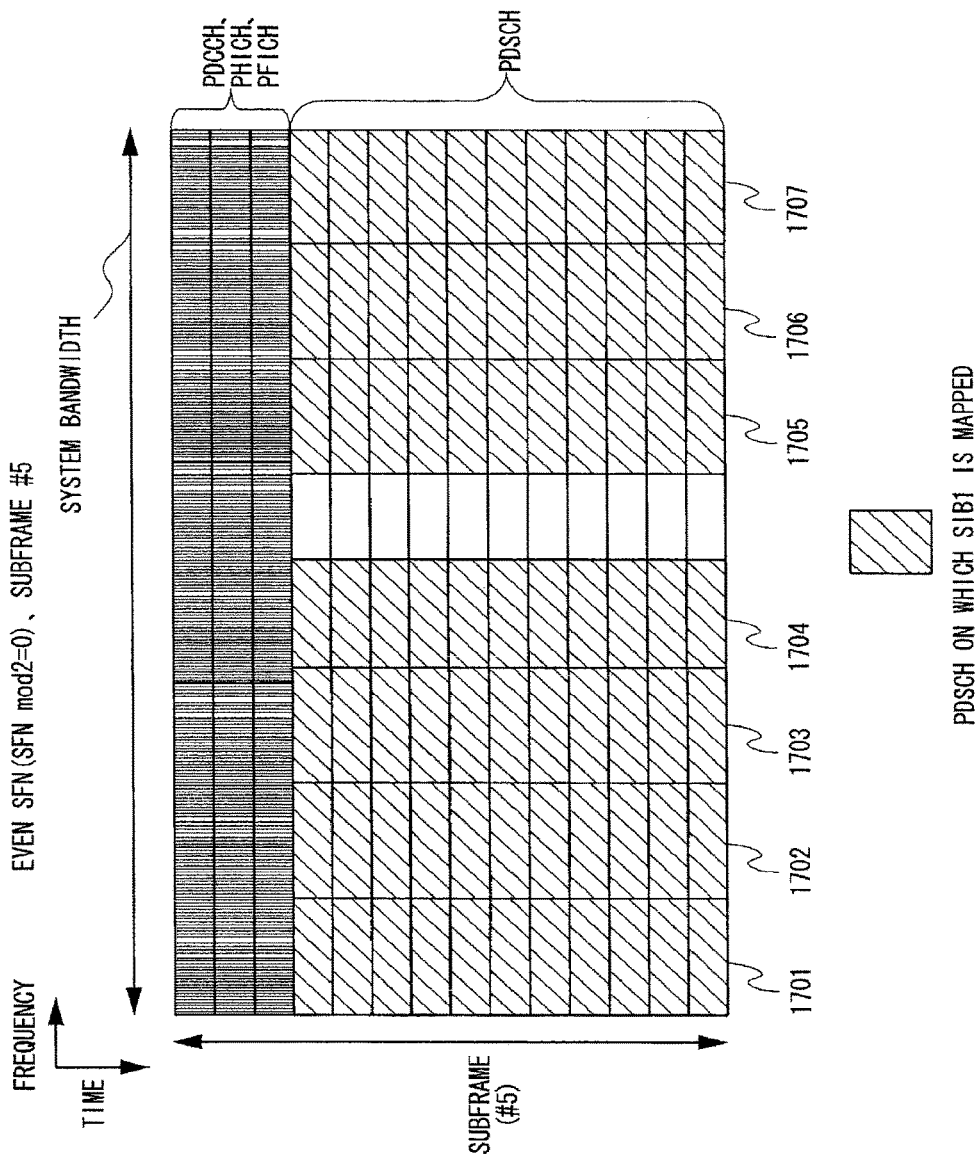
FIG. 17 is a diagram illustrating physical resource allocation in a case of a BCCH on which a SIB1 of broadcast information is mapped.

FIG. 17 is a diagram illustrating physical resource allocation in a case of the BCCH on which a system information block 1 (SIB1) of the broadcast information is mapped. A domain 1701 is a physical resource to which the PDSCH, to which the SIB1 of the cell 1 is mapped, is allocated. A domain 1702 is a physical resource to which the PDSCH, to which the SIB1 of the cell 2 is mapped, is allocated. A domain 1703 is a physical resource to which the PDSCH, to which the SIB1 of the cell 3 is mapped, is allocated. A domain 1704 is a physical resource to which the PDSCH, to which the SIB1 of the cell 4 is mapped, is allocated. A domain 1705 is a physical resource to which the PDSCH, to which the SIB1 of the cell 5 is mapped, is allocated. A domain 1706 is a physical resource to which the PDSCH, to which the SIB1 of the cell 6 is mapped, is allocated. A domain 1707 is a physical resource to which the PDSCH, to which the SIB1 of the cell 7 is mapped, is allocated. The radio frame number (system frame number (SFN)) and the subframe number for transmitting the PDSCH to which the SIB1 is mapped are determined in advance for all cells. The first transmission of the SIB1 is the subframe number 5 of the SFN being a multiple of 8, and its repetition is transmitted on the other all subframe numbers 5 of the SFNs being multiples of 2.

Accordingly, as shown in the diagram, on the subframe number 5 of the SFNs being multiples of 2, the physical resource allocation is performed not only for the PDSCH to which the BCCH, on which the SIB1 of own cell is mapped, is mapped but also for the PDSCHs to which the BCCH, on which the SIB1 of the neighboring cell that performs CoMP is mapped, is mapped.

This leads not only to a case where the usage efficiency of radio resources decreases considerably, but also to a case where the allocations of other PDSCHs cannot be made due to a shortage of radio resources or a case where even the PDSCH of the neighboring cell that performs CoMP cannot be allocated. This reduces the throughput as a system as well as makes the operation as a system unstable.

In order to solve the above-mentioned problem, the present embodiment discloses the discrimination between support and non-support for DL CoMP in accordance with the type of a logical channel. Here, support for DL CoMP refers to the transmission using DL CoMP, that is, the transmission by a plurality of base stations in a coordinated manner. Non-support for DL CoMP refers to the transmission without using DL CoMP, that is, the transmission by a base station that is not coordinated with another base station.

As a result of the support/non-support for DL CoMP being discriminated in accordance with the type of a logical channel as described above, it is possible to set support/non-support for DL CoMP in accordance with the number of UEs being transmission targets on a logical channel. This solves, for example, the problem that arises in the case of a large number of UEs being transmission targets as described above. In addition, CoMP can be set finely in accordance with a communication method, whereby it is possible to improve the usage efficiency of radio resources as a system. This increases the throughput as a system. Moreover, discrimination for each logical channel achieves an effect that control at the base station is made simpler and an effect that coordinated transmission control between base stations is made simpler.

For example, discrimination is made between a logical channel dedicatedly transmitted to a UE and other logical channel, where the PDSCH to which the former logical channel is mapped is made to support DL CoMP, whereas the PDSCH to which the latter logical channel is mapped is made not to support DL CoMP.

Differently from the logical channel on which the information is to be broadcast to all UEs being served by a cell is mapped, the logical channel dedicatedly transmitted to one UE is transmitted only to the UE only in a case where the transmission data for the UE is generated. Accordingly, the UE that transmits the logical channel is seldom located at the cell edge. Therefore, even when DL CoMP is performed on the UE located at the cell edge, the usage efficiency of radio resources is not deteriorated considerably as described above. Therefore, discrimination is made between a logical channel dedicatedly transmitted to one UE and the other logical channel, and the former logical channel is made to support DL CoMP, whereas the latter logical channel is made not to support DL CoMP. Accordingly, a throughput is increased by DL CoMP, which makes it possible to increase the throughput as a system.

As another example, discrimination is made between the dedicated logical channels (DTCH, DCCH) and other logical channels, and the PDSCH to which the dedicated logical channels (DTCH, DCCH) are mapped is made to support DL CoMP, whereas the PDSCH to which the other logical channels are mapped is made not to support DL CoMP.

The dedicated logical channels (DTCH, DCCH) are logical channels dedicatedly transmitted to one UE, whereby similar effects to those of the above-mentioned example can be achieved. In addition, the logical channels supporting DL CoMP are limited to the DTCH and DCCH, and accordingly the number of UEs to which DL CoMP is applied is prevented from increasing, which makes it possible to further increase the throughput as a system. Moreover, the communication state of the UE to which DL CoMP is applied is limited, whereby it is possible to make the DL CoMP control, that is, coordinated transmission control between multi-cells, simpler.

As another example, discrimination is made between the logical channel for broadcast (BCCH) and other logical channels, and the PDSCH to which the logical channel for broadcast (BCCH) is mapped is made not to support DL CoMP, whereas the PDSCH to which other logical channels are mapped is made to support DL CoMP.

The logical channel for broadcast (BCCH) is broadcast to all UEs being served by a cell, which is a channel that causes the above-mentioned problem most among the logical channels. Therefore, when the PDSCH to which the channel (BCCH) is mapped is made not to support DL CoMP, the usage efficiency of radio resources is prevented from decreasing, and the throughput as a system can be increased as a result of an increase in throughput by DL CoMP of the PDSCH to which other logical channels are mapped.

As another example, discrimination is made between the logical channels for MBMS (MTCH, MCCH) and other logical channels, and the PDSCH to which the logical channels for MBMS (MTCH, MCCH) are mapped is made not to support DL CoMP, whereas the PDSCH to which other logical channels are mapped is made to support DL CoMP.

The MBMS-related information used for MBMS, such as MBMS data and control information, is mapped on the logical channels for MBMS (MTCH, MCCH). In a case of single cell transmission in which the MBMS-related information is transmitted from one cell, the logical channels for MBMS are mapped to the DL-SCH and then mapped to PDSCH, to be transmitted to the UE that is capable of receiving MBMS and/or receives MBMS service. A plurality of UEs may receive the MBMS service of the cell, and thus the number of UEs to which the logical channels for MBMS (MTCH, MCCH) are transmitted is not limited to one but may be multiple in some cases. The number of target UEs increases, and accordingly the MBMS logical channels (MTCH, MCCH) are apt to cause the above-mentioned problem. Therefore, the PDSCH to which the channels (MTCH, MCCH) are mapped is made not to support DL CoMP, and accordingly the usage efficiency of radio resources can be prevented from decreasing, and the throughput as a system can be increased as a result of an increase in throughput by DL CoMP of the PDSCH to which other logical channels are mapped.

As another example, discrimination is made between the logical channel for paging message (PCCH) and other logical channels, and the PDSCH to which the logical channel for paging message (PCCH) is mapped is made not to support DL CoMP, whereas the PDSCH to which the other logical channels are mapped is made to support DL CoMP.

The paging message contains information related to paging and/or information related to system information change (BCCH modify information) and/or information related to earthquake and tsunami warning system (ETWS) notification (ETWS indication). For example, in a case where the ETWS notification is provided when an earthquake occurs, the cell broadcasts a paging message to all UEs being served thereby. The paging message is mapped on the PCCH, and the PCCH is mapped to the PCH and is then mapped to the PDSCH to be broadcast to all UEs being served. If the PDSCH to which the PCCH is mapped is made to support DL CoMP in a case where the ETWS notification needs to be transmitted also by the neighboring cells, a large amount of radio resources is required for DL CoMP as described above in ETWS notification. This makes it impossible to secure radio resources for other PDSCH, for example, the PDSCH for a call by a user in a critical situation, such as a user hit by an earthquake. In order to solve the above-mentioned problem, discrimination is made between the logical channel for paging message (PCCH) and other logical channels, and the PDSCH to which the logical channel for paging message (PCCH) is mapped is made not to support DL CoMP. This prevents a decrease in usage efficiency of radio resources, and the throughput as a system can be increased as a result of an increase in throughput by DL CoMP of the PDSCH to which the other logical channels are mapped.

As another example, discrimination is made between the logical channels for broadcast, MBMS and paging message (BCCH, MTCH, MCCH, PCCH) and other logical channels, and the PDSCH to which the former logical channels (BCCH, MTCH, MCCH, PCCH) are mapped may be made not to support DL CoMP and the PDSCH to which the other logical channels are mapped may be made to support DL CoMP. This enables to make the logical channels, where the number of UEs being CoMP targets is large, not support CoMP, whereas the other logical channels, where the number of UEs being CoMP targets is few, support CoMP. This further prevents a decrease in usage efficiency of radio resources, and the throughput as a system can be further increased as a result of an increase in throughput by DL CoMP of the PDSCH to which other logical channels are mapped.

Next, an operation is disclosed. The present embodiment discloses that discrimination is made between support and non-support for DL CoMP in accordance with the type of a logical channel. What logical channel of the logical channels is made to support/not to support CoMP is predefined.

As an example, description is given of a case where discrimination is made between the dedicated logical channels (DTCH, DCCH) and other logical channels such that the PDSCH to which the dedicated logical channels (DTCH, DCCH) are mapped is made to support DL CoMP, whereas the PDSCH to which the other logical channels are mapped is made not to support DL CoMP.

Figure 18:
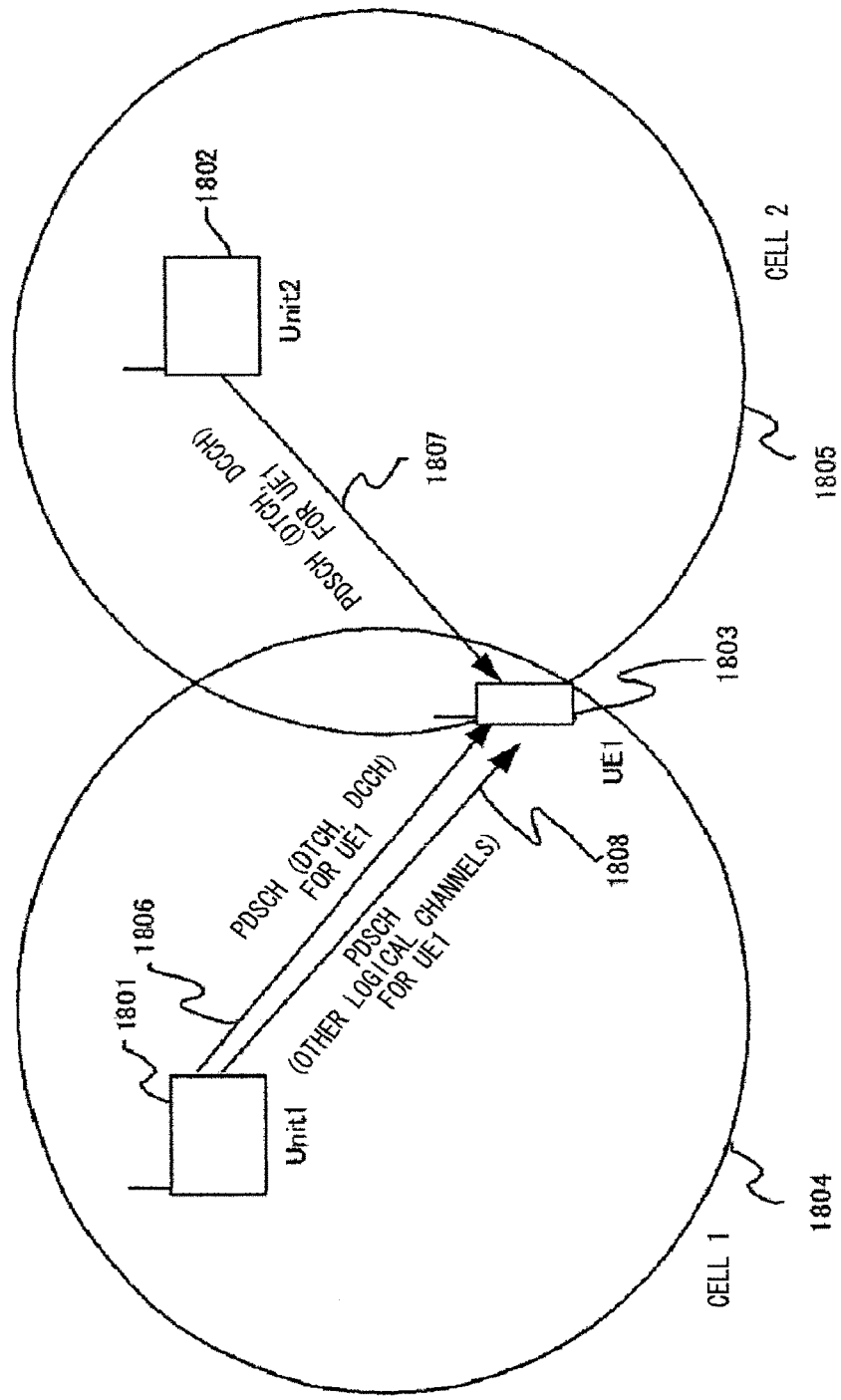
FIG. 18 is a conceptual diagram in a case where discrimination is made between support and non-support for DL CoMP for each logical channel.

FIG. 18 is a conceptual diagram in a case where discrimination is made between support and non-support for DL CoMP for each logical channel. 1801 to 1805 are similar to 1301 to 1305 of FIG. 13, and thus description thereof is omitted. The UE 1 takes the cell 1 as a serving cell (or anchor cell). FIG. 18 shows the case of joint processing. As shown in the diagram, the PDSCHs are classified into the PDSCH to which the dedicated logical channels (DTCH, DCCH) are mapped and the PDSCH to which the other logical channels are mapped. The dedicated logical channels (DTCH, DCCH) are made to support DL CoMP for the UE 1 being a DL CoMP target, and the PDSCHs to which the logical channels are mapped are transmitted from a plurality of multi-point cells (cell 1, cell 2) that perform DL CoMP to the UE 1 (1806, 1807). On the other hand, the other logical channels are made not to support DL CoMP for the UE 1 being a DL CoMP target, and the PDSCH to which the logical channels are mapped is transmitted only from the serving cell (cell 1) to the UE 1 (1808).

The UE 1 combines the PDSCHs to which the dedicated logical channels (DTCH, DCCH) are mapped that have been transmitted from the cell 1 and the cell 2, to thereby improve the reception quality. On the other hand, the other logical channels do not support DL CoMP and thus the UE 1 cannot improve the reception quality. However, the usage efficiency of radio resources does not decrease considerably as described above. This increases the coverage of high data rates and improves the cell-edge throughput for the dedicated logical channels (DTCH, DCCH), which are aimed in DL CoMP, and further prevents a decrease in usage efficiency of radio resources, leading to an increase of a throughput in a system.

FIG. 19 shows an example of the operations of the serving cell and the other cell that performs DL CoMP with the cell. In the serving cell, when the procedure of transmitting the PDSCH to the UE 1 is started in Step ST1901, the serving cell first maps the logical channel for transmission to the transport channel corresponding to the logical channel (Step ST1902). Next, the serving cell maps the transport channel to the PDSCH (Step ST1903). Then, the serving cell performs scheduling of physical resources of the PDSCH (Step ST1904).

In Step ST1905, the serving cell judges whether the UE to which the PDSCH is transmitted is the UE being a DL CoMP target. As judgment criteria, for example, whether the UE is located at the cell edge may be judged. Further, the serving cell determines with which cell DL CoMP is performed for the UE. In the case where the serving cell judges that the UE is not a DL CoMP target, the serving cell transmits the scheduling information of the PDSCH determined in Step ST1904 on the PDCCH and the PDSCH with the physical resources indicated by the scheduling information (Step ST1908) On the other hand, in a case where the serving cell judges that the UE is a CoMP target in Step ST1905, in Step ST1906, the serving cell judges whether the logical channel to be transmitted supports or does not support DL CoMP.

In a case where the logical channel does not support DL CoMP, the serving cell transmits the PDCCH and PDSCH in Step ST1908. In a case where the serving cell judges that the logical channel to be transmitted supports DL CoMP in Step ST1906, in Step ST1907, the serving cell transmits the transmission data and PDSCH scheduling information to the other cell that performs DL CoMP. After that, the serving cell transmits the PDCCH and PDSCH in Step ST1908. The other cell that performs DL CoMP receives the transmission data and PDSCH scheduling information transmitted from the serving cell in Step ST1907 (Step ST1909). The other cell that performs DL CoMP may initiate DL CoMP for the UE by reception of the above-mentioned pieces of information or any piece thereof. The cell (other cell that performs DL CoMP) that has initiated DL CoMP for the UE starts the procedure of transmitting the PDSCH to the UE. In Step ST1910, the other cell maps the transmission data for the UE to the PDSCH. In Step ST1911, the other cell allocates the PDSCH to the same physical resource as that of the serving cell based on the PDSCH scheduling information for the UE, and then transmits the PDSCH. The UE being a DL CoMP target receives the PDSCHs transmitted from the serving cell and the other cell that performs DL CoMP.

Discrimination between support and non-support for DL CoMP in accordance with the type of a logical channel allows to transmit the data transmitted to the other cell that performs DL CoMP from the serving cell in a format for each logical channel in Step ST1907. Further, the received data has been in the format of a logical channel, and thus the other cell that performs DL CoMP is capable of mapping the received data to the PDSCH without any processing in Step ST1910. Accordingly, there can be achieved an effect that control in a base station is made simpler as well as an effect that coordinated transmission control is made simpler between base stations.

In this case, in Step ST1909, the cell that performs DL CoMP receives a piece or a plurality of pieces of information for DL CoMP, which have been transmitted from the serving cell, to thereby initiate DL CoMP for the UE. However, in Step ST1905, when the serving cell judges that the UE is a DL CoMP target, the serving cell may transmit a signal for initiating DL CoMP to the cell that has been determined to perform DL CoMP. The other cell that performs DL CoMP receives the signal, to thereby initiate DL CoMP for the UE.

As a result, the other cell can explicitly receive the signal for initiating DL CoMP, whereby an effect of preventing a malfunction is achieved. How long before the signal for initiating DL CoMP is transmitted prior to the subframe to which the PDSCH is allocated, the time thereof, the number of subframes or the number of radio frames may be predetermined. This allows the other cell to recognize the radio frame for performing DL CoMP, which makes the adjustment with scheduling for UEs being served by the other cell simpler.

FIG. 20 is an example of the sequence diagram in a case where discrimination is made between support and non-support for DL CoMP for each logical channel. Part (a) of FIG. 20 shows the case where a logical channel supporting DL CoMP is transmitted, and part (b) of FIG. 20 shows the case where a logical channel that does not support DL CoMP is transmitted. Shown as an example is the case where discrimination is made between the dedicated logical channels (DTCH, DCCH) and other logical channels, and the PDSCH to which the dedicated logical channels (DTCH, DCCH) are mapped is made to support DL CoMP, whereas the PDSCH to which other logical channels are mapped is made not to support DL CoMP.

As shown in part (a) of FIG. 20, in a case where the logical channels supporting DL CoMP are transmitted, the serving cell (cell 1) transmits the DTCH, DCCH and PDSCH allocation scheduling information to which the DTCH and DCCH are mapped to the other cell that performs DL CoMP before transmitting the PDSCH to which the DTCH and DCCH are mapped to the UE (UE 1) being a DL CoMP target (Step ST2001). Step ST2001 may be performed by means of the interface X2 between cells. After that, the serving cell transmits the PDSCH allocation information of the DTCH and DCCH to the UE 1 on the PDCCH (Step ST2002). The serving cell transmits the PDSCH in accordance with the PDSCH allocation information of the DTCH and DCCH (Step ST2003). On the other hand, the other cell that performs DL CoMP maps the DTCH and DCCH received in Step ST2001 to the PDSCH, allocates the PDSCH to the physical resource in accordance with the PDSCH allocation scheduling information to which the DTCH and DCCH are mapped, which has been also received in Step ST2001, and transmits the PDSCH to the UE 1 (Step ST2004). The UE 1 receives the PDCCH transmitted from the serving cell in Step ST2002 to detect the physical resource allocation information of the PDSCH for own UE (Step ST2005), and receives the physical resource to which the PDSCH is allocated based on the detected allocation information, to thereby detect the DTCH and DCCH (Step ST2006). On this occasion, the UE 1 receives the PDSCH allocated to the same physical resource from the other cell that performs DL CoMP with the serving cell, which improves the reception quality.

As shown in part (b) of FIG. 20, in a case where the other logical channel that does not support DL CoMP is transmitted, the serving cell (cell 1) does not need to transmit, to the other cell, the logical channel and the PDSCH allocation scheduling information to which the logical channel is mapped. Accordingly, the serving cell transmits the PDSCH allocation information of the other logical channel to the UE 1 on the PDCCH (Step ST2007). The serving cell transmits the PDSCH in accordance with the PDSCH allocation information of the other logical channel (Step ST2008). The UE 1 receives the PDCCH transmitted from the serving cell in Step ST2007 to detect the physical resource allocation information of the PDSCH for own UE (Step ST2009), and receives the physical resource to which the PDSCH is allocated based on the detected allocation information, to thereby detect the other logical channel (Step ST2010).

In the example of FIG. 20, in the case where the logical channel supporting DL CoMP is transmitted in Step ST2001, an interface (X2) between cells is used for transmitting, by the serving cell (cell 1), the DTCH, DCCH and the PDSCH allocation scheduling information to which the DTCH and DCCH are mapped to the other cell that performs DL CoMP.

Not only limited to an interface between cells, an interface (S1) between the core network (MME) and the cell or an interface between MMEs may be used, which are shown in Step ST2101 and Step ST2102 of part (a) of FIG. 21. First, the serving cell transmits the DTCH, DCCH and the PDSCH allocation scheduling information to which the DTCH and DCCH are mapped by means of the S1 interface for the MME (MME1) that controls the serving cell (Step ST2101). Then, the MME1 transmits those to the other cell that performs DL CoMP controlled by the MME1 (Step ST2102). This allows the MME to determine a cell that performs DL CoMP and, in such a case, DL CoMP can be performed even if the serving cell does not recognize the other cell that performs DL CoMP.

Alternatively, for example, Step ST2103, Step ST2104 and Step ST2105 of part (b) of FIG. 21 may be shown. First, the serving cell transmits the DTCH, DCCH and the PDSCH allocation scheduling information to which the DTCH and DCCH are mapped to the MME (MME1) that controls the serving cell by means of the S1 interface (Step ST2103). Then, the MME1 transmits those to the MME2 that controls the cell that performs DL CoMP by means of the interface between the MMEs (Step ST2104). Then, the MME2 transmits those to the other cell that performs DL CoMP by means of the S1 interface (Step ST2105). This allows the cell that performs DL CoMP to perform DL CoMP even in a case where different MMEs control those cells. For example, DL CoMP is enabled by applying the above-mentioned operation in a case where DL CoMP is performed between cells belonging to different tracking areas. This is because the MME is generally provided for each tracking area in many cases.

In the present embodiment, in the case where logical channels supporting DL CoMP are transmitted, the serving cell (cell 1) transmits the DTCH, DCCH and the PDSCH allocation scheduling information to which the DTCH and DCCH are mapped to the other cell that performs DL CoMP, before transmitting the PDSCH to which the DTCH and DCCH are mapped to the UE (UE 1) being a DL CoMP target (Step ST2001 of part (a) of FIG. 20). Before this is performed, physical resource information that cannot be allocated (or can be allocated) may be notified between neighboring cells that may perform DL CoMP.

Part (a) of FIG. 22 shows an example of a sequence diagram for notifying the physical resource information required between the neighboring cells that may perform DL CoMP. In Step ST2201, the physical resource information that cannot be allocated or the physical resource information that can be allocated is notified between the neighboring cells that may perform DL CoMP. In a case where the cell has already recognized a cell with which the UE being a DL CoMP target performs DL CoMP, the physical resource information that cannot be allocated may be notified to the UE being a DL CoMP target only between the cells that perform DL CoMP. Alternatively, the physical resource information that can be allocated may be notified.

This allows the serving cell that performs DL CoMP to use the information in scheduling of the PDSCH, which enables scheduling in accordance with the physical resource usage situation of the other cell. For example, in a case where the cell 2 periodically allocates any PDSCH to the same physical resource, the cell 2 transmits the information on the above to the serving cell, with the result that the serving cell can schedule the PDSCH for DL CoMP while avoiding scheduling to the physical resource. This makes coordinated transmission control between multiple points simpler and prevents the generation of re-scheduling or a control delay resulting from this.

As another method, the serving cell may transmit, to the cell that may perform DL CoMP or the cell that performs DL CoMP, a signal for requesting the physical resource information that cannot be allocated. Alternatively, the serving cell may transmit a signal for requesting the physical resource information that can be allocated.

FIG. 22 shows an example of a sequence diagram for transmitting, by the serving cell, a signal for requesting the physical resource information that cannot be allocated (or can be allocated). In Step ST2202, the serving cell transmits the signal for requesting the physical resource information that cannot be allocated (or can be allocated) to the cell that performs DL CoMP. The cell that has received the signal from the serving cell transmits, to the serving cell, the physical resource information that cannot be allocated (or can be allocated) of own cell (Step ST2203). In a case where the serving cell transmits the signal to the cell that performs DL CoMP in Step ST2202 but does not recognize the cell that performs DL CoMP, the serving cell may transmit the signal to the cell that may perform DL CoMP. This allows the serving cell that performs DL CoMP to use the information in scheduling of the PDSCH and perform scheduling in accordance with the physical resource usage situation of the other cell. Further, the serving cell transmits the signal for requesting a physical resource, and thus the signals shown in Step ST2202 and Step ST2203 are transmitted as desired, which prevents an increase of signaling capacity.

The interface (X2) between cells, the interface (S1) between the MME and the cell or the interface between MMEs as described in the first embodiment may be used for the notification of the physical resource information that cannot be allocated (or can be allocated) or the transmission of the signal for requesting the physical resource information that cannot be allocated (or can be allocated). Alternatively, the above may be performed via the MME, so that the MME holds and manages the physical resource information that cannot be allocated of each cell that may perform DL CoMP, and that the serving cell of the UE being a DL CoMP target receives the information from the MME.

While the physical resource information that cannot be allocated (or can be allocated) is notified between the neighboring cells that may perform DL CoMP in the example of FIG. 22, the physical resource that cannot be allocated or physical resource that can be allocated may be predetermined for DL CoMP. The physical resource may be determined in a frequency domain or time domain. The frequency domain and time domain may be both determined. Alternatively, the physical resource may be on a resource block basis. The method of deriving the physical resource may be predetermined. It may be determined as a system. As a result, the cell that may perform DL CoMP or the cell that performs DL CoMP can share the physical resource information, and accordingly mutual notification between the cells performed in Step ST2201 or in Step ST2202 and Step ST2203 is not required, leading to a reduction in signaling amount.

In a case where the method of deriving the physical resource is predetermined, cell identifiers (cell-ID, PCI) may be used as input parameters for derivation. In this case, notifications may be performed mutually between the cells that perform DL CoMP for recognizing the cell identifier information of the other cell that performs DL CoMP. Alternatively, the MME may make a notification to each cell as neighboring cell information. In any case, the physical resource can be derived with signaling of a small amount of information.

The physical resource that cannot be allocated or physical resource that can be allocated for DL CoMP may be static or semi-static. In a case where it is semi-static, the physical resource information, information on application time (such as start, stop and valid duration) and the like of the physical resource information may be notified mutually between the cells that may perform DL CoMP or the cells that perform DL CoMP. The semi-static physical resource does not require the notifications between the cells each time DL CoMP is performed, which reduces a signaling amount and enables appropriate correspondence with the radio wave propagation environment that varies in time or the number of UEs being served by a cell.

As an example of the semi-static physical resource, several types of physical resources that cannot be allocated or physical resources that can be allocated for DL CoMP may be predetermined, and a type thereof to be used may be notified mutually between the cells that may perform DL CoMP or the cells that perform DL CoMP in setting or changing of the physical resource. Alternatively, the MME may notify each cell. This only requires that a signal of a small amount of information, such as the information indicating a type, be notified between the cells.

The above-mentioned information notification method may be performed by means of the interface (X2) between cells, the interface (S1) between an MME and a cell or the interface between MMEs as described in the first embodiment. Alternatively, the above may be performed via the MME, so that the MME holds and manages those pieces of information. The serving cell of the UE being a DL CoMP target may receive those pieces of information from the MME.

While the present embodiment discloses that discrimination is made between support and non-support for DL CoMP in accordance with the type of a logical channel, discrimination may be made between support and non-support for DL CoMP in accordance with the type of a transport channel.

For example, discrimination is made between the DL-SCH and other transport channel, and the PDSCH to which the former transport channel is mapped is made to support DL CoMP, whereas the PDSCH to which the latter transport channel is mapped is made not to support DL CoMP.

Discrimination is made between support and non-support for DL CoMP in accordance with the type of a transport channel as described above, whereby it is possible to set support and non-support for DL CoMP in accordance with the number of UEs being transmission targets of a transport channel, which solves, for example, a problem that arises in a case of a large number of UEs being transmission targets. CoMP can be set finely in accordance with a communication method, whereby it is possible to improve the usage efficiency of radio resources as a system, leading to an increase of the throughput as a system.

As an operation example in the cell, the judgment of Step ST1906 shown in FIG. 19 may be made by the transport channel, not by the logical channel. Further, the transmission data transmitted, by the serving cell, to the other cell that performs DL CoMP in Step ST1907 may be on a data basis so as to be mapped on the transport channel. In that case, in Step ST1908, the other cell that performs DL CoMP receives the transmission data from the serving cell that has been transmitted on a data basis so as to be mapped on the transport channel. This achieves the effects that control at a base station is made much simpler because the discrimination is made for each transport channel, that coordinated transmission control between base stations can be made simpler because the information transmitted/received between base stations can be on a data basis so as to be mapped on the transport channel, and that the period of time required for mapping to the PDSCH or allocation to the physical resource can be reduced at a base station that has received the data on a transport channel basis from the serving cell.

First Modification of First Embodiment

The first embodiment has disclosed that discrimination is made between support and non-support for DL CoMP in accordance with the type of a logical channel. In some cases, however, the number of target UEs to be transmitted in accordance with the type of information mapped on the logical channel varies even in a case of the same type of logical channels.

One example thereof is the information mapped on the PCCH. As described above, the paging message is mapped on the PCCH, and the paging message contains the information related to paging and/or the information related to system information change and/or the information related to ETWS notification. The information related to paging is transmitted to a UE that has received a call. However, the information related to system information change and the information related to ETWS notification are notified to all UEs being served by a cell in a case where the system information has been changed or in a case where an ETWS notification is made. Therefore, in some cases, the number of target UEs to be transmitted in accordance with the type of information mapped on a logical channel varies even in a case of the same types of logical channels.

The information related to paging is transmitted to the UE that receives a call, and when the PCCH is made to support DL CoMP, the PCCH has to be broadcast to all UEs being served by a cell in a case where the system information mapped on the PCCH has been changed or in a case where an ETWS notification is made. The PCCH is mapped to the PCH and is mapped to the PDSCH, to thereby be broadcast to UEs being served. When the PDSCH to which the PCCH is mapped is made to support DL CoMP in a case where, also in neighboring cells, the system information has been changed or an ETWS notification has to be transmitted, a large amount of radio resources has to be used for DL CoMP. Accordingly, the usage efficiency of radio resources decreases considerably, leading to a problem that the throughput as a system decreases. Further, there arises a problem that it is impossible to secure a radio resource for a call by a user in a critical situation, such as a user hit by an earthquake as described above.

On the other hand, when the PCCH is made not to support DL CoMP, there arises a problem that the reception quality of the information related to paging, which can be improved originally, cannot be improved. That is, this is because the information related to paging is transmitted only to the UE that receives a call, and thus the above-mentioned problem does not arise originally even when the PCCH is made to support DL CoMP, and the PCCH can support DL CoMP.

In order to solve these problems, a first modification of the present embodiment discloses that discrimination is made between support and non-support for DL CoMP in accordance with the type of information mapped to the PDSCH. As a result of discrimination being made between support and non-support for DL CoMP in accordance with the type of information as described above, it is possible to set support/non-support for DL CoMP in accordance with the number of UEs being transmission targets for each type of information. Therefore, it is possible to set CoMP finely in accordance with the number of UEs also in, for example, the above-mentioned case including a case where the number of UEs being transmission targets is large and a case where the number of UEs being transmission targets is small (or in a case of only one UE) as to the same type of logical channels. Further, setting can be made for each type of information, which allows setting of support/non-support for DL CoMP for each service. This allows the use of radio resources to be flexibly controlled as a system, and improves the usage efficiency of radio resources. Therefore, it is possible to increase the throughput as a system.

For example, support and non-support for DL CoMP are discriminated between the information required to be dedicatedly transmitted to one UE being served by a cell and the other information.

As a specific example, the dedicated UE user information, dedicated UE control information, common control information and paging information are made to support CoMP, whereas the other information is made not to support CoMP. The dedicated UE user information is mapped on the DTCH, and the dedicated UE control information is mapped on the DCCH. The common control information is mapped on the CCCH, is mapped to the DL-SCH, and is then mapped to the PDSCH to be transmitted. The paging information is mapped on the PCCH, is mapped to the PCH, and is then mapped to the PDSCH to be transmitted. The other information, for example, broadcast information, information indicating the system information change, information related to ETWS notification or MBMS-related information, is made not to support CoMP. The broadcast information is mapped on the BCCH, is mapped to the DL-SCH, and is then mapped to the PDSCH to be transmitted. The information indicating the system information change and the information related to ETWS notification are mapped on the PCCH, is mapped to the PCH, and is then mapped to the PDSCH to be transmitted. The MBMS-related information is mapped to the MTCH and MCCH, is mapped to the DL-SCH, and is then mapped to the PDSCH to be transmitted. Discrimination is made in accordance with the type of information as described above, so that the PDSCH on which the dedicated UE user information, dedicated UE control information, common control information and paging information are mapped is made to support CoMP, whereas the PDSCH on which the other information is mapped is made not to support CoMP. This allows discrimination between support and non-support for DL CoMP in accordance with the number of UEs being DL CoMP targets for each type of information to be transmitted or for each service, whereby it is possible to flexibly control the use of radio resources as a system, leading to an improvement in usage efficiency of radio resources. Accordingly, it is possible to increase the throughput as a system.

Next, an operation is disclosed. This first modification has disclosed that discrimination is made between support and non-support for DL CoMP in accordance with the type of information to be transmitted. What type of information to be transmitted is made to support/not to support CoMP is predefined.

As an example, description is given of a case where discrimination is made between the dedicated transmission information and the other transmission information such that the PDSCH to which the dedicated transmission information is mapped is made to support DL CoMP and the PDSCH to which the other transmission information is mapped is made not to support DL CoMP.

Figure 23:
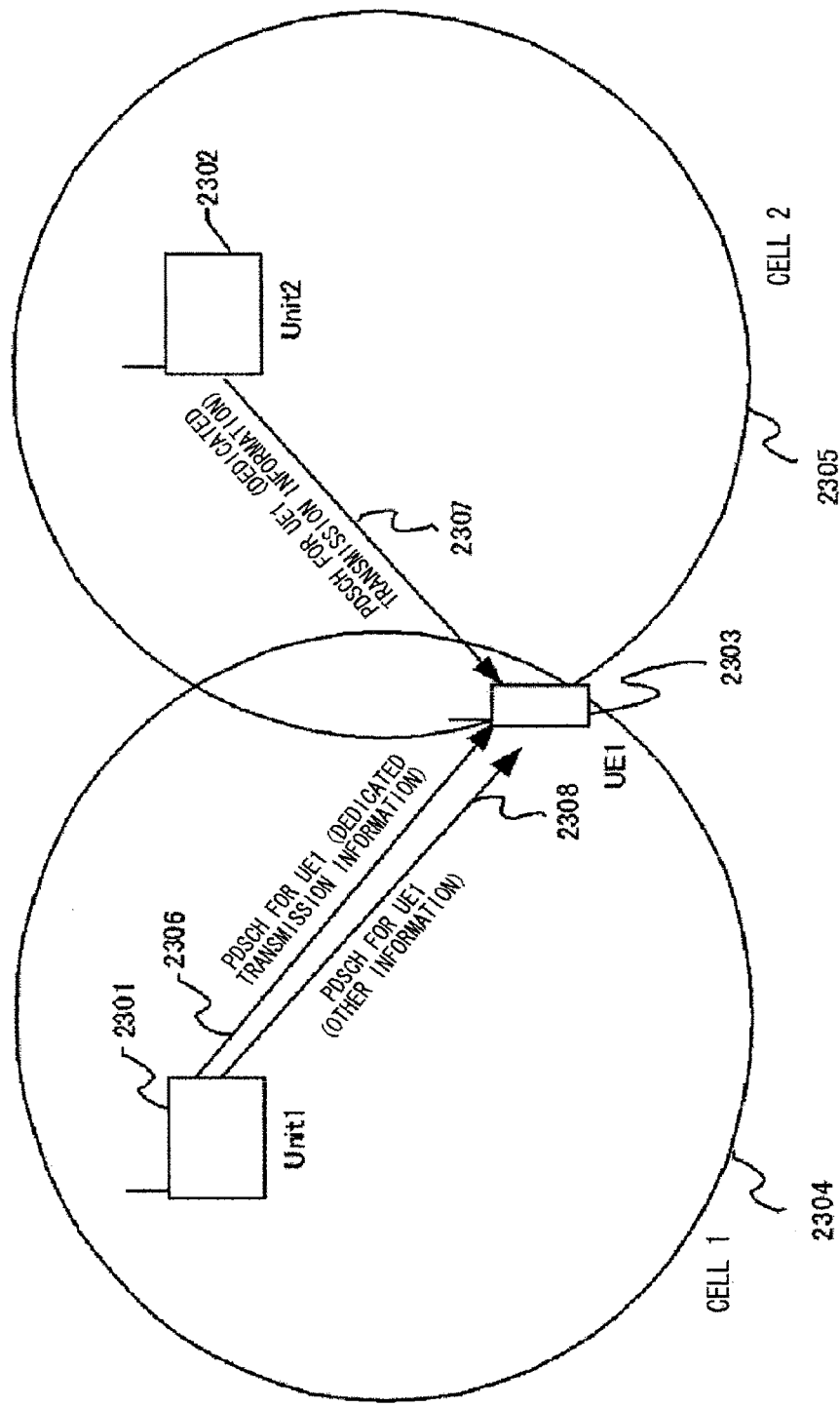
FIG. 23 is a conceptual diagram in a case where discrimination is made between support and non-support for DL CoMP for each information.

FIG. 23 is a conceptual diagram in a case where discrimination is made between support and non-support for DL CoMP for each information. 2301 to 2305 are similar to 1301 to 1305 of FIG. 13, and thus description thereof is omitted. As shown in the diagram, the PDSCHs are classified into the PDSCH to which the dedicated transmission information is mapped and the PDSCH to which the other transmission information is mapped. The dedicated transmission information is made to support DL CoMP for the UE 1 being a DL CoMP target, and the PDSCH to which the information is mapped is transmitted from a plurality of multi-point cells (cell 1, cell 2) that perform DL CoMP to the UE 1 (2306, 2307). On the other hand, the other transmission information is made not to support DL DoMP for the UE 1 being a DL CoMP target, and the PDSCH to which the information is mapped is transmitted only from the serving cell (cell 1) to the UE 1 (2308).

The UE 1 combines the PDSCHs to which the dedicated transmission information is mapped, which have been transmitted from the cell 1 and the cell 2, to thereby improve the reception quality. On the other hand, the other transmission information does not support DL CoMP and thus the reception quality of the UE 1 cannot be improved, but the usage efficiency of radio resources does not decrease considerably as described above. This increases the coverage of high data rates and improves the cell-edge throughput, which are aimed in DL CoMP for the dedicated transmission information, and further prevents a decrease in usage efficiency of radio resources by making the other transmission information not support CoMP, leading to an increase of the throughput in a system.

As to the operations of the serving cell and the other cell that performs DL CoMP with the serving cell, it suffices that the steps below are added and changed in the flowchart shown in FIG. 19. Added before Step ST1902 is the step of performing the process to map the information on the logical channel corresponding to each information to be transmitted. Further, the judgment regarding the logical channel supporting CoMP is changed to the judgment regarding the transmission information supporting CoMP. This allows the transmission in which discrimination is made between support and non-support for DL CoMP in accordance with the type of information to be transmitted.

In some cases, the transmission information supporting DL CoMP and the transmission information that does not support DL CoMP are simultaneously mapped on the same logical channel. The support/non-support for DL CoMP in such a case may be predefined. In such a case, for example, non-support for DL CoMP is provided. This prevents a significant decrease of radio resources, which occurs in a case of a large number of UEs being DL CoMP targets as described above.

As another example, the transmission information supporting DL CoMP and the transmission information that does not support DL CoMP may be mapped on different logical channels. Even in a case of the same type of logical channels, those may be mapped on different logical channels. For example, the paging information and the information indicating the system information change are mapped on different PCCHs to be transmitted. This allows the discrimination between support and non-support for DL CoMP for each information type.

Alternatively, the information indicating the type of information mapped on the logical channel may be provided so as to recognize what type of transmission information is mapped on the logical channel.

As to one example of the sequence diagram of this first modification, it suffices that "DTCH, DCCH" of FIG. 20 disclosed in the first embodiment is changed to "logical channel on which the information supporting CoMP is mapped", and that "other logical channel" is changed to "logical channel on which other transmission information is mapped".

Second Modification of First Embodiment

The first modification of the first embodiment discloses that discrimination is made between support and non-support for DL CoMP in accordance with the type of information to be transmitted. However, the required reception quality may be different in accordance with the state of the UE being a transmission target even in a case of the same type of information.

In order to achieve the above-mentioned object, a second modification of the present embodiment discloses that discrimination is made between support and non-support for DL CoMP in accordance with the state of a UE.

As an example, discrimination is made between support and non-support for DL CoMP in accordance with the state of a UE, and the PDSCH for a UE in RRC_Connected is made to support CoMP, while the PDSCH for a UE in RRC_Idle is made not to support DL CoMP.

For example, the information required to be dedicatedly transmitted to one UE being served by a cell is described. The control information of the information required to be dedicatedly transmitted to one UE has two types, the state in which the UE being a transmission target is in an idle state (RRC_Idle) and the state in which the UE is in a connected state (RRC_Connected). The control information transmitted to the UE in RRC_Idle is common control information, which is mapped to the common control channel (CCCH) to be transmitted. On the other hand, the control information transmitted to the UE in RRC_Connected is dedicated UE control information, which is mapped to the dedicated control channel (DCCH) to be transmitted. In a case where the request reception quality is different in accordance with the state of a UE being a transmission target, for example, in a case where high reception quality is required for the RRC_Connected state and lower reception quality than the above is required for the RRC_Idle state, as disclosed in this modification, support for DL CoMP is provided when the state of the UE being a transmission target is RRC_Connected and non-support for DL CoMP is provided when the state of the UE being a transmission target is RRC_Idle. This allows to achieve the required reception quality that varies in accordance with the state of a UE being a transmission target. Further, discrimination can be made between support and non-support for DL CoMP in accordance with the state of a UE, whereby it is possible to prevent unnecessary DL CoMP for excessively obtaining reception quality. As a result, the usage efficiency of radio resources can be prevented from decreasing as described above.

Figure 24:
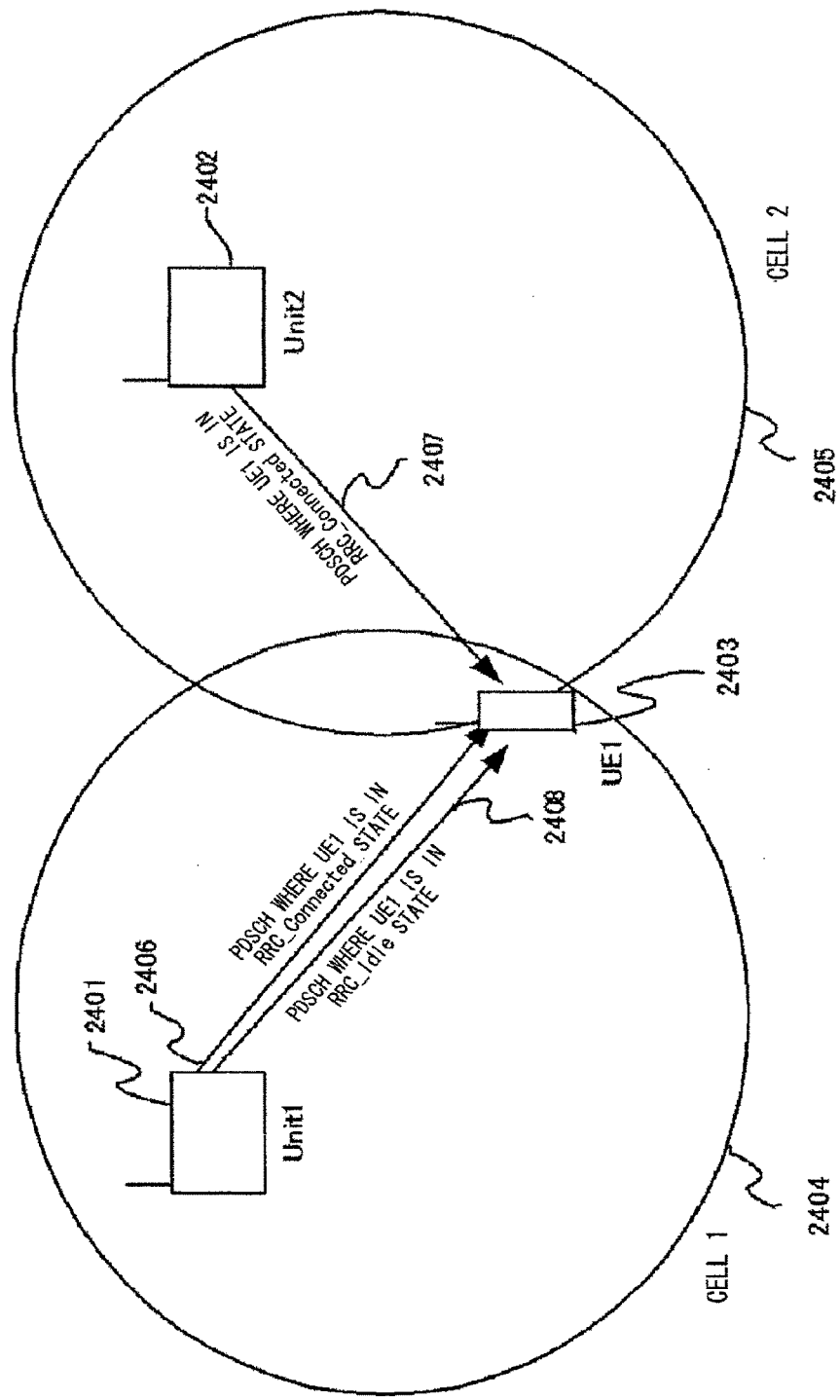
FIG. 24 is a conceptual diagram in a case where discrimination is made between support and non-support for DL CoMP in accordance with a state of a UE being a transmission target.

FIG. 24 is a conceptual diagram in a case where discrimination is made between support and non-support for DL CoMP in accordance with the state of a UE being a transmission target. 2401 to 2405 are similar to 1301 to 1305 of FIG. 13, and thus description thereof is omitted. As shown in the diagram, discrimination is made between the PDSCH on which the information where the UE being a transmission target is transmitted in the RRC_Connected state is mapped and the PDSCH on which the information where the UE being a transmission target is transmitted in the RRC_Idle state is mapped. For the UE 1 being a DL CoMP target, the PDSCH on which the information where the UE being a transmission target is transmitted in the RRC_Connected state is made to support DL CoMP. The PDSCH to which the information is mapped is transmitted from a plurality of multi-point cells (cell 1, cell 2) that perform DL CoMP to the UE 1 (2406, 2407). On the other hand, for the UE 1 being a DL CoMP target, the PDSCH on which the information where the UE being a transmission target is transmitted in the RRC_Idle state is mapped is made not to support DL CoMP. The PDSCH to which the information is mapped is transmitted only from the serving cell (cell 1) to the UE 1 (2408).

The UE 1 combines the PDSCHs on which the information transmitted in the RRC_Connected state is mapped, which have been transmitted from the cell 1 and the cell 2, to thereby improve the reception quality. On the other hand, the information transmitted in the RRC_Idle state does not support DL CoMP, and thus the UE 1 cannot improve the reception quality. However, the usage efficiency of radio resources does not decrease considerably as described above. This allows to obtain the reception quality in accordance with the state of a UE described as the above-mentioned object, with the result that the coverage of high data rates can be increased and the cell-edge throughput can be improved in the state where the UE supports DL CoMP. Further, a decrease in usage efficiency of radio resources can be avoided in the state where the UE does not support DL CoMP, leading to an increase of the throughput in a system.

The operation or sequence in this second modification is obtained by changing the operation or sequence of the first embodiment such that discrimination is made between support and non-support for DL CoMP and judged in accordance with the state of a UE. Detailed description is omitted here.

As another example, discrimination between support and non-support for DL CoMP may be set in accordance with a support system (LTE-support, LTE-A-support or the like) of a UE, in accordance with a support version (Release-8-support, Release-10-support or the like) of a UE, or in accordance with the capability of a UE. This makes it possible to set the number of UEs being DL CoMP targets finely and flexibly in accordance with the system or version that supports a UE, or UE capability. Therefore, it is possible to increase the throughput as a system.

Third Modification of First Embodiment

In the first embodiment and the first modification and second modification thereof, setting for discrimination between support and non-support for DL CoMP is performed on any cell. A third modification of the present embodiment discloses that setting for discrimination between support and non-support for DL CoMP is performed for each cell.

The communication situation differs for each cell in a system. For example, the number of UEs being served, the number of UEs in RRC_Idle or RRC_Connected, and the number of UEs that receive MBMS differ for each cell. It is conceivable in such a case that the usage efficiency of radio resources may decrease as a system if setting for discrimination between support and non-support for DL CoMP is the same for all cells.

In order to solve the above-mentioned problem, a third modification of the present embodiment discloses that the discrimination between support and non-support for DL CoMP is set for each cell.

This optimizes the usage efficiency of radio resources for each cell, whereby it is possible to improve the throughput as a system.

For example, the case where discrimination is made between support and non-support for DL CoMP for each logical channel, which has been disclosed in the first embodiment, is described. What logical channel is made to support or not to support DL CoMP is set for each cell.

Figure 25:
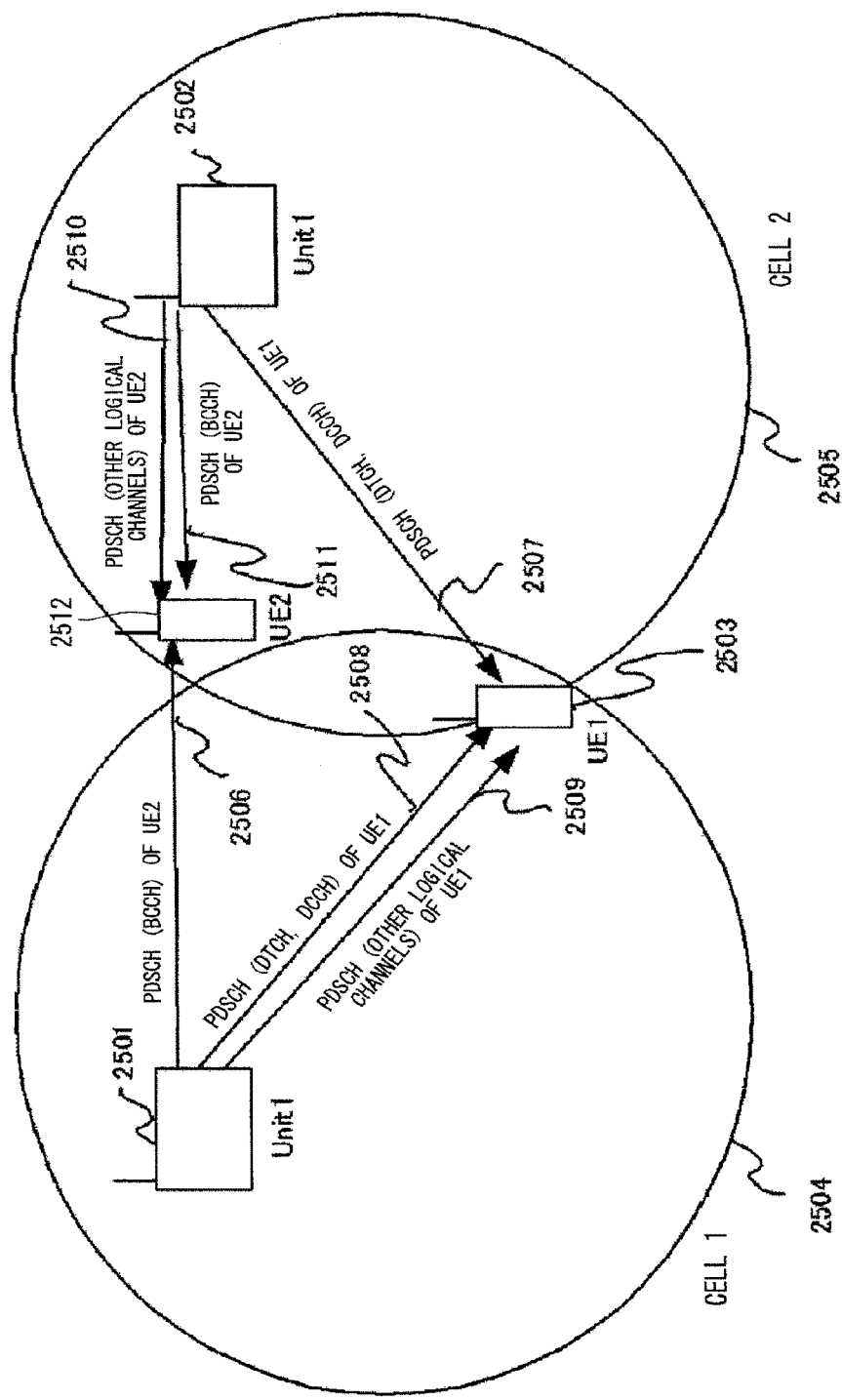
FIG. 25 is a conceptual diagram in a case where discrimination between support and non-support for DL CoMP is set for each cell.

FIG. 25 is a conceptual diagram in a case where discrimination between support and non-support for DL CoMP is set for each cell. 2501 to 2505 are similar to 1301 to 1305 of FIG. 13, and thus description thereof is omitted. 2512 denotes a UE (UE 2) being a DL CoMP target. As an example, in the cell 1, the DTCH and DCCH are made to support DL CoMP, whereas other logical channels are made not to support it. In the cell 2, the BCCH is made to support DL CoMP, whereas other logical channels are made not to support it.

The cell 1 transmits a PDSCH (2508) to which the DTCH and DCCH of the UE 1 are mapped and a PDSCH (2509) to which other logical channels are mapped to the UE 1 being a DL CoMP target, whose serving cell is the cell 1. In addition, the cell 1 transmits a PDSCH (2506) to which the BCCH of the cell 2 is mapped to the UE 2 being a DL CoMP target, whose serving cell is the cell 2. Meanwhile, the cell 2 transmits a PDSCH (2507) to which the DTCH and DCCH transmitted by the cell 1 are mapped to the UE 1 for performing DL CoMP. In addition, the cell 2 transmits, to the UE 2, a PDSCH (2511) to which the BCCH of the cell 2 is mapped and a PDSCH (2510) to which other logical channels are mapped. The UE 1 whose serving cell is the cell 1 receives the PDSCHs to which the DTCH and DCCH are mapped from the cell 1 and the cell 2, and accordingly is capable of improving the reception quality of the channels. Meanwhile, the UE 2 whose serving cell is the cell 2 receives the PDSCHs to which the BCCH is mapped from the cell 1 and the cell 2, and accordingly is capable of improving the reception quality of the channels.

As described above, the BCCH on which the broadcast information is mapped only for one or several cells (in this case, cell 2) is made to support DL CoMP, whereas the BCCH on which the broadcast information is mapped for the other cell (in this case, cell 1) is made not to support DL CoMP. This enables to prevent the usage efficiency of physical resources from decreasing considerably and the throughput as a system from decreasing which occur in a case where the PDSCH on which the broadcast information is mapped is subjected to DL CoMP for all cells as described above.

Further, in a case of, for example, poor reception quality of the broadcast information at the cell edge or poor throughput in a cell (in this case, cell 2) for some reason, a desired logical channel is made to support DL CoMP only for the cell. Accordingly, it is possible to improve the cell-edge reception quality or the throughput in the cell without significantly affecting the throughput of the entire system.

Although the case of a logical channel is described here, not only limited to the logical channel, which can be, for example, the type of information, the situation of a UE or the combination thereof as long as discrimination between support and non-support for DL CoMP can be set for each cell.

This allows flexible discrimination between support and non-support for DL CoMP in accordance with a situation of each cell in a system, which improves the throughput as an entire system and improves the reception quality and the throughput of an individual cell.

As another example, discrimination between support and non-support for DL CoMP may be set for each cell in accordance with the system bandwidth of a cell. Physical resource increases as the system bandwidth is larger. The physical resource is small when the bandwidth is narrow. Therefore, for example, setting is made such that all PDSCHs are made to support DL CoMP in the cell having a wide system bandwidth, and that only the PDSCH to which a logical channel having a small number of UEs being DL CoMP targets or information is mapped is made to support DL CoMP and other PDSCHs are made not to support DL CoMP in the cell having a narrow system bandwidth.

As a result, the physical resources required for DL CoMP can be set in accordance with the physical resources of a cell, which improves the throughput as a system without considerably decreasing the usage efficiency of physical resources.

As to LTE-A, the technique for supporting a wider bandwidth (wider bandwidth extension) is studied as a new technique. In order to support a wider bandwidth, there is proposed the method of aggregating bandwidths separated by a plurality of frequency axes. Each individual separated bandwidth is referred to as a component carrier. While it has been described that discrimination between support and non-support for DL CoMP may be set for each cell in accordance with the system bandwidth of a cell, as another example, discrimination between support and non-support for DL CoMP may be set for each component carrier. This achieves similar effects, and besides, allows setting for discrimination between support and non-support for DL CoMP in accordance with radio wave propagation environment that varies depending on a frequency. Accordingly, it is possible to use radio resources more efficiently in wider bandwidth extension, leading to an improvement of the throughput of a cell in which component carriers are aggregated.

As another example, discrimination between support and non-support for DL CoMP may be set for each cell in accordance with a cell-support system (LTE-support, LTE-A-support or the like) or in accordance with a cell-support version (Release-8-support, Release-10-support or the like). This enables to finely and flexibly set the number of UEs being DL CoMP targets in accordance with a support system or version. Therefore, it is possible to increase the throughput as a system.

Fourth Modification of First Embodiment

In the first embodiment and the first modification to third modification thereof, setting for discrimination between support and non-support for DL CoMP is predefined. A fourth modification of the present embodiment discloses that setting for discrimination between support and non-support for DL CoMP is performed in a semi-static manner.

The communication situation in a system varies not only for each cell but also depending on time. For example, the number of UEs being served, the number of UEs in RRC_Idle or RRC_Connected, and the number of UEs that receive the MBMS vary depending on time. It is conceivable in such a case that the usage efficiency of radio resources may decrease as a system if setting for discrimination between support and non-support for DL CoMP is always the same (static).

In order to solve the above-mentioned problem, this fourth modification discloses that discrimination between support and non-support for DL CoMP is performed in a semi-static manner.

This optimizes the usage efficiency of radio resources in accordance with time, whereby it is possible to improve the throughput as a system.

FIG. 26 shows an example of the setting procedure in a case where setting for discrimination between support and non-support for DL CoMP is performed in a semi-static manner. Part (a) of FIG. 26 shows the case where determination is made by a cell, while part (b) of FIG. 26 shows the case where determination is made by a core network (MME). Part (a) of FIG. 26 is described. In Step ST2601, as initialization, the cell performs initialization of the discrimination between support and non-support for DL CoMP in installation or resetting. The initialization may be predetermined. In Step ST2602, the cell measures the situation of own cell, for example, load situation. Examples of the load situation include the number of UEs being served and/or the number of UEs in RRC_Idle or RRC_Connected and/or the number of UEs that receive the MBMS. In Step ST2603, the cell derives setting for the discrimination between support and non-support for DL CoMP with the use of measurement results of the load situation of own cell. Examples of the setting for discrimination between support and non-support for DL CoMP include setting for discrimination for each type of logical channel and setting for discrimination for each information type, which have been disclosed in the first embodiment and the first modification to third modification thereof. The use of measurement results of the load situation of own cell allows optimum setting at that point. In Step ST2604, the cell judges whether to change the current setting to the setting for discrimination between support and non-support for DL CoMP that has been derived. In a case where no change is made, the cell does not change the current setting and proceeds to Step ST2602 to measure the load situation of own cell again. In a case where the cell judges to make a change in Step ST2604, in Step ST2605, the cell changes the current setting to the derived setting for discrimination between support and non-support for DL CoMP. After changing, the cell proceeds to Step ST2602 to measure the load situation of own cell again.

The measurement of a load situation in Step ST2602 may be periodically performed or may be performed at an appropriate timing. Alternatively, a threshold may be provided to the measurement results of a load situation such that a measurement is performed in a case where the threshold is exceeded in a shift from Step ST2602 to Step ST2603. Still alternatively, similarly, a threshold as to whether or not change setting may be provided to the measurement results of a load situation such that measurement is performed in a case where the threshold is exceeded in the judgment of Step ST2604.

Next, description is given of the case where core network (MME) of part (b) of FIG. 26 makes a determination.

In Step ST2606, the core network (MME) initializes the discrimination between support and non-support for DL CoMP in cell installation or resetting. The initialization may be predetermined. In Step ST2607, the MME notifies the cell of the initialization. The cell receives the initialization in Step ST2608 and sets the initial value as initialization for discrimination between support and non-support for DL CoMP for own cell in Step ST2609.

In Step ST2611, the cell measures the load situation of own cell. The load situation may be measured periodically or at an appropriate timing. Alternatively, the MME may transmit a request for load situation measurement to the cell.

In Step ST2613, the cell that has measured the load situation of own cell transmits the measurement results to the MME. In Step ST2612, the MIME that has received the measurement results from each cell in Step ST2610 derives setting for discrimination between support and non-support for DL CoMP for each cell. In Step ST2614, the MIME judges whether to change the current setting to the derived setting for discrimination between support and non-support for DL CoMP. In a case where no change is made, the MME does not change the current setting and proceeds to Step ST2610 to receive the load situation of each cell again. In a case where it is determined that a change is made in Step ST2614, in Step ST2616, the MME changes the current setting to the derived setting for discrimination between support and non-support for DL CoMP for each cell. After changing, in Step ST2618, the MME transmits the setting for discrimination between support and non-support for DL CoMP to each corresponding cell. In Step ST2617, each cell that has received the setting in Step ST2615 changes the setting for discrimination between support and non-support for DL CoMP of own cell.

After that, the MME returns to the reception of a load situation from each cell again, and each cell returns to measurement of the load situation of own cell.

A threshold may be provided to the measurement results of a load situation to serve as a threshold as to whether or not each cell transmits the load situation to the MME in Step ST2613. Alternatively, judgment may be performed in a case where the threshold is exceeded in a shift from Step ST2610 to Step ST2612 in the MME. Still alternatively, a threshold as to whether or not setting is changed may be provided to the measurement results of a load situation such that the judgment in Step ST2614 is performed in a case where the threshold is exceeded.

This allows to change the setting for discrimination between support and non-support for DL CoMP in accordance with the ever-changing load situation of a cell, which optimizes the usage efficiency of radio resources in accordance with time. Accordingly, it is possible to improve the throughput as a system.

Further, the MME can change the setting of each cell, which allows optimum setting as a system. Accordingly, an effect that the throughput as a system can be further improved is achieved.

The first embodiment and the first modification to fourth modification thereof have described that the throughput as a system can be increased by setting the discrimination between support and non-support for DL CoMP depending on various cases.

However, even in a case where discrimination is made as non-support for DL CoMP, there occurs a case where an increase of the cell coverage, an improvement of the cell-edge reception quality and an improvement of the throughput are desired temporarily. It suffices that in such a case, the setting for discrimination between support and non-support for DL CoMP, which has been disclosed in the fourth modification of the first embodiment, is performed in a semi-static manner. As another method, the method below is disclosed. The information that temporarily requires DL CoMP of the information set as not to support DL CoMP is mapped on the logical channel supporting DL CoMP and transmitted. As a result, DL CoMP is performed on the PDSCH to which the logical channel is mapped, and thus the information is subjected to DL CoMP in the UE being a DL CoMP target, which makes it possible to improve the reception quality of the information. This temporarily increases the cell coverage of the information, improves the cell-edge reception quality and improves a throughput even in the case of the information set not to support DL CoMP. Differently from the case where the setting for discrimination between support and non-support for DL CoMP is performed in a semi-static manner, there is no need to change the setting of an entire cell, which allows only the required information to temporarily support DL CoMP. This improves the throughput as a system more flexibly in accordance with a cell situation or system situation.

In a case where, for example, the PCCH is made not to support DL CoMP and the DCCH is made to support DL CoMP, the information related to ETWS notification mapped on a paging message is mapped to the DCCH, mapped to the PDSCH and is transmitted so as to temporarily support DL CoMP in the event of ETWS. This allows the UE located at the cell edge to perform DL CoMP of the information related to ETWS notification mapped on the DCCH, which increases the cell coverage, improves the cell-edge reception quality and improves a throughput for the information related to ETWS notification. The information related to ETWS notification is important information for cellular phone users, which is a matter of life, if not being received. Therefore, it is effective to make to support DL CoMP using the method disclosed here.

Besides, in a case where, for example, the PCCH is made not to support DL CoMP and the DCCH is made to support DL CoMP, the information indicating the system information change mapped on the paging message is mapped on the DCCH, mapped to the PDSCH and then transmitted so as to temporarily support DL CoMP in system information change. This allows the UE located at the cell edge to perform DL CoMP of the information indicating the system information change mapped on the DCCH, which increases the cell coverage, improves the cell-edge reception quality and improves a throughput for the information indicating the system information change. The information indicating the system information change is important information for cellular phone users who cannot communicate with the cell, if not being received. Therefore, it is effective to support DL CoMP using the method disclosed here.

The matters disclosed in the first embodiment and the first modification to fourth modification thereof are not required to be used individually but may be used in combination. Setting can be made by better combination as a system, and system design can be made flexible for a communication load, whereby it is possible to improve the throughput as a system.

While the first embodiment and the first modification to fourth modification thereof have described the case of DL CoMP, which are not limited to DL CoMP and may be applied to the case of UL CoMP. Discrimination between support and non-support for UL CoMP may be made in accordance with a logical channel, discrimination between support and non-support for UL CoMP may be made in accordance with an information type, discrimination between support and non-support for UL CoMP may be made in accordance with a UE state, setting for discrimination between support and non-support for UL CoMP may be made for each cell, or setting for discrimination between support and non-support for UL CoMP may be made in a semi-static manner.

This allows to improve the usage efficiency of radio resources as a system also in the UL as in the case of DL, which increases the throughput as a system.

Second Embodiment

Figure 27:
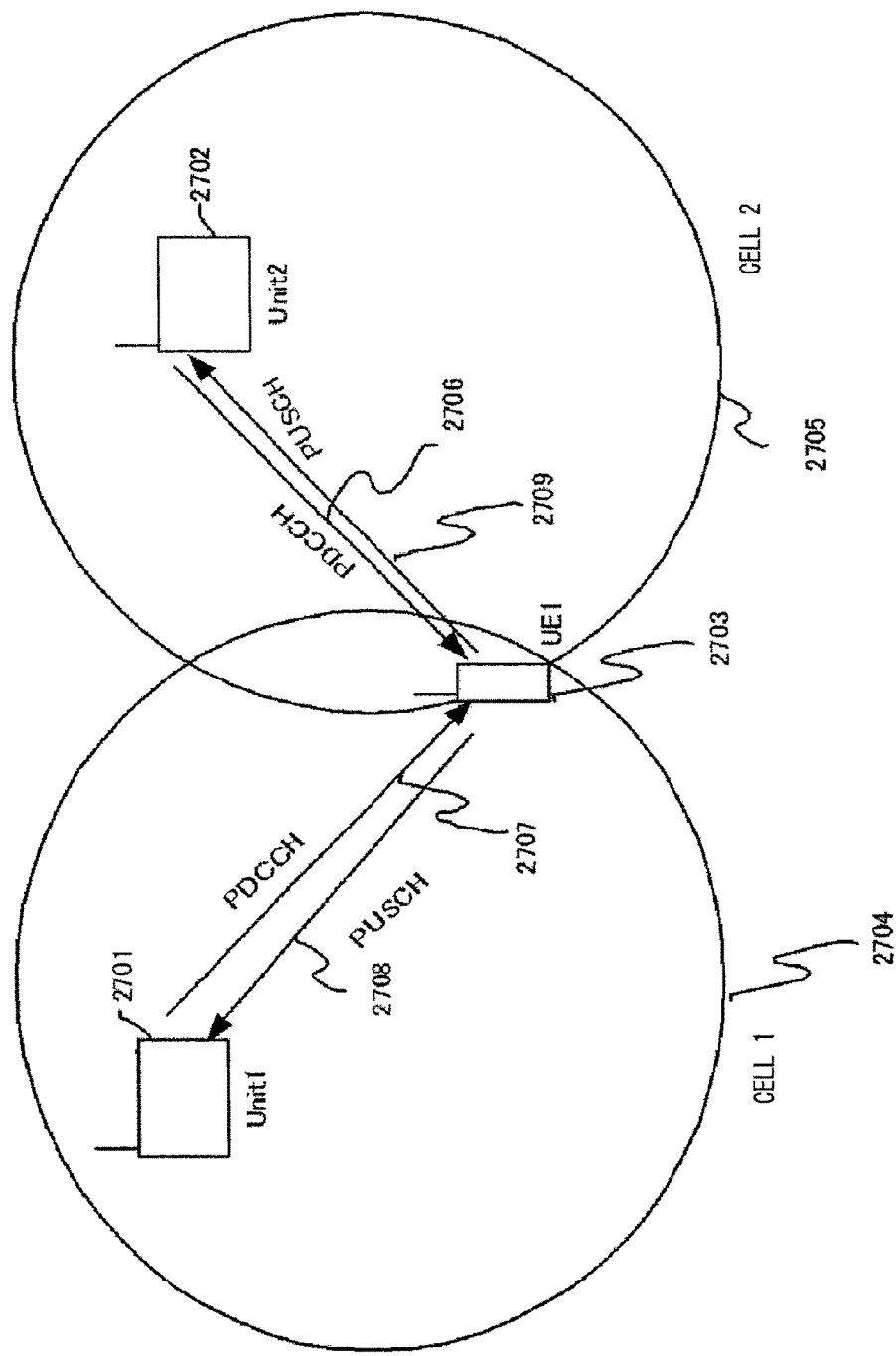
FIG. 27 is a conceptual diagram of UL CoMP.

As a new technique for LTE-A, UL CoMP is studied. As described above, in UL CoMP, uplink data from one user equipment (UE) is received at multiple points in a coordinated manner. The pieces of data received at the multiple points are combined, to thereby improve the uplink reception quality from a UE. FIG. 27 is a conceptual diagram of UL CoMP. A multi-point unit 1 (unit 1) 2701 and a multi-point unit 2 (unit 2) are units that perform UL CoMP, that is, uplink coordinated multiple point reception. 2704 denotes a cell formed by the unit 1, and 2705 denotes a cell formed by the unit 2. 2703 denotes a user equipment (UE 1) being a UL CoMP target. In UL CoMP, a plurality of multi-point cells receive the PUSCH transmitted from one UE. That is, the UE 1 transmits the same PUSCH to the cell 1 and the cell 2 (2708, 2709). The cell 1 and the cell 2 are capable of improving the reception quality of the uplink data from the UE by combination of the PUSCHs transmitted from the UE 1. Accordingly, it is possible to increase the coverage of high data rates, improve the cell-edge throughput and increase the system throughput, which are aimed in UL CoMP.

The allocation information to the physical resources (resource blocks) of the PUSCH, for example, the allocation information in a frequency-time domain is transmitted to the UE on the PDCCH that is a downlink physical channel. In general, cells each have MAC having a scheduling function individually. Therefore, different scheduling is performed in each cell, and the physical resource allocation information of the PUSCH that varies for each cell is transmitted on the PDCCH from each cell. However, in order to perform UL CoMP, it is required to keep the reception timing of the uplink PUSCH from the UE within a certain range in the respective cells that perform UL CoMP. This is because the PUSCHs from the UE, which have been received by the respective cells, have to be combined between cells. Combination is performed after the reception of the respective cells, and thus in a case where there is a large difference between reception timings, a large delay is generated between transmission and reception.

Therefore, respective cells that perform UL CoMP perform scheduling allocation to UEs being UL CoMP targets through adjustment therebetween such that the physical resource of the PUSCH is kept in a certain time range. The UE, which has received the information on physical resource allocation of the PUSCH adjusted between the respective cells on PDCCHs (in FIGS. 27, 2707 and 2706) from the respective cells, maps the same PUSCH to those physical resources and transmits the PUSCH. This enables UL CoMP.

Figure 28:
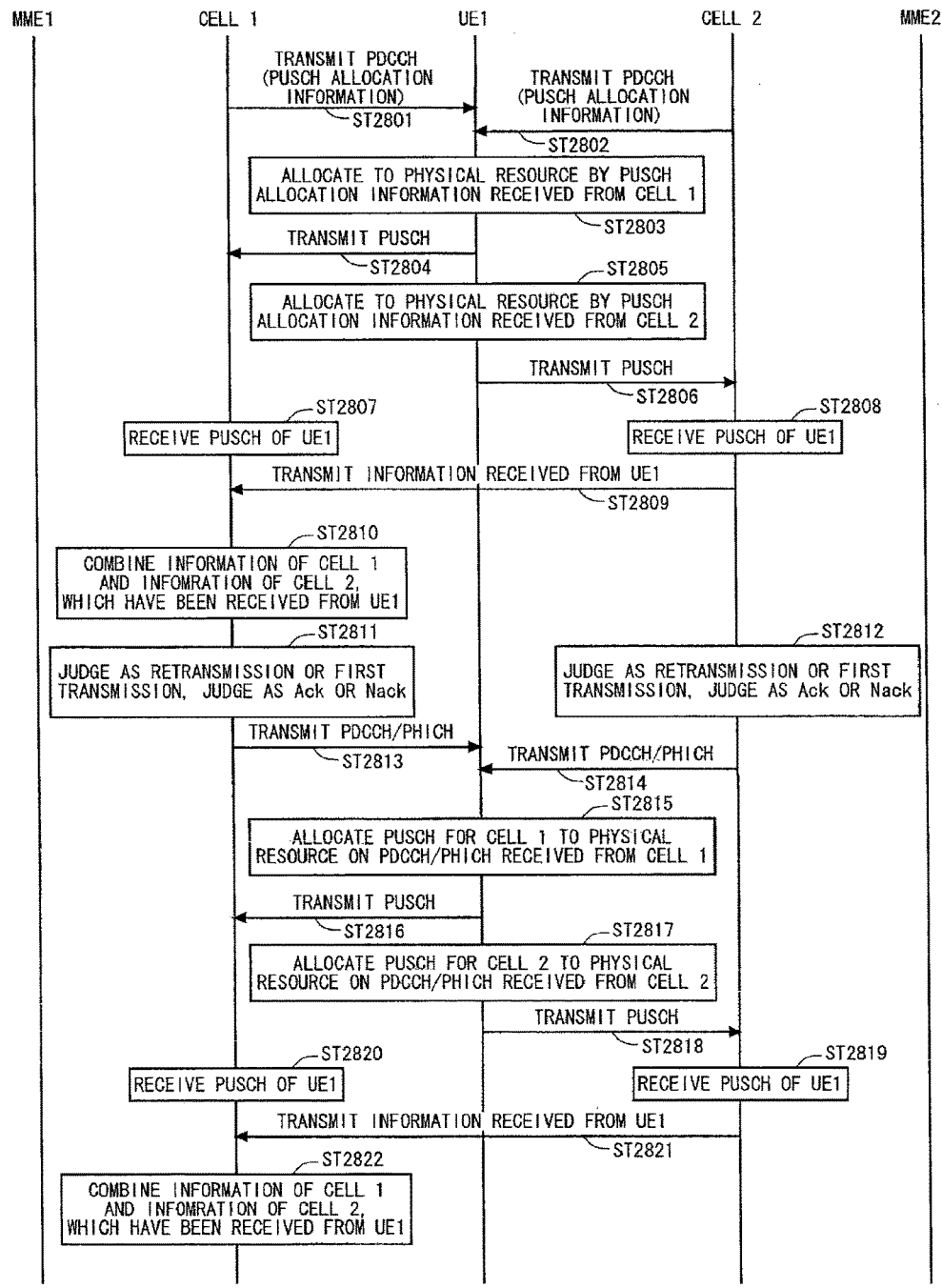
FIG. 28 is a sequence diagram in a case of performing UL CoMP.

An example of a sequence diagram when UL CoMP is performed is shown in Step ST2801 to Step ST2810 of FIG. 28. The cell 1 and the cell 2 adjust the timing of physical resource scheduling of the PUSCH to the UE (UE 1) being a UL CoMP target by the above-mentioned method, and each thereof transmits the PUSCH allocation information on the PDCCH (Step ST2801, Step ST2802). In Step ST2803, the UE 1 allocates the PUSCH to the physical resource in accordance with the allocation information of the PUSCH that has been received from the cell 1 and transmits the PUSCH in Step ST2804. Similarly, in Step ST2805, the UE 1 allocates the same PUSCH as the PUSCH transmitted to the cell 1 to the physical resource in accordance with the allocation information of the PUSCH that has been received from the cell 2, and transmits the PUSCH in Step ST2806. In Step ST2807 and Step ST2808, the cell 1 and cell 2 each receive the PUSCH from the UE 1. In Step ST2809, the cell 2 transmits the information received from the UE 1 to the cell 1. In Step ST2810, the cell 1 combines the received information of the cell 1 and the received information of the cell 2, which have been transmitted from the UE 1. This improves the reception quality from the UE 1.

In the case of the above-mentioned method, however, the timing of the physical resource for allocation of the PUSCH needs to be adjusted in advance between the cell 1 and the cell 2 and be scheduled, and the allocation information of the PUSCH has to be transmitted to the UE 1 from each cell on the PDCCH. The UE 1 needs to allocate, for each cell, the same PUSCH to the physical resource in accordance with the allocation information of the PUSCH from each cell. This means that the same PUSCH is allocated to the physical resource in an overlapping manner, leading to a decrease in usage efficiency of uplink radio resources. This increases the transmission power of a UE as well, leading to an increase in power consumption.

In order to solve the above-mentioned problem, the present embodiment discloses that each cell that performs UL CoMP transmits the same physical resource allocation information of the PUSCH to the UE being a UL CoMP target.

This allows the UE being a UL CoMP target to receive the same PUSCH physical resource allocation information transmitted on the PDCCH from each cell. The UE maps the same uplink transmission data on the PUSCH to be transmitted to each cell, allocates the PUSCH to the physical resource in accordance with the received PUSCH physical resource allocation information, and transmits the PUSCH to each cell. The conceptual diagram in this case is the same as FIG. 27. While the sequence diagram corresponds to Step ST2801 to Step ST2810 of FIG. 28, the PUSCH allocation information transmitted from each cell in Step ST2801 and Step ST2802 of FIG. 28 is the same between cells, and accordingly the UE allocates the PUSCH for each cell to the same physical resource in Step ST2803 and Step ST2805. As a result, in Step ST2804 and Step ST2806, the UE transmits the PUSCH for each cell with the same physical resource.

In this case, the physical resource allocation information of the PUSCH needs to be shared in advance between cells that perform UL CoMP. For this reason, it suffices that the physical resource allocation information of the PUSCH is mutually notified between the cells in Step ST2801 or before performing Step ST2801. The physical resource of the PUSCH may be allocated by the serving cell such that the serving cell notifies other cell that performs UL CoMP of the allocation. Those notifications may be performed by means of the interface (X2) between the cells, the interface (S1) between the MME and cell, or the interface between the MMEs as described in the first embodiment.

As a result, the UE transmits the PUSCH with the same physical resource to each cell that performs UL CoMP, which means that only one uplink physical resource is required to be used for one PUSCH. Therefore, it is possible to avoid a decrease in usage efficiency of radio resources. Further, transmission is not performed simultaneously with a plurality of physical resources, leading to effects that the transmission power of a UE is prevented from increasing and the power consumption is prevented from increasing.

Further, it suffices that the PUSCH allocation information is received from any one of cells without receiving the PUSCH allocation information on the PDCCHs of all cells that perform UL CoMP. On the contrary, the reception from a plurality of cells achieves an effect that the reception quality of the information can be improved.

In the case of the above-mentioned method, however, the timing of the physical resource for allocating the PUSCH needs to be adjusted in advance between the cell 1 and the cell 2 and be scheduled, and the allocation information of the PUSCH has to be transmitted to the UE 1 from each cell on the PDCCH. This means that the PDCCH has to be transmitted to the UE being a UL CoMP target from two cells, leading to an increase in signaling capacity. Further, the UE needs to receive the PDCCH from two cells, leading to an increase in size of a receiver circuit of a UE and an increase in power consumption.

Disclosed here is that scheduling allocation of the PUSCH is performed from one cell in UL CoMP for solving the above-mentioned problems in addition to the problems of a decrease in usage efficiency of uplink radio resources and an increase in power consumption of a UE. The UE being a UL CoMP target complies with the allocation information of the PUSCH from the one cell. The serving cell of a UE being a UL CoMP target may be used as this one cell. This does not require the UE to recognize whether or not own UE is a UL CoMP target but requires to receive the PDCCH of only the serving cell. This makes control for UL CoMP in the UE simpler and also prevents an increase in size of the control circuit of the UE. Moreover, it is possible to prevent an increase in power consumption for UL CoMP.

Figure 29:
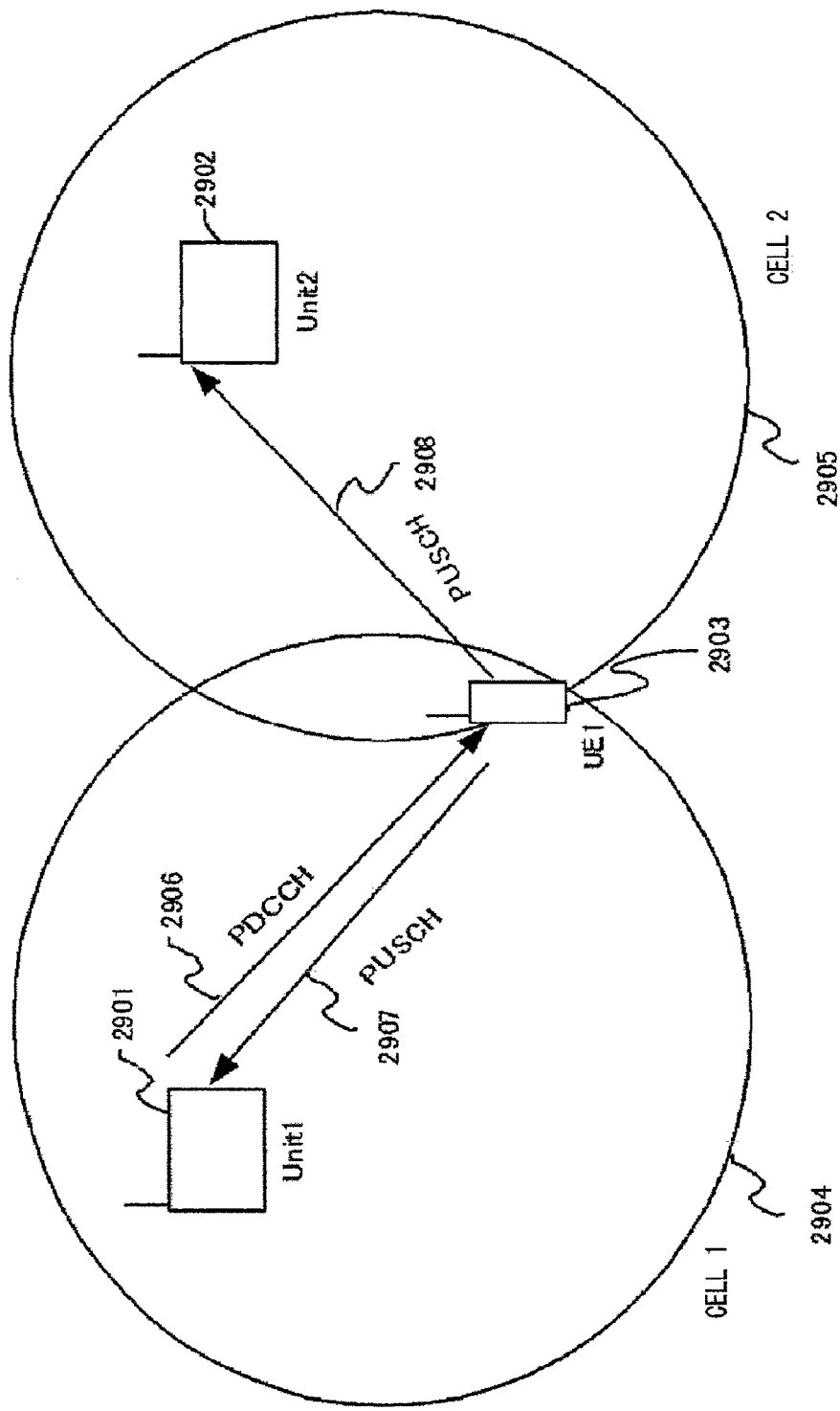
FIG. 29 is a conceptual diagram of a method of transmitting PUSCH allocation information from one cell in UL CoMP.

FIG. 29 is a conceptual diagram of the method of transmitting the PUSCH allocation information from one cell in UL CoMP. 2901 to 2905 are similar to 2701 to 2705 of FIG. 27, and thus description thereof is omitted. 2906 denotes the PDCCH on which the PUSCH allocation information is mapped, which is transmitted from a cell 1 to a UE 1. 2907 denotes the PUSCH allocated to a physical resource in accordance with the PUSCH allocation information, which is transmitted from the UE 1. On this occasion, the UE 1 does not particularly need to transmit the PUSCH to a cell 2, and it suffices that the cell 2 receives the PUSCH transmitted from the UE 1 (2908). The cell 1 and the cell 2 combine the PUSCHs transmitted from the UE 1, and accordingly are capable of improving the reception quality of the uplink data from the UE. It is possible to increase the coverage of high data rates, improve the cell-edge throughput and increase the system throughput, which are aimed in UL CoMP.

Step ST3001 to Step ST3010 of FIG. 30 show an example of the sequence diagram of the method of transmitting the PUSCH allocation information from one cell in UL CoMP. The serving cell of the UE (UE 1) being a UL CoMP target is the cell 1, and the cell that performs UL CoMP is the cell 2. The cell 1 performs scheduling of the physical resource of the PUSCH to the UE 1 and transmits the PUSCH allocation information to the cell 2 (Step ST3001). In Step ST3002, the cell 1 transmits the PUSCH allocation information to the UE 1 on the PDCCH. In Step ST3003, the UE 1 receives the PDCCH from the cell 1 and performs allocation to a physical resource by the PUSCH allocation information received from the cell 1 in Step ST3004. Then, in Step ST3005, the UE 1 transmits the PUSCH. On this occasion, the UE 1 transmits the PUSCH to the cell 1, where the cell 1 and the cell 2 both receive the PUSCH transmitted from the UE 1 (Step ST3006). In Step ST3007, the cell 1 receives the PUSCH from the UE 1. In Step ST3008, the cell 2 receives the PUSCH from the UE 1 as well. On this occasion, it suffices that the cell 2 receives the PUSCH from the UE 1 based on the PUSCH allocation information for the UE 1, which has been received from the cell 1 in Step ST3001. In Step ST3009, the cell 2 transmits the information received from the UE 1 to the cell 1. In Step ST3010, the cell 1 combines the information of the cell 1 and the information of the cell 2, which have been received from the UE 1. This allows to improve the reception quality from the UE 1.

The use of the method disclosed in the present embodiment does not require the transmission of the PDCCH from two cells to a UE being a UL CoMP target, which prevents an increase of signaling capacity. In addition, the UE 1 is not required to allocate the same PUSCH to physical resources of two cells in an overlapping manner, which prevents a decrease in usage efficiency of uplink radio resources. Further, this prevents an increase in transmission power of a UE and an increase in power consumption. Further, it is possible to increase the coverage of high data rates, improve the cell-edge throughput and increase the system throughput, which are aimed in UL CoMP.

While the description has been given of a fact that the UE does not need to receive the allocation information of physical resources of the PUSCH from all cells that perform CoMP, not limited thereto, and it is not required to receive scrambling codes of other cells of the serving cell and identifiers (UE-ID, C-RNTI) of a UE in a cell. There is achieved an effect that control in UL CoMP can be made much simpler.

While the description has been given of a fact that the cell (in this case, serving cell, cell 1) that performs PUSCH allocation transmits the PUSCH allocation information to the other cell (in this case, cell 2) that performs CoMP in Step ST3001, the cell may notify the information required for decoding of the PUSCH from the UE. Examples of such information include UE identifiers (UE-ID, C-RNTI) used by the cell 1 and/or a scrambling code for each UE that is used by the cell 1. The above-mentioned information may be notified by means of the interface (X2) between the cells or the interface (S1) between the cell and the core network (MME). Alternatively, notification may be made via the MME. This allows the cell 2 to receive and decode the PUSCH from the UE 1. Therefore, the transmission of the decoded information to the cell 1 enables the cell 1 to perform combining by the decoded information.

It has been disclosed that the cell 1 transmits UE identifiers (UE-ID, C-RNTI) used by the cell 1 and/or a scrambling code for each UE used by the cell 1 to the cell 2. Alternatively, as another method, UE identifiers (UE-ID, C-RNTI) used by a UE being a UL CoMP target and/or a scrambling code for each UE may be predetermined. Besides, the deriving method for the information may be predetermined, and the deriving method may be shared by a cell and a UE, so that the same results are individually derived by the cell and UE. Examples of input parameters used in derivation include a UE identifier (IMSI). As a result, the cell that performs PUSCH allocation does not need to notify the other cell that performs CoMP of the information necessary for decoding the PUSCH. Accordingly, it is possible to reduce a signaling amount generated between the cells (X2) or between the cell and the core network (MME) (S1).

In the example above, the PDCCH from the other cell that performs UL CoMP to the UE being a UL CoMP target has not been described, and transmission is not necessarily required. The PDCCH may not be transmitted from the other cell that performs UL CoMP to the UE being a UL CoMP target. This eliminates the need for allocating the UE identifiers (UE-ID, C-RNTI) to the UE by the other cell. The UE identifiers can be used for the other cell, which prevents the identifiers from being wasted. Further, the PDCCH is not transmitted to the UE, whereby it is possible to prevent a PDCCH physical resource from being wasted.

The other cell (cell 2) that performs UL CoMP may not allocate, to the other cell whose serving cell is the cell 2, the uplink physical resource to the UE being a UL CoMP target that has been notified from the cell 1. As a result, transmission is not performed from the other UE at the same frequency in the same time domain as those of the PUSCH from the UE 1 being a UL CoMP target, which eliminates the interference with the PUSCH by the UE 1 and improves the reception quality in the cell 2. This further improves the reception quality after combining, whereby it is possible to increase the coverage of higher data rates, improve the cell-edge throughput, and increase the system throughput.

In contrast, the other cell (cell 2) that performs UL CoMP may permit the allocation of the uplink physical resource to the UE being a UL CoMP target that has been notified from the cell 1 to another UE whose serving cell is the cell 2. The PDSCH of the UE is caused to be multiplied by the scrambling code for each UE, whereby the cell is capable of detecting from which UE the PDSCH has been transmitted. This achieves an improvement in usage efficiency of physical resources of the PUSCH, for example, the same physical resource as that of the PUSCH of the UE 1 is allocated to the UE located at the center of the cell being served by the cell 2.

Third Embodiment

In general, the respective cells have MAC having a scheduling function individually. In MAC, HARQ is performed on a UE. In a case where UL CoMP is performed between such cells, one MAC is composed for each cell, and HARQ is performed for each cell by the MAC. The uplink (UL, uplink) HARQ is performed by the following method using the PDCCH and PHICH (Non-Patent Document 1). Ack/Nack is transmitted on the PHICH. In a case where there is the PDCCH for the UE, the UE complies with a first transmission request or a retransmission request of the PDCCH irrespective of the contents of the PHICH. In this case, allocation of the physical resources complies with the PDCCH. In a case where there is no PDCCH for the UE, the UE complies with Ack/Nack transmitted on the PHICH. In the case of Nack, the UE performs retransmission by the same physical resource allocation as that of the former transmission. In the case of Ack, the UE does not perform any uplink transmission but complies with the PDCCH to be transmitted later. By the above-mentioned method, the uplink HARQ is performed on the PDCCH and PHICH for each cell (multi-point cell) that performs UL CoMP.

Step ST2811 to Step ST2822 of FIG. 28 show an example of the sequence diagram of the uplink HARQ in a case where UL CoMP is performed. This is the case where the physical resource allocation of the PUSCH that has been adjusted between cells is transmitted to the UE being a UL CoMP target on the PDCCH from the respective cells and the UE that has received the PDCCH from the respective cells maps the same PUSCH to the physical resources of the respective cells and transmits the PUSCH.

In Step ST2807, the cell 1 receives the PUSCH from the UE 1, and performs the uplink HARQ based on the results thereof in Step ST2811, to thereby judge as retransmission or first transmission to the UE 1 and/or Ack or Nack. In Step ST2813, the cell 1 transmits the PDCCH and/or PHICH to the UE 1 based on the judgment results. While, the cell 2 also receives the PUSCH from the UE 1 in Step ST2808, and performs the uplink HARQ in Step ST2812 based on the results thereof, to thereby judge as retransmission or first transmission to the UE 1 and/or Ack or Nack. In Step ST2814, the cell 2 transmits the PDCCH and/or PHICH to the UE 1 based on the judgment results.

The UE 1 determines to perform retransmission or first transmission, or transmit nothing based on the PDCCH and/or PHICH received from the cell 1. In the case of retransmission or first transmission, the UE 1 allocates the PUSCH for the cell 1 to the physical resource in accordance with the contents transmitted on the PDCCH and/or PHICH (Step ST2815). In Step ST2816, the UE 1 transmits the PUSCH to the cell 1. Further, the UE 1 determines whether to perform retransmission or first transmission, or transmit nothing based on the PDCCH and/or PHICH received from the cell 2. In the case of retransmission or first transmission, the UE 1 allocates the PUSCH for the cell 2 to the physical resource in accordance with the contents transmitted on the PDCCH and/or PHICH (Step ST2817). In Step ST2818, the UE 1 transmits the PUSCH to the cell 2.

In Step ST2820, the cell 1 receives the PUSCH from the UE 1. In Step ST2819, the cell 2 receives the PUSCH from the UE 1. In Step ST2821, the cell 2 transmits the information received from the UE 1 to the cell 1. In Step ST2822, the cell 1 combines the information received from the UE 1 by own cell and the information received from the UE 1 that has been transmitted from the cell 2.

Even when the UE 1 transmits the same PUSCH to the cell 1 and the cell 2, however, the reception results differ between the cell 1 and the cell 2 in some cases. This is because the radio wave propagation environment differs for each cell. Accordingly, in some cases, the results of judgment as retransmission or first transmission to the UE 1 by the uplink HARQ and/or judgment as Ack or Nack vary between cells. For example, judgment is made as first transmission in the cell 1, whereas judgment is made as retransmission in the cell 2. In this case, the UE 1 transmits the PUSCH on which the first data is mapped to the cell 1 in Step ST2816, and transmits the PUSCH on which the retransmission data is mapped to the cell 2 in Step ST2818. That is, the state in which the uplink HARQ is individually performed on each cell occurs, leading to a state in which the UE 1 transmits different PDSCHs to the respective cells. In such a case, even when the cell 1 combines the information received from the UE 1 by own cell and the information received from the UE 1 that has been transmitted from the cell 2, it is useless. It is impossible to perform UL CoMP. As a result, the coverage of high data rates cannot be increased, the cell-edge throughput cannot be improved, and the system throughput cannot be increased by UL CoMP.

In order to solve the above-mentioned problem, there is a method in which the uplink HARQ is not performed on the UE being a UL CoMP target in a case where UL CoMP is performed. The use of this method solves a problem that UL CoMP cannot be performed, which results from the application of uplink HARQ. However, the uplink HARQ is not performed, whereby the uplink throughput decreases. Therefore, the above is canceled by the effect of improving an uplink throughput obtained in the case where UL CoMP is performed, and thus the throughput cannot be improved considerably as a system.

In the present embodiment, further, the uplink HARQ is performed on a target UE in a case where UL CoMP is performed for solving the above-mentioned problem.

Any one of cells that perform UL CoMP transmits the results of the judgment as retransmission or first transmission to the UE by the uplink HARQ and/or the judgment as Ack or Nack. The UE receives the judgment results from any one of those cells and complies with the judgment results.

This allows to perform the uplink HARQ on the UE being a UL CoMP target. Therefore, owing to an improvement in uplink throughput by the uplink HARQ and an improvement in uplink throughput by UL CoMP, it is possible to increase the coverage of higher data rates, improve the cell-edge throughput, and increase the system throughput. Any one of the cells that transmit the judgment results to a UE being a UL CoMP may be taken as a serving cell. The UE receives the PDCCH from the serving cell for PUSCH transmission. The physical resource allocation of the PHICH from the serving cell is determined by a physical resource (resource block) of the PUSCH to be allocated. The judgment results are transmitted from the serving cell, with the result that the UE does not need to receive PDCCH and/or PHICH from another cell other than the serving cell for UL CoMP. This makes control of UL CoMP in the cell and the UE simpler, which achieves a reduction in circuit size and a reduction in power consumption of the cell and the UE.

The uplink HARQ for a UE being a UL CoMP target may be performed by any one of cells. The uplink HARQ is performed by any one of cells, and accordingly another cell does not need to perform uplink HARQ for the UE, which eliminates wasteful processing in another cell. The serving cell may be the above-mentioned any one of cells. This allows the serving cell to perform scheduling of the physical resource of the PUSCH in the first transmission up to HARQ. In addition, when the serving cell is configured to transmit the judgment results, the serving cell can consistently perform scheduling of the physical resource of the PUSCH in the first transmission up to HARQ, and further transmission of judgment results by HARQ, which makes control of uplink HARQ in UL CoMP simpler. It is only required for the UE to receive only the scheduling information from the serving cell and comply with the received results, whereby the uplink HARQ can be controlled easily in a simple manner in UL CoMP. Further, it is possible to unify the method of controlling the uplink HARQ regardless of whether or not UL CoMP is performed, with the result that the size of a control circuit can be reduced and control malfunctions can be reduced in the cell and the UE.

Figure 31:
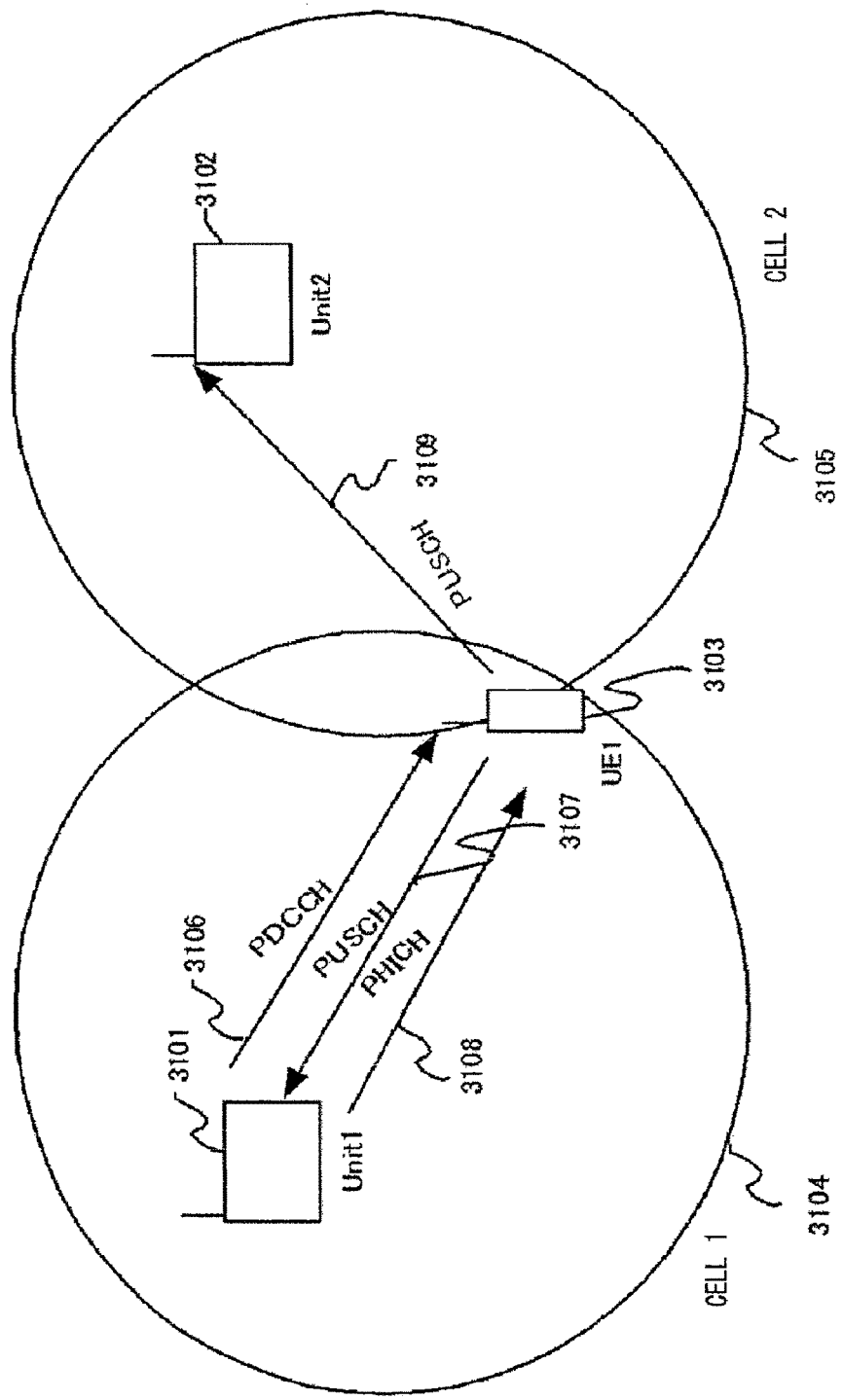
FIG. 31 is a conceptual diagram in a case where the uplink HARQ judgment results are transmitted from one cell in UL CoMP.

FIG. 31 is a conceptual diagram in a case where the judgment results of uplink HARQ are transmitted from one cell in UL CoMP. 3101 to 3105 are similar to 2701 to 2705 FIG. 27, and thus description thereof is omitted. The cell 1 is a serving cell of the UE 1. 3106 denotes the PDCCH transmitted from the cell 1 to the UE 1, on which the PUSCH allocation information, or the information indicating whether retransmission or first transmission based on the judgment results of uplink HARQ and the physical resource allocation information of the PDSCH on which the retransmission or first transmission is mapped are mapped. 3107 denotes the PUSCH allocated to the physical resource in accordance with the PUSCH allocation information, which is transmitted from the UE 1. In this case, the UE 1 does not particularly need to transmit the PUSCH to the cell 2, and it suffices that the cell 2 receives the PUSCH transmitted from the UE 1 (3109). 3108 denotes the PHICH transmitted from the cell 1 to the UE 1, on which Ack or Nack information based on the judgment results of uplink HARQ is mapped. The cell 1 and the cell 2 combine the PUSCHs transmitted from the UE 1, and are accordingly capable of improving the reception quality of the uplink data from the UE. This makes it possible to increase the coverage of high data rates, improve the cell-edge throughput and increase the system throughput, which are aimed in UL CoMP, while improving a throughput due to the uplink HARQ.

The sequence diagram in a case where judgment results of uplink HARQ are transmitted from one cell in UL CoMP is shown in Step ST3011 to Step ST3020 of FIG. 30. The diagram shows, as an example, the case where the serving cell (cell 1) performs the uplink HARQ and the serving cell transmits the results of the HARQ to the UE (UE 1) being a UL CoMP target. The serving cell of the UE (UE 1) being a UL CoMP target is a cell 1, while the cell that performs UL CoMP is a cell 2.

In Step ST3010, the cell 1 combines the information received from the UE 1 by own cell and the information received from the UE 1 that has been transmitted from the cell 2. In Step ST3011, the cell 1 performs the uplink HARQ based on the combined received information, to thereby make a judgment as retransmission or first transmission to the UE 1 and/or Ack or Nack. In Step ST3012, the cell 1 transmits, to the cell 2, the next PUSCH allocation information for the UE 1 and, in Step ST3013, transmits the PDCCH and/or PHICH to the UE 1.

The UE 1 determines whether to perform retransmission or first transmission, or transmit nothing in accordance with the contents of the PDCCH and/or the PHICH received from the cell 1. In the case of retransmission or first transmission, the UE 1 allocates the PUSCH for the cell 1 to the physical resource in accordance with the contents transmitted on the PDCCH and/or PHICH (Step ST3014). In Step ST3015, the UE 1 transmits the PUSCH to the cell 1. In this case, the UE 1 transmits the PUSCH to the cell 1, and besides, the cell 1 and the cell 2 receive the PUSCH transmitted from the UE 1 (Step ST3016). In Step ST3017, the cell 1 receives the PUSCH from the UE 1. In Step ST3018, the cell 2 receives the PUSCH from the UE 1 as well. In this case, it suffices that the cell 2 receives the PUSCH from the UE 1 based on the PUSCH allocation information for the UE 1 that has been received from the cell 1 in Step ST3012. In Step ST3019, the cell 2 transmits the information received from the UE 1 to the cell 1. In Step ST3020, the cell 1 combines the information of the cell 1 and the information of the cell 2 that have been received from the UE 1.

This enables to improve the reception quality from the UE 1. After that, the HARQ is performed again in the cell 1. In Step ST3012, the cell 1 transmits the next PUSCH allocation information for the UE 1 to the cell 2 based on the judgment results. In a case where the judgment results indicate that the PDCCH is not transmitted, however, it suffices that the cell 1 transmits the information indicating the above, for example, the information indicating Ack or Nack to the UE 1. In the case of Nack, the PDSCH on which retransmission is mapped is allocated to the same physical resource as that allocated last time. Accordingly, when the cell 2 holds the physical resource allocated the last time, the cell 2 can receive retransmission from the UE 1 in Step ST3018 even if the cell 1 transmits only the information indicating Nack to the cell 2. In the case of Ack, the UE does not perform any uplink transmission such as retransmission or first transmission, and is accordingly not required to transmit PDSCH allocation. The UE complies with PUSCH allocation on the next PDCCH. For this reason, the cell 1 may transmit only the information indicating Ack to the cell 2. Further, it suffices that the UE receives, from the cell 1, the PUSCH allocation information on the following PDCCH. This reduces a signaling amount generated between the cells (X2) or between the cell and the core network (MME) (S1).

The method disclosed above achieves an increase in coverage of high data rates, an improvement in cell-edge throughput and an increase in system throughput, which are aimed in UL CoMP, while improving a throughput by uplink HARQ.

The description has been given of a fact that the UE is not required to receive the PDCCH and/or PHICH from all cells that perform UL CoMP. Besides, the UE is not required to receive a scrambling code of another cell other than the serving cell and UE identifiers (UE-ID, C-RNTI) in a cell for UL CoMP. There is achieved an effect that control in UL CoMP in the UE can be made much simpler.

While it has been described that the PUSCH allocation information is transmitted in Step ST3012, as in the description of Step ST3001, the information required for decoding the PUSCH from the UE may be notified, or the deriving method may be predetermined. The information between the cells that perform UL CoMP may be notified by means of the interface (X2) between the cells or by means of the interface (S1) between the cell and the core network (MME). Notification may be made via the MME. The use of those methods enable to achieve similar effects to those described in the second embodiment.

The other cell (cell 2) that performs UL CoMP may not allocate, to another UE whose serving cell is the cell 2, the uplink physical resource to the UE being a UL CoMP target that has been notified from the cell 1 in Step ST3012. Alternatively, allocation may be permitted. Similar effects to those described in the second embodiment are achieved.

In the method disclosed above, as the uplink HARQ, the cell 1 transmits the PDCCH and/or PHICH to the UE 1 based on the results of the judgment as retransmission or first transmission to the UE 1 and/or the judgment as Ack or Nack. As another method, the judgment results of retransmission or first transmission may be transmitted to the UE being a UL CoMP target only on the PDCCH as the uplink HARQ. As a result, the UE is not required to receive the PHICH, which leads to less power consumption of the UE. In addition, even the information indicating Ack or Nack does not need to be transmitted between cells, whereby it is possible to reduce a signaling amount generated between the cells (X2) or between the cell and the core network (MME) (S1).

In the method disclosed above, the serving cell judges as retransmission or first transmission and/or judges as Ack or Nack as to the received results in which pieces of information received from the cells that perform UL CoMP are combined. As another method, each cell that performs UL CoMP may judge as retransmission or first transmission and/or judge as Ack or Nack. Each cell notifies the serving cell of the judgment results by own cell. The serving cell determines the judgment as retransmission or first transmission and/or judgment as Ack or Nack for the UE being a UL CoMP target based on the judgment results from each cell, and transmits the determination to the UE. The X2 interface or the S1 interface may be used for the judgment results notified from each cell to the serving cell. The serving cell finally judges as retransmission or first transmission and/or judges as Ack or Nack for the UE being a UL CoMP target, whereby only X2 can be used. In the case of using the X2 interface, there is achieved an effect that control delays are reduced compared with the case of using the S1 interface.

The core network (MME) may make a judgment without judging, by the serving cell, as retransmission or first transmission and/or judging as Ack or Nack for the UE being a UL CoMP target. Each cell that performs UL CoMP notifies the MME of the judgment results by own cell by means of the S1 interface. The MME finally judges as retransmission or first transmission and/or judges as Ack or Nack based on the judgment results from the cell that performs UL CoMP. The MME notifies the serving cell of the judgment results by means of the S1 interface. The serving cell that has received the judgment results from the MME transmits the PDCCH and/or PHICH to the UE 1 in accordance with the judgment results. The MME finally judges as retransmission or first transmission and/or judges as Ack or Nack, with the result that the judgments can be unified by the MME regardless of which cell is a serving cell. This allows flexible support for a change of a serving cell.

In the methods disclosed in the second embodiment and the present embodiment, the information indicating which cell is a serving cell may be transmitted between cells or via a MME, so that each cell that performs UL CoMP recognizes which cell is a serving cell. The information may be transmitted from the serving cell to another cell that performs UL CoMP by means of the X2 interface or may be transmitted from the MME to each cell that performs UL CoMP by means of the S1 interface. Accordingly, only the serving cell can transmit the PDCCH, judge as first transmission or retransmission or judge as Ack or Nack, and transmit the PHICH, for the UE being a UL CoMP target.

First Modification of Third Embodiment

In order to solve the problems described in the third embodiment, this modification discloses another method of performing the uplink HARQ on a UE being a target in a case where UL CoMP is performed.

All cells that perform UL CoMP transmit, to the UE being a UL CoMP target, the PDCCH and/or PHICH on which the same judgment as retransmission or first transmission and/or Ack or Nack is mapped. In a case where the retransmission information is mapped on the PDCCH, all the cells transmit the PDCCH on which the same physical resource allocation information for retransmission is mapped.

As an example, FIG. 32 is a sequence diagram in a case where the same judgment results are transmitted from all the cells that perform UL CoMP. FIG. 32 is identical to FIG. 28 in part, and thus description of the identical parts is omitted. Steps from Step ST3201 to Step ST3203 are added in FIG. 32. In Step ST2811 and Step ST2812, the respective cells (cell 1, cell 2) that perform UL CoMP judge as retransmission or first transmission and/or judge as Ack or Nack, and then in Step ST3201, transmit/receive the judgment results between cells each other. The respective cells derive one judgment result from the combination of the received judgment results of the other cell that performs UL CoMP and the judgment results of own cell (Step ST3202, Step ST3203). The deriving method is predetermined such that the judgment results are the same among all the cells that perform UL CoMP. As a result, all the cells that perform UL CoMP transmit the information based on the same judgment results on the PDCCH and/or PHICH. This prevents retransmission or first transmission from varying for each cell. Therefore, it is possible to perform UL CoMP.

Accordingly, it is possible to further increase the coverage of high data rates, improve the cell-edge throughput and increase the system throughput, which are aimed in UL CoMP, while improving a throughput by the uplink HARQ.

As the method of mutually transmitting/receiving the judgment results between cells, the method disclosed in the second embodiment or the third embodiment may be used. As the method of deriving one judgment result from judgment results of the respective cells, for example, first transmission is set in a case where the judgment of any one of cells is first transmission. This is because if any one of cells receives the judgment result properly, reception is enabled by combination of pieces of received information in UL CoMP. While, Ack is set in a case where there is no judgment as retransmission or first transmission and any one of cells is judged as Ack. This is for the same reason. In a case where all the cells are judged as retransmission, retransmission is set. Further, in a case where there is no judgment as first transmission or retransmission and all the cells are judged as Nack, Nack is set. This means that all the cells cannot have performed reception, and thus all the cells have to perform retransmission. As a result of the above-mentioned deriving method being determined in advance, it is possible to derive one judgment result while considering the radio wave propagation situations of all the cells that perform UL CoMP. Accordingly, all the cells can transmit first transmission and/or Ack if any one of the cells has good reception quality even when any one of the cells has poor reception quality. This allows to improve the throughput as a system. In a case of this deriving method, the judgment results may be transmitted/received between cells only in a case of first transmission and/or Ack. This reduces a signaling amount between cells or between the core network and the cell.

The method disclosed in this modification may be used in combination with the method disclosed in the third embodiment. One judgment result may be derived from the judgment results of all the cells that perform UL CoMP, so that any one of cells that perform UL CoMP transmits this one judgment result to the UE being a CoMP target. As a result, all the cells can transmit first transmission and/or Ack if any one of the cells has good reception quality even when any of the cells has poor reception quality, which enables to improve the throughput as a system. At the same time, it is possible to increase the coverage of high data rates, improve the cell-edge throughput and increase the system throughput owing to UL CoMP. Alternatively, any one of the cells may be a serving cell. This only requires that the UE consistently receive the control information from the serving cell, leading to effects that the size of a control circuit can be reduced and that control malfunctions can be reduced in a cell and a UE.

The method disclosed in this modification may be used in combination with the method disclosed in the second embodiment. There can be achieved not only the effects described in this modification but also the effects described in the second embodiment.

Second Modification of Third Embodiment

In order to solve the problems described in the third embodiment, this modification discloses another method of performing uplink HARQ on a UE being a target in a case of performing UL CoMP.

The UE being a UL CoMP target may derive one judgment result based on the results of judgment as retransmission or first transmission and/or judgment as Ack or Nack from the respective cells in UL CoMP. The method disclosed in the first modification is applicable as the deriving method. It suffices that each cell maps the identification information indicating whether transmission is the first one or how many times transmission has been performed, such as a retransmission number or a first transmission number on the retransmission or first transmission data transmitted from the UE. Each cell performs the uplink HARQ based on the identification information. Although this requires that the UE receive the results of the judgment as retransmission or first transmission and/or judgment as Ack or Nack from each cell, each cell is not required to perform control for determining one judgment result for transmission. This modification is applicable to persistent scheduling or semi-persistent scheduling in which uplink transmission is periodically allocated. The allocation timing of first transmission has been determined, and thus even when different judgment results are transmitted to the UE from the respective cells, the respective cells can receive the transmission data (PUSCH) from the UE by performing the next transmission at the periodically-based transmission timing based on the judgment results performed in the UE. This increases the coverage of high data rates, improves the cell-edge throughput and increases the system throughput, which are aimed in UL CoMP, while improving a throughput by uplink HARQ.

Fourth Embodiment

PUSCH frequency hopping is performed in each cell in the LTE (Non-Patent Document 9, Non-Patent Document 10). The PUSCH frequency hopping pattern is derived using the cell identifiers (Cell-ID, PCI) for each cell. Thus, the PUSCH frequency hopping pattern varies among the cells (multi-point cells) that perform UL CoMP. For example, in the case where the serving cell among the cells that perform UL CoMP transmits the PUSCH allocation information to the UE being a UL CoMP target, which has been disclosed in the second embodiment to the second modification of the third embodiment, the hopping pattern serves as a hopping pattern used by the serving cell when frequency hopping is performed on the PUSCH. This means that the hopping pattern is different from a hopping pattern used by another cell that performs UL CoMP. Accordingly, another cell that performs UL CoMP does not recognize the frequency hopping pattern of the PUSCH of the UE, and thus cannot receive the PUSCH from the UE. As a result, UL CoMP cannot be performed.

In order to solve the above-mentioned problem, the serving cell transmits, to another cell that performs UL CoMP, the information regarding the frequency hopping pattern of the PUSCH for the UE. The information may be transmitted before UL CoMP is performed on the UE. For example, it may be transmitted as in Step ST3001 of FIG. 30. Examples of the information regarding the PUSCH frequency hopping pattern include the information indicating whether or not frequency hopping is performed, the cell identifiers (Cell-ID, PCI) of the serving cell, the system bandwidth of the serving cell and the number of subblocks of the serving cell. Those pieces of information are transmitted to another cell in advance, whereby another cell can receive the PUSCH from the UE even if PUSCH frequency hopping is performed. Accordingly, it is possible to increase the coverage of high data rates, improve the cell-edge throughput and increase the system throughput, which are aimed in UL CoMP.

However, the control, in which the information regarding the PUSCH frequency hopping pattern for the UE is transmitted from the serving cell to another cell and the allocation of the physical resource to which the PUSCH of the UE is transmitted is derived by another cell, becomes complicated. This is because frequency hopping is performed for each subframe or each slot. In order to perform this, the information regarding frequency hopping needs to be transmitted for each subframe or each slot, resulting in an increase of the signaling amount from the serving cell to another cell. Further, frequency hopping is controlled by another cell for each subframe or each slot, and thus control becomes complicated, resulting in an increase in size of the control circuit of the cell and an increase in power consumption.

In order to solve the above-mentioned problem, PUSCH hopping is not performed (is prohibited) for the UE being a UL CoMP target. This may be predetermined. Alternatively, the serving cell may transmit the information indicating whether or not to perform (allow or prohibit) frequency hopping on the UE being a UL CoMP target. This enables the serving cell not to perform PUSCH hopping on the UE being a UL CoMP target, whereby it is possible to solve the above-mentioned problem.

In a case of not performing PUSCH hopping on the UE being a UL CoMP target, the serving cell may transmit the PUSCH allocation information disclosed in Step ST3001 of FIG. 30 to another cell. Alternatively, the serving cell may transmit the information indicating whether or not to perform frequency hopping to another cell. In a case of having transmitted the information indicating that frequency hopping is not performed, the serving cell may transmit the PUSCH allocation information disclosed in Step ST3001 of FIG. 30. On the other hand, in the case of having transmitted the information indicating that frequency hopping is performed, the serving cell may transmit the information regarding the above-mentioned PUSCH frequency hopping pattern. As a result, whether or not frequency hopping is performed can be changed in a dynamic manner, which allows flexible radio resource allocation.

Frequency hopping is performed mainly in the case where uplink transmission is periodically allocated, such as persistent scheduling or semi-persistent scheduling. In such a case, while the UE periodically transmits the PUSCH, it is a waste of radio resources to transmit the PUSCH allocation information from the serving cell to the UE in every transmission. If the PUSCH is allocated in the same manner each time for avoiding this, the reception quality of the PUSCH in the cell becomes deteriorated continuously in a case where the radio wave propagation situation of the physical resource for allocation, that is, frequency-time domain becomes deteriorated. As a result of the PUSCH becoming deteriorated continuously, a problem such as disconnection arises. Therefore, in a case where the PUSCH is transmitted periodically, frequency hopping is performed on the PUSCH, so that the reception quality of the PUSCH is prevented from becoming deteriorated continuously in the cell. In the case where the PUSCH is transmitted periodically as described above, frequency hopping is performed on the PUSCH in many cases.

However, no problem arises if the UE being a UL CoMP target does not perform (stops) frequency hopping. This is because in UL CoMP, a plurality of radio wave propagation paths are formed between one UE and a cell that performs UL CoMP. Accordingly, even when the radio wave propagation situation, with one cell, of the PUSCH allocation physical resource, that is, the frequency-time domain becomes deteriorated, the radio wave propagation situation with another cell does not become deteriorated. Therefore, the reception quality of the PUSCH is not degraded in another cell. This allows to maintain the reception quality by combination of pieces of received information by the cell that performs UL CoMP, and thus communication is not prevented from being disconnected.

Therefore, no problem arises even if the UE being a UL CoMP target does not perform (prohibits) frequency hopping, whereby an effect that control is prevented from becoming complicated can be achieved.

Further, setting may be made as to whether or not PUSCH hopping is performed (allowed or prohibited) for a UE being a UL CoMP target in accordance with service. This setting may be predetermined. For example, PUSCH hopping may not be performed (may be prohibited) in a case where the transmission data of the UE being a UL CoMP target is voice communication service. This is because whether to perform persistent scheduling or semi-persistent scheduling on the PUSCH is determined in accordance with service in many cases, and accordingly whether to perform frequency hopping on the PUSCH is determined in many cases. Therefore, it is possible to prevent UL CoMP control from becoming complicated by setting whether or not to perform PUSCH hopping in accordance with service.

The method of predetermining a physical resource that cannot be allocated for DL CoMP or a physical resource that can be allocated therefor, which has been disclosed in the first embodiment, may be applied to UL CoMP. For example, among the physical resources to which the PUSCH can be allocated, the frequency domain of a physical resource that can be allocated for UL CoMP may be predetermined, while the other frequency domain may be determined as a physical resource being a frequency hopping target. As a result of the physical resources on which uplink frequency hopping can be performed being divided into a physical resource for UL CoMP and that for uplink frequency hopping, it is possible to independently perform control of frequency hopping performed for each cell and scheduling control of the physical resource of the PUSCH, which has to be performed between the cells that perform UL CoMP in a coordinated manner. This makes uplink frequency hopping control as well as UL CoMP control simpler.

In a semi-static case, the physical resource information in which frequency hopping is enabled or the physical resource information in which frequency hopping is disabled may be notified by being mapped on the broadcast information from each cell to the UE. Change information of the physical resource may be notified by being mapped on the broadcast information. All UEs being served by a cell can recognize the physical resource where frequency hopping of the cell can be performed, by being mapped on the broadcast information to be notified from each cell to the UE. Therefore, it is possible to determine a frequency hopping pattern in the physical resource where frequency hopping can be performed.

While the case where UL CoMP is performed has been described herein, the method disclosed in the present embodiment may be used in DL CoMP. It is possible to achieve similar effects also in DL CoMP when the above-mentioned method is used in DL CoMP.

While the LTE advanced system has been mainly described in the present invention, the present invention is applicable to other system using OFDM. Further, the present invention is applicable to a mobile communication system to which a closed subscriber group (CSG) is introduced, a communication system in which an operator identifies a subscriber and the identified subscriber is allowed access as in the case of CSG, and a communication system into which a cell having a smaller cell radius compared with a normal cell is introduced as in the case of HeNB.

The invention claimed is:

1. A mobile communication system, which has a coordinated communication mode in which radio communication is performed between a user equipment and a plurality of base stations in a coordinated manner and an uncoordinated communication mode in which radio communication is performed between a user equipment and a base station without coordinating with another base station,
wherein radio communication is performed by selectively using any of said coordinated communication mode and said uncoordinated communication mode in accordance with an operation state of said user equipment.

2. A base station, which has a coordinated communication mode in which radio communication is performed between a user equipment and said base station with coordinating with another base station and an uncoordinated communication mode in which radio communication is performed between a user equipment and said base station without coordinating with another base station,
wherein radio communication is performed by selectively using any of said coordinated communication mode and said uncoordinated communication mode in accordance with an operation state of said user equipment.

3. A user equipment, which has a coordinated communication mode in which radio communication is performed between a base station coordinated with another base station and said user equipment and an uncoordinated communication mode in which radio communication is performed between a base station uncoordinated with another base station and said user equipment,
wherein radio communication is performed by selectively using any of said coordinated communication mode and said uncoordinated communication mode in accordance with an operation state of said user equipment.

4. The mobile communication system of claim 1, wherein the operation state of said user equipment is one of a connected state and an idle state.

* * * * *